(12) United States Patent
Leddy et al.

(10) Patent No.: US 6,949,179 B2
(45) Date of Patent: Sep. 27, 2005

(54) METHODS FOR FORMING MAGNETICALLY MODIFIED ELECTRODES AND ARTICLES PRODUCED THEREBY

(75) Inventors: Johna Leddy, Iowa City, IA (US); Shelley D. Minteer, Pacific, MO (US)

(73) Assignee: University of Iowa Research Foundation, Iowa City, IA (US)

( * ) Notice: Subject to any disclaimer, the term of this patent is extended or adjusted under 35 U.S.C. 154(b) by 179 days.

(21) Appl. No.: 10/406,002

(22) Filed: Apr. 3, 2003

(65) Prior Publication Data

US 2004/0026253 A1 Feb. 12, 2004

Related U.S. Application Data

(63) Continuation-in-part of application No. 09/876,035, filed on Jun. 8, 2001, now Pat. No. 6,514,575, which is a division of application No. 09/047,494, filed on Mar. 25, 1998, now Pat. No. 6,322,676, which is a continuation of application No. 08/294,797, filed on Aug. 25, 1994, now abandoned.

(60) Provisional application No. 60/369,344, filed on Apr. 3, 2002.

(51) Int. Cl.$^7$ ............................................. G01N 27/26
(52) U.S. Cl. .................... 205/775; 205/793.5; 205/335; 205/337; 205/339
(58) Field of Search ................. 205/335, 775, 205/777.5, 779, 789, 789.5, 790.5, 793.5, 337, 339

(56) References Cited

U.S. PATENT DOCUMENTS

| | | |
|---|---|---|
| 2,895,851 A | 7/1959 | Johnson |
| 3,811,952 A | 5/1974 | Siwersson et al. |
| 3,853,628 A | 12/1974 | Fox ............................ 136/86 |
| 3,945,910 A | 3/1976 | DeCeuster |
| 4,019,995 A | 4/1977 | Briggs et al. |
| 4,037,022 A | 7/1977 | Cheron ........................ 429/10 |
| 4,132,619 A | 1/1979 | Klein et al. |
| 4,201,827 A | 5/1980 | Heitkamp |
| 4,244,998 A | 1/1981 | Smith |
| 4,247,398 A | 1/1981 | Mohri |
| 4,336,278 A | 6/1982 | Pertzsch et al. |
| 4,339,337 A | 7/1982 | Tricot et al. |
| 4,647,514 A | 3/1987 | LeCraw |
| 4,725,490 A | 2/1988 | Goldenberg |
| 4,876,115 A | 10/1989 | Raistrick |
| 4,965,007 A | 10/1990 | Mudelson |
| 4,973,391 A | 11/1990 | Madon et al. |
| 4,978,610 A * | 12/1990 | Forrest et al. ........... 205/777.5 |
| 5,075,169 A | 12/1991 | Nagai et al. |
| 5,096,551 A | 3/1992 | Shoen et al. |
| 5,102,745 A | 4/1992 | Tatarchuk et al. |
| 5,172,751 A | 12/1992 | Croat |
| 5,186,854 A | 2/1993 | Edelstein |
| 5,187,034 A | 2/1993 | Olagwa et al. |
| 5,191,223 A | 3/1993 | Munekata |
| 5,241,447 A | 8/1993 | Barber et al. |
| 5,540,981 A | 7/1996 | Gallagher et al. .......... 428/220 |
| 5,561,000 A | 10/1996 | Dirven et al. |
| 5,587,943 A | 12/1996 | Torok et al. |
| 5,696,392 A | 12/1997 | Char et al. |
| 5,928,804 A | 7/1999 | Leddy et al. .................. 429/10 |
| 6,001,248 A | 12/1999 | Leddy et al. |
| 6,036,838 A | 3/2000 | Wieser et al. ................ 205/339 |
| 6,100,045 A * | 8/2000 | Van Es ........................ 435/7.1 |

\* cited by examiner

Primary Examiner—Bruce F. Bell
(74) Attorney, Agent, or Firm—Fleshner & Kim, LLP

(57) ABSTRACT

The present invention is directed to methods for making magnetically modified electrodes and electrodes made according to the method. Such electrode are useful as electrodes in batteries, such as Ni-MH batteries, Ni—Cd batteries, Ni—Zn batteries and Ni—Fe batteries.

2 Claims, 62 Drawing Sheets

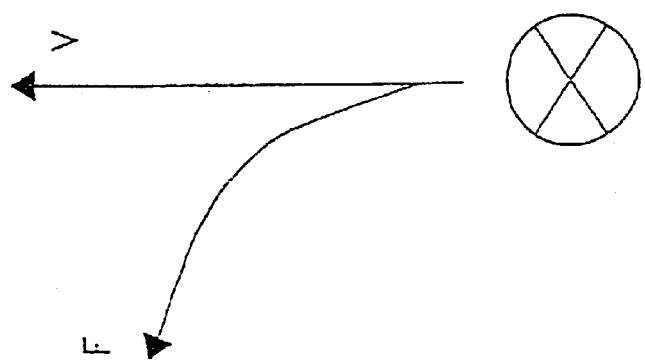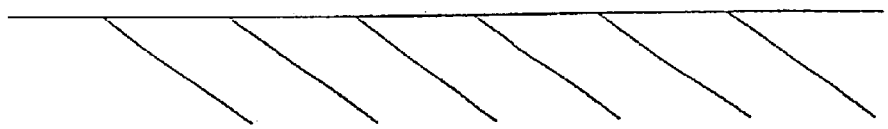
FIG. 1

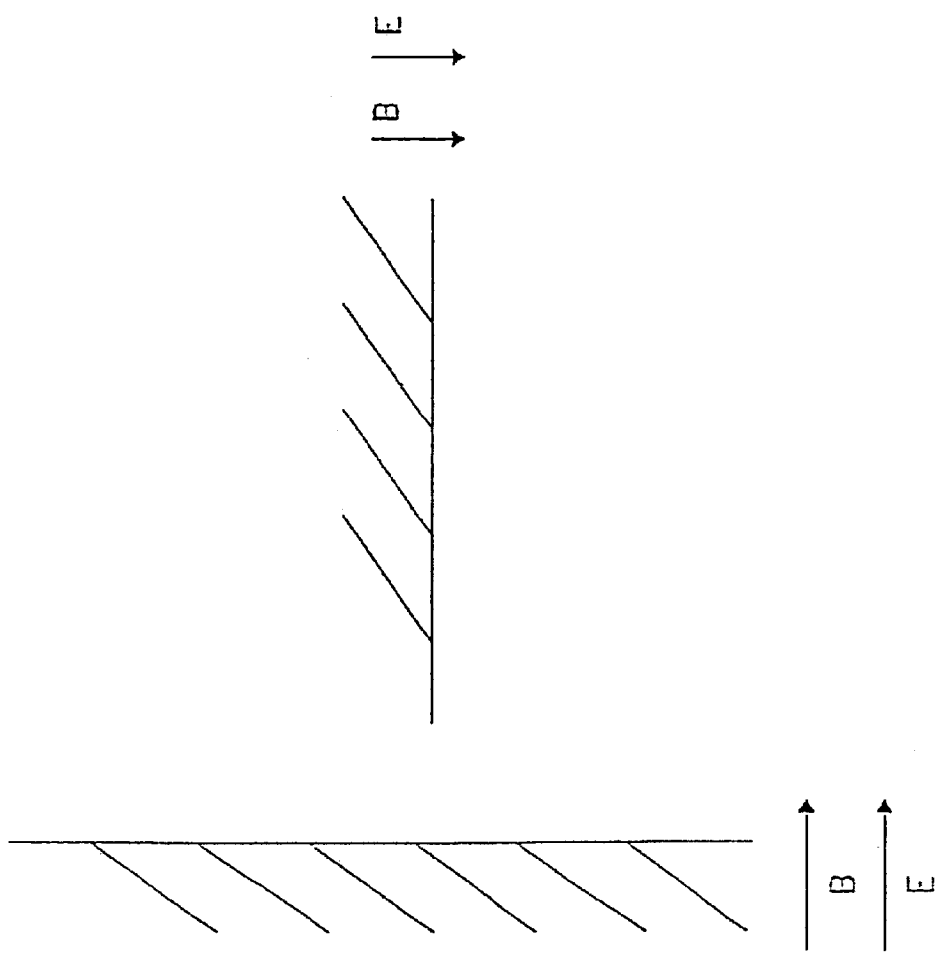

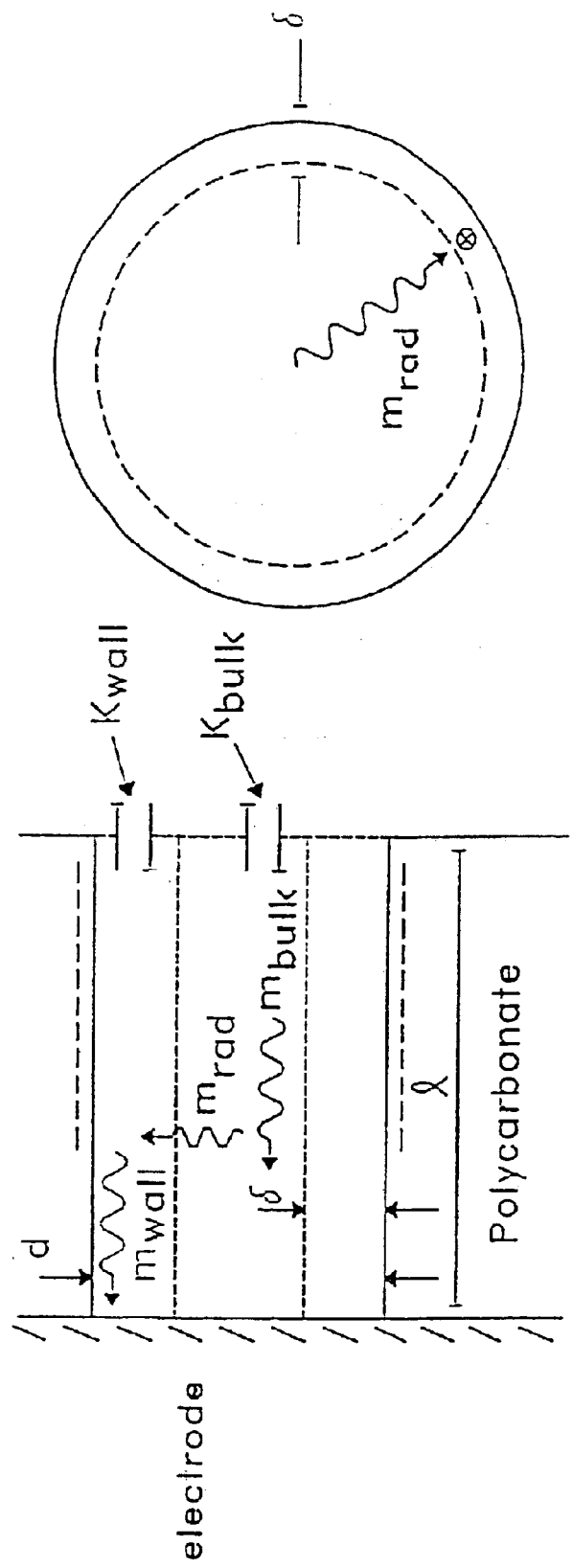

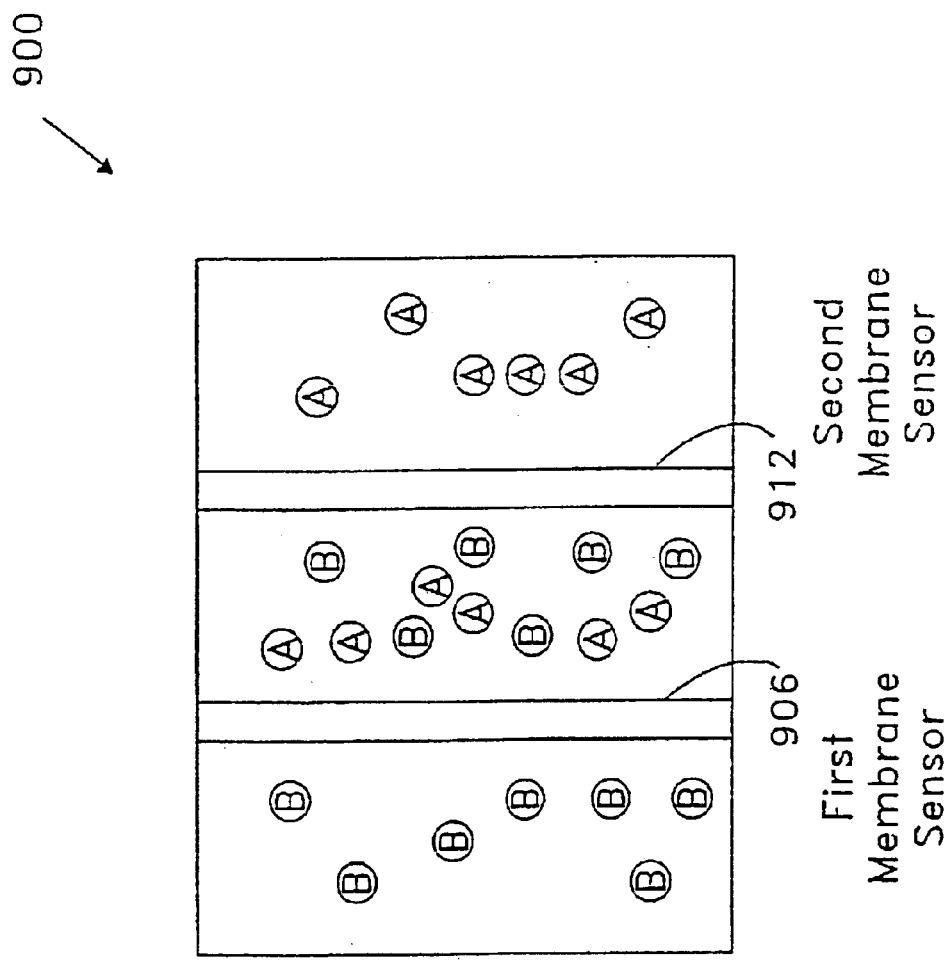

Methyl Viologen Dichloride

Table 25. Results of Spin and Charge Density Calculations for Methyl Viologen Radical

| Atom | Spin Density | Charge Density |
|---|---|---|
| C1 | 0.1693 | 0.0131 |
| C2 | 0.0769 | -0.0560 |
| C3 | 0.1685 | 0.0131 |
| C4 | 0.0523 | -0.0521 |
| C5 | -0.0174 | 0.0863 |
| C6 | 0.0514 | -0.0521 |
| C7 | 0.0020 | 0.0808 |
| C8 | 0.0773 | -0.0560 |
| N1 | 0.2436 | -0.2215 |
| C9 | -0.0177 | 0.0864 |
| C10 | 0.0011 | 0.0809 |
| N2 | 0.2436 | -0.2214 |
| C11 | -0.0353 | -0.0676 |
| C12 | -0.0353 | -0.0676 |
| H1 | -0.0068 | 0.0894 |
| H2 | -0.0053 | 0.0901 |
| H3 | -0.0013 | 0.1116 |
| H4 | -0.0053 | 0.0900 |
| H5 | -0.0023 | 0.1118 |
| H6 | -0.0068 | 0.0894 |
| H7 | -0.0013 | 0.1116 |
| H8 | -0.0023 | 0.1118 |
| H9 | 0.0021 | 0.1054 |
| H10 | 0.0118 | 0.1043 |
| H11 | 0.0117 | 0.1043 |
| H12 | 0.0021 | 0.1053 |
| H13 | 0.0118 | 0.1043 |
| H14 | 0.0117 | 0.1043 |

Figure 23

Table 26. Charge Density and Spin Density Calculations for Benzyl Viologen Radical Cation

| Atom | Spin Density | Charge Density | Atom | Spin Density | Charge Density |
|---|---|---|---|---|---|
| C1 | 0.1897 | 0.0159 | H8 | -0.0057 | 0.1158 |
| C2 | 0.0093 | -0.0555 | C13 | -0.0169 | -0.0545 |
| C3 | 0.1939 | 0.0149 | C14 | -0.0171 | -0.0539 |
| C4 | 0.0149 | -0.0557 | C15 | -0.0154 | -0.0545 |
| C5 | 0.0571 | 0.0839 | C16 | -0.0157 | -0.0539 |
| C6 | 0.0129 | -0.0557 | C17 | 0.0416 | -0.0457 |
| C7 | 0.0556 | 0.0846 | C18 | 0.0416 | -0.0456 |
| C8 | 0.0101 | -0.0552 | C19 | 0.0395 | -0.0455 |
| N1 | 0.1774 | -0.2326 | C20 | 0.0395 | -0.0455 |
| C9 | 0.0554 | 0.0830 | C21 | -0.0320 | -0.0417 |
| C10 | 0.0535 | 0.0840 | C22 | -0.0305 | -0.0415 |
| N2 | 0.1809 | -0.2319 | H9 | 0.0013 | 0.0731 |
| C11 | -0.0031 | 0.0938 | H10 | 0.0014 | 0.0730 |
| C12 | -0.0038 | 0.0934 | H11 | 0.0012 | 0.0737 |
| H1 | -0.0032 | 0.0886 | H12 | 0.0013 | 0.0736 |
| H2 | -0.0038 | 0.0883 | H13 | -0.0027 | 0.0831 |
| H3 | -0.0059 | 0.1161 | H14 | -0.0027 | 0.0835 |
| H4 | -0.0035 | 0.0888 | H15 | -0.0026 | 0.0833 |
| H5 | -0.0058 | 0.1161 | H16 | -0.0026 | 0.0835 |
| H6 | -0.0033 | 0.0883 | H17 | 0.0019 | 0.0854 |
| H7 | -0.0057 | 0.1156 | H18 | 0.0018 | 0.0854 |

Figure 26

Benzoquinone

| Atom | Spin Density | Charge Density |
|---|---|---|
| C1 | -0.4230 | 0.0288 |
| C2 | 0.0867 | -0.1226 |
| C3 | 0.0856 | -0.1227 |
| C4 | -0.4227 | 0.0288 |
| C5 | 0.0861 | -0.1226 |
| C6 | 0.0863 | -0.1227 |
| O1 | 0.7603 | -0.2949 |
| O2 | 0.7601 | -0.2950 |
| H1 | -0.0049 | 0.0057 |
| H2 | -0.0048 | 0.0057 |
| H3 | -0.0049 | 0.0057 |
| H4 | -0.0049 | 0.0057 |

Figure 29

9,10-diphenylanthracene

| Atom | Spin Density | Charge Density | Atom | Spin Density | Charge Density |
|---|---|---|---|---|---|
| C1 | -0.2619 | -0.0074 | C19 | 0.0043 | -0.0691 |
| C2 | -0.2394 | -0.0076 | C20 | 0.0235 | -0.0706 |
| C3 | 0.2648 | -0.1019 | C21 | 0.0222 | -0.0704 |
| C4 | -0.0422 | -0.1029 | C22 | -0.0173 | -0.0824 |
| C5 | -0.0689 | -0.1028 | C23 | 0.2679 | -0.1008 |
| C6 | 0.2915 | -0.1010 | C24 | 0.2865 | -0.1009 |
| C7 | 0.6151 | -0.0759 | C25 | -0.0447 | -0.1032 |
| C8 | 0.5995 | -0.0779 | C26 | -0.0653 | -0.1021 |
| H1 | -0.0186 | 0.0302 | H5 | -0.0003 | 0.0572 |
| H2 | 0.0019 | 0.0178 | H6 | -0.0016 | 0.0420 |
| H3 | 0.0031 | 0.0178 | H7 | 0.0002 | 0.0581 |
| H4 | -0.0199 | 0.0302 | H8 | -0.0018 | 0.0417 |
| C9 | -0.2458 | -0.0080 | H9 | 0.0015 | 0.0376 |
| C10 | -0.2515 | -0.0059 | H10 | -0.0005 | 0.0574 |
| C11 | -0.0546 | 0.0260 | H11 | 0.0000 | 0.0580 |
| C12 | -0.0582 | 0.0258 | H12 | -0.0016 | 0.0417 |
| C13 | -0.0048 | -0.0684 | H13 | -0.0014 | 0.0417 |
| C14 | 0.0267 | -0.0701 | H14 | 0.0013 | 0.0371 |
| C15 | -0.0004 | -0.0689 | H15 | -0.0187 | 0.0316 |
| C16 | 0.0278 | -0.0706 | H16 | -0.0198 | 0.0319 |
| C17 | -0.0225 | -0.0820 | H17 | 0.0019 | 0.0176 |
| C18 | 0.0092 | -0.0688 | H18 | 0.0030 | 0.0180 |

Figure 32

| Atom | Spin Density | Charge Density | Atom | Spin Density | Charge Density |
|---|---|---|---|---|---|
| C1 | -0.2514 | 0.0027 | C19 | 0.0002 | -0.0550 |
| C2 | -0.2334 | 0.0028 | C20 | 0.0303 | -0.0505 |
| C3 | 0.2675 | -0.0253 | C21 | 0.0314 | -0.0511 |
| C4 | -0.0556 | -0.0216 | C22 | -0.0278 | -0.0438 |
| C5 | -0.0804 | -0.0212 | C23 | 0.2784 | -0.0248 |
| C6 | 0.2916 | -0.0263 | C24 | 0.2900 | -0.0244 |
| C7 | 0.6203 | 0.0733 | C25 | -0.0639 | -0.0206 |
| C8 | 0.6080 | 0.0745 | C26 | -0.0756 | -0.0216 |
| H1 | -0.0190 | 0.1005 | H5 | 0.0007 | 0.0705 |
| H2 | 0.0034 | 0.1029 | H6 | -0.0024 | 0.0806 |
| H3 | 0.0046 | 0.1029 | H7 | 0.0007 | 0.0704 |
| H4 | -0.0203 | 0.1005 | H8 | -0.0023 | 0.0807 |
| C9 | -0.2459 | 0.0041 | H9 | 0.0025 | 0.0828 |
| C10 | -0.2469 | 0.0024 | H10 | 0.0001 | 0.0707 |
| C11 | -0.0392 | -0.0238 | H11 | 0.0001 | 0.0708 |
| C12 | -0.0508 | -0.0238 | H12 | -0.0018 | 0.0811 |
| C13 | -0.0144 | -0.0559 | H13 | -0.0018 | 0.0807 |
| C14 | 0.0446 | -0.0508 | H14 | 0.0018 | 0.0832 |
| C15 | -0.0125 | -0.0561 | H15 | -0.0197 | 0.1016 |
| C16 | 0.0432 | -0.0507 | H16 | -0.0205 | 0.1017 |
| C17 | -0.0415 | -0.0445 | H17 | 0.0038 | 0.1031 |
| C18 | -0.0006 | -0.0559 | H18 | 0.0044 | 0.1029 |

Figure 33

9,10-dimethylanthracene

| Atom | Spin Density | Charge Density |
|---|---|---|
| C1 | 0.0249 | -0.0240 |
| C2 | 0.1002 | -0.0472 |
| C3 | -0.0567 | 0.0335 |
| C4 | -0.0567 | 0.0335 |
| C5 | 0.1002 | -0.0472 |
| C6 | 0.0249 | -0.0240 |
| C7 | 0.3663 | -0.1142 |
| C8 | 0.3663 | -0.1142 |
| C9 | -0.0567 | 0.0335 |
| C10 | -0.0567 | 0.0335 |
| C11 | 0.1002 | -0.0472 |
| H1 | -0.0052 | -0.0418 |
| C12 | 0.0249 | -0.0240 |
| C13 | 0.0249 | -0.0240 |
| C14 | 0.1002 | -0.0472 |
| H2 | -0.0015 | -0.0613 |
| H3 | -0.0052 | -0.0418 |
| H4 | -0.0052 | -0.0418 |
| H5 | -0.0015 | -0.0613 |
| H6 | -0.0015 | -0.0613 |
| H7 | -0.0015 | -0.0613 |
| H8 | -0.0052 | -0.0418 |
| C15 | -0.0420 | 0.0188 |
| C16 | -0.0420 | 0.0188 |
| H9 | 0.0098 | -0.0386 |
| H10 | 0.0098 | -0.0386 |
| H11 | 0.0331 | -0.0458 |
| H12 | 0.0331 | -0.0458 |
| H13 | 0.0098 | -0.0386 |
| H14 | 0.0098 | -0.0386 |

Figure 37

| Atom | Spin Density | Charge Density |
|---|---|---|
| C1 | -0.0144 | -0.0281 |
| C2 | 0.1633 | -0.0339 |
| C3 | -0.1486 | -0.0001 |
| C4 | -0.1486 | -0.0001 |
| C5 | 0.1633 | -0.0339 |
| C6 | -0.0144 | -0.0281 |
| C7 | 0.5507 | 0.1070 |
| C8 | 0.5507 | 0.1070 |
| C9 | -0.1486 | -0.0001 |
| C10 | -0.1486 | -0.0001 |
| C11 | 0.1633 | -0.0339 |
| H1 | -0.0116 | 0.1015 |
| C12 | -0.0144 | -0.0281 |
| C13 | -0.0144 | -0.0281 |
| C14 | 0.1633 | -0.0339 |
| H2 | 0.0002 | 0.1084 |
| H3 | -0.0116 | 0.1015 |
| H4 | -0.0116 | 0.1015 |
| H5 | 0.0002 | 0.1084 |
| H6 | 0.0002 | 0.1084 |
| H7 | 0.0002 | 0.1084 |
| H8 | -0.0116 | 0.1015 |
| C15 | -0.0619 | -0.2022 |
| C16 | -0.0619 | -0.2022 |
| H9 | 0.0075 | 0.0973 |
| H10 | 0.0075 | 0.0973 |
| H11 | 0.0186 | 0.1050 |
| H12 | 0.0186 | 0.1050 |
| H13 | 0.0075 | 0.0973 |
| H14 | 0.0075 | 0.0973 |

Figure 38

Anthracene

| Atom | Spin Density | Charge Density |
|---|---|---|
| C1 | -0.3173 | -0.0127 |
| C2 | -0.2860 | -0.0145 |
| C3 | 0.3144 | -0.1006 |
| C4 | -0.0543 | -0.1086 |
| C5 | -0.1116 | -0.1077 |
| C6 | 0.3658 | -0.0984 |
| C7 | 0.7933 | -0.0749 |
| C8 | 0.7848 | -0.0757 |
| H1 | -0.0227 | 0.0232 |
| H2 | 0.0034 | 0.0124 |
| H3 | 0.0065 | 0.0127 |
| H4 | -0.0256 | 0.0238 |
| C9 | -0.2884 | -0.0146 |
| C10 | -0.3173 | -0.0118 |
| H5 | -0.1661 | -0.0532 |
| H6 | -0.1639 | -0.0532 |
| C11 | 0.3159 | -0.1013 |
| C12 | 0.3720 | -0.0991 |
| C13 | -0.0497 | -0.1091 |
| C14 | -0.1139 | -0.1076 |
| H7 | -0.0229 | 0.0227 |
| H8 | -0.0262 | 0.0234 |
| H9 | 0.0031 | 0.0120 |
| H10 | 0.0066 | 0.0125 |

Figure 41

| Atom | Spin Density | Charge Density |
|---|---|---|
| C1 | -0.3002 | -0.0007 |
| C2 | -0.2744 | 0.0016 |
| C3 | 0.3043 | -0.0179 |
| C4 | -0.0620 | -0.0139 |
| C5 | -0.1161 | -0.0149 |
| C6 | 0.3528 | -0.0191 |
| C7 | 0.8059 | 0.0556 |
| C8 | 0.8052 | 0.0550 |
| H1 | -0.0218 | 0.1004 |
| H2 | 0.0042 | 0.1092 |
| H3 | 0.0071 | 0.1089 |
| H4 | -0.0245 | 0.1000 |
| C9 | -0.2730 | 0.0020 |
| C10 | -0.3066 | -0.0008 |
| H5 | -0.1714 | 0.0909 |
| H6 | -0.1709 | 0.0907 |
| C11 | 0.3002 | -0.0182 |
| C12 | 0.3616 | -0.0195 |
| C13 | -0.0591 | -0.0133 |
| C14 | -0.1265 | -0.0146 |
| H7 | -0.0216 | 0.1004 |
| H8 | -0.0252 | 0.0999 |
| H9 | 0.0041 | 0.1093 |
| H10 | 0.0078 | 0.1090 |

Figure 42

Rubrene

| Atom | Spin | Charge | Atom | Spin | Charge | Atom | Spin | Charge |
|---|---|---|---|---|---|---|---|---|
| C1 | -0.1894 | 0.0104 | C21 | 0.0553 | -0.0533 | C35 | 0.0369 | -0.0549 |
| C2 | -0.1900 | 0.0104 | C22 | -0.0486 | -0.0464 | C36 | -0.0314 | -0.0504 |
| C3 | 0.1850 | -0.0420 | C23 | 0.5420 | 0.0582 | C37 | 0.0368 | -0.0558 |
| C4 | -0.0463 | -0.0307 | C24 | 0.5429 | 0.0583 | C38 | -0.0136 | -0.0566 |
| C5 | -0.0444 | -0.0307 | C25 | -0.1871 | 0.0108 | C39 | 0.1795 | -0.0415 |
| C6 | 0.1832 | -0.0420 | C26 | -0.1867 | 0.0108 | C40 | 0.1774 | -0.0415 |
| C7 | 0.5455 | 0.0521 | H5 | 0.0013 | 0.0655 | C41 | -0.0431 | -0.0307 |
| C8 | 0.5453 | 0.0520 | H6 | -0.0032 | 0.0738 | C42 | -0.0453 | -0.0307 |
| H1 | -0.0125 | 0.0920 | H7 | 0.0014 | 0.0678 | H15 | 0.0009 | 0.0683 |
| H2 | 0.0022 | 0.0932 | H8 | -0.0033 | 0.0750 | H16 | -0.0026 | 0.0756 |
| H3 | 0.0021 | 0.0932 | H9 | 0.0029 | 0.0767 | H17 | 0.0023 | 0.0774 |
| H4 | -0.0124 | 0.0920 | H10 | 0.0013 | 0.0655 | H18 | -0.0026 | 0.0748 |
| C9 | -0.4330 | -0.0210 | H11 | 0.0014 | 0.0678 | H19 | 0.0009 | 0.0659 |
| C10 | -0.4334 | -0.0210 | H12 | -0.0033 | 0.0750 | H20 | 0.0009 | 0.0683 |
| C11 | -0.0281 | -0.0141 | H13 | -0.0032 | 0.0738 | H21 | -0.0026 | 0.0756 |
| C12 | -0.0286 | -0.0141 | H14 | 0.0029 | 0.0767 | H22 | 0.0023 | 0.0774 |
| C13 | -0.0237 | -0.0547 | C27 | -0.0311 | -0.0132 | H23 | -0.0026 | 0.0748 |
| C14 | 0.0560 | -0.0533 | C28 | -0.0133 | -0.0539 | H24 | 0.0009 | 0.0659 |
| C15 | -0.0236 | -0.0518 | C29 | 0.0367 | -0.0549 | H25 | -0.0120 | 0.0920 |
| C16 | 0.0556 | -0.0522 | C30 | -0.0312 | -0.0504 | H26 | -0.0119 | 0.0920 |
| C17 | -0.0494 | -0.0464 | C31 | 0.0366 | -0.0558 | H27 | 0.0020 | 0.0935 |
| C18 | -0.0230 | -0.0547 | C32 | -0.0135 | -0.0566 | H28 | 0.0022 | 0.0935 |
| C19 | -0.0230 | -0.0518 | C33 | -0.0311 | -0.0132 | | | |
| C20 | 0.0549 | -0.0522 | C34 | -0.0134 | -0.0539 | | | |

Figure 45

Tetracyanoquinodimethane

| Atom | Spin Density | Charge Density |
|---|---|---|
| C1 | 0.0982 | -0.0190 |
| C2 | -0.0103 | -0.0976 |
| C3 | -0.1011 | -0.0187 |
| C4 | 0.0007 | -0.1030 |
| C5 | -0.0003 | -0.0107 |
| C6 | -0.0072 | -0.0977 |
| C7 | 0.0001 | -0.0417 |
| C8 | 0.0039 | -0.0995 |
| C9 | -0.0002 | 0.0823 |
| N1 | 0.0003 | -0.1898 |
| C10 | -0.0002 | 0.0832 |
| N2 | 0.0002 | -0.1883 |
| C11 | 0.1829 | -0.1174 |
| N3 | 0.3612 | -0.3983 |
| C12 | 0.0427 | -0.0381 |
| N4 | 0.2945 | -0.3526 |
| H1 | -0.0075 | 0.0319 |
| H2 | 0.0012 | 0.0552 |
| H3 | 0.0011 | 0.0690 |
| H4 | 0.1376 | -0.0038 |
| H5 | 0.0000 | 0.0471 |
| H6 | 0.0000 | 0.0502 |
| H7 | 0.0000 | 0.0636 |
| H8 | 0.0011 | 0.0452 |
| H9 | 0.0011 | 0.0535 |
| H10 | 0.0000 | 0.1094 |
| H11 | 0.0005 | 0.0364 |
| H12 | -0.0003 | 0.0489 |

Figure 48

N,N,N'N'-tetramethyl-1,4-phenylenediamine

| Atom | Spin Density | Charge Density |
|---|---|---|
| N1 | 0.0026 | -0.2997 |
| C1 | -0.0322 | 0.1386 |
| C2 | 0.0317 | -0.0525 |
| C3 | -0.0019 | -0.0415 |
| C4 | -0.0687 | 0.0518 |
| C5 | 0.0165 | -0.0473 |
| C6 | 0.0318 | -0.0429 |
| N2 | 1.0955 | -0.0060 |
| C7 | -0.1175 | -0.0889 |
| C8 | -0.1164 | -0.0886 |
| C9 | -0.0009 | -0.0728 |
| C10 | -0.0010 | -0.0726 |
| H1 | -0.0015 | 0.1001 |
| H2 | 0.0006 | 0.0915 |
| H3 | -0.0017 | 0.0835 |
| H4 | 0.0000 | 0.1091 |
| H5 | 0.0170 | 0.1351 |
| H6 | 0.0102 | 0.1371 |
| H7 | 0.0544 | 0.1403 |
| H8 | 0.0108 | 0.1370 |
| H9 | 0.0157 | 0.1347 |
| H10 | 0.0547 | 0.1407 |
| H11 | 0.0000 | 0.0828 |
| H12 | 0.0001 | 0.0686 |
| H13 | 0.0000 | 0.0553 |
| H14 | 0.0001 | 0.0682 |
| H15 | 0.0000 | 0.0830 |
| H16 | 0.0000 | 0.0554 |

Figure 51

Thianthrene

| Atom | Spin Density | Charge Density |
|---|---|---|
| C1 | 0.0866 | -0.1749 |
| C2 | 0.1065 | -0.1801 |
| C3 | -0.1116 | -0.0239 |
| C4 | 0.1187 | -0.0194 |
| C5 | 0.0887 | -0.0174 |
| C6 | -0.0794 | -0.0250 |
| S1 | 0.2919 | 0.5280 |
| S2 | 0.2938 | 0.5310 |
| H1 | 0.0065 | 0.0985 |
| H2 | -0.0083 | 0.1068 |
| H3 | -0.0068 | 0.1072 |
| H4 | 0.0049 | 0.0988 |
| C7 | 0.1193 | -0.1803 |
| C8 | 0.0761 | -0.1755 |
| C9 | -0.1305 | -0.0242 |
| C10 | -0.0652 | -0.0247 |
| C11 | 0.1377 | -0.0191 |
| C12 | 0.0745 | -0.0175 |
| H5 | 0.0075 | 0.0986 |
| H6 | 0.0043 | 0.0990 |
| H7 | -0.0093 | 0.1068 |
| H8 | -0.0062 | 0.1072 |

Figure 54

2,3,7,8,12,13,17,18-Octaethyl-21H,23H-porphrine Nickel(II)

| Redox Couple | Ion Formation | Magnitude of Effect | Spin Density | Charge Density |
|---|---|---|---|---|
| Methyl Viologen | Cation | Medium | Nitrogens | Delocalized (N) |
| Benzyl Viologen | Cation | Large | Nitrogens | Delocalized (N) |
| Benzoquinone | Anion | No Effect | Oxygens | Oxygens |
| Diphenylanthracene | Cation | Medium | Central Carbons | Delocalized |
| Diphenylanthracene | Anion | Large | Central Carbons | Delocalized |
| Dimethylanthracene | Cation | No Effect | Central Carbons | Delocalized |
| Dimethylanthracene | Anion | Large | Central Carbons | Delocalized |
| Anthracene | Cation | Small | Central Carbons | Delocalized |
| Anthracene | Anion | Large | Central Carbons | Delocalized |
| Rubrene | Anion | Medium | Central Carbons | Delocalized |
| TCNQ | Anion | No Effect | Nitrogens | Nitrogens |
| TMPD | Cation | Large (Negative) | Nitrogen | Opposite Nitrogen |
| Thianthrene | Cation | No Effect/Small | Sulfurs | Sulfurs |
| OEP Nickel (II) | Cation | Small | N.A. | N.A. |

Figure 57

METHODS FOR FORMING MAGNETICALLY MODIFIED ELECTRODES AND ARTICLES PRODUCED THEREBY

This application claims the benefit of U.S. Provisional Application No. 60/369,344, filed on Apr. 3, 2002.

This application is a Continuation-in-part of U.S. patent application Ser. No. 09/876,035, filed on Jun. 8, 2001, now U.S. Pat. No. 6,514,575, which is a divisional application of U.S. application Ser. No. 09/047,494, filed Mar. 25, 1998, now U.S. Pat. No. 6,322,676, which is a continuation of U.S. application Ser. No. 08/294,797 filed Aug. 25, 1994, now abandoned, each of which is incorporated herein by reference in its entirety.

Part of the work performed during the development of this invention utilized U.S. government funds under grants No. CHE92-96013 and No. CHE93-20611 from the National Science Foundation, Chemistry Division, Analytical and Surface Science. The government may have certain rights in this invention.

BACKGROUND OF THE INVENTION

1. Field of the Invention

This invention relates generally to methods for forming magnetically modified electrodes and electrodes made by such methods. According to the present invention, magnetically modified electrodes exhibit improved properties compared to electrodes that are not magnetically modified.

2. Background of the Related Art

Bulk properties of molecules in magnetic fields are fairly well understood. In the detailed description of preferred embodiments, it will be shown that interfacial gradients in properly prepared composite materials can be exploited to enhance flux in many types of electrochemical systems such as fuel cells, batteries, membrane sensors, filters and flux switches. First, however, the following discussion provides a brief overview of the current understanding of magnetic properties in composites. In particular, the discussion below summarizes the thermodynamic, kinetic and mass transport properties of bulk magnetic materials.

Rudimentary Magnetic Concepts

Paramagnetic molecules have unpaired electrons and are attracted into a magnetic field; diamagnetic species, with all electrons paired, are slightly repelled by the field. Radicals and oxygen are paramagnetic; most organic molecules are diamagnetic; and most metal ions and transition metal complexes are either para- or diamagnetic. How strongly a molecule or species in a solution or fluid responds to a magnetic field is parameterized by the molar magnetic susceptibility, $P_m$(cm$^3$/mole). For diamagnetic species, $\chi_m$ is between $(-1$ to $-500)@10^{-6}$ cm$^3$/mole, and temperature independent. For paramagnetic species, $P_m$ ranges from 0 to +0.01 cm$^3$/mole, and, once corrected for its usually small diamagnetic component, varies inversely with temperature (Curie's Law). While ions are monopoles and will either move with or against an electric field, depending on the sign of the ion, paramagnetic species are dipoles and will always be drawn into (aligned in) a magnetic field, independent of the direction of the magnetic vector. The dipole will experience a net magnetic force if a field gradient exists. Because electrochemistry tends to involve single electron transfer events, the majority of electrochemical reactions should result in a net change in the magnetic susceptibility of species near the electrode.

Magnetic field effects on chemical systems can be broken down into three types: thermodynamic, kinetic and mass transport. Macroscopic, thermodynamic effects are negligible, although local magnetic field effects may not be. Kinetically, both reaction rates and product distributions can be altered. Transport effects can lead to flux enhancements of several-fold. Quantum mechanical effects are also possible, especially on very short length scales, below 10 nm. The following summarizes what has been done with homogeneous fields applied to solutions and cells with external laboratory magnets.

Thermodynamics

A magnetic field applied homogeneously by placing a solution between the poles of a laboratory magnet will have a negligible nonexponential effect on the free energy of reaction. $\Delta G_m = -0.5 \Delta \chi_m B^2$ J/mole, where $\Delta G_m$ is the change of the free energy of reaction due to the magnetic field, $\Delta \chi_m$ is the difference in magnetic susceptibility of the products and reactants, and B is the magnetic induction in gauss. For the conversion of a diamagnetic species into a paramagnetic species, $\Delta \chi_m \leq 0.01$ cm$^3$/mole. In a 1 T (1 Tesla=10 kGauss) applied field, $|\Delta G_m| \leq 0.05$ J/mole. Even in the strongest laboratory fields of 10 T, the effect is negligible compared to typical free energies of reaction ($\simeq$ kJ/mole). These are macroscopic arguments for systems where the magnet is placed external to the cell and a uniform field is applied to the solution. Microscopically, it may be possible to argue that local fields in composites are substantial, and molecules in composites within a short distance of the source of the magnetic field experience strong local fields. For example, for a magnetic wire or cylinder, the magnetic field falls off over a distance, x, as $x^{-3}$. The field experienced by a molecule 1 nm from the magnet is roughly $10^{21}$ times larger than the field experienced at 1 cm. This argument is crude, but qualitatively illustrates the potential advantage of a microstructural magnetic composite. (As an example, in the magnetic/Nafion (DuPont) composites, a larger fraction of the redox species are probably transported through the 1.5 nm zone at the interface between the Nafion and the magnetic particles.) These redox species must therefore experience large magnetic fields in close proximity to the interface.

Kinetics

Reaction rates, k, are parameterized by a pre-exponential factor, A, and a free energy of activation, $\Delta G^\ddagger$; k=A exp[$-\Delta G^\ddagger/RT$]. An externally applied, homogeneous magnetic field will have little effect on $\Delta G^\ddagger$, but can alter A. Nonadiabatic systems are susceptible to field effects. Magnetic fields alter the rate of free radical singlet-triplet interconversions by lifting the degeneracy of triplet states (affecting )G$^1$); rates can be altered by a factor of three in simple solvents. Because magnetic coupling occurs through both electronic nuclear hyperfine interactions and spin-orbit interactions, rates can be nonmonotonic functions of the applied field strength. Photochemical and electrochemical luminescent rates can be altered by applied fields. For singlet-triplet interconversions, magnetic fields alter product distributions when they cause the rate of interconversion to be comparable to the rate free radicals escape solvent cages. These effects are largest in highly viscous media, such as polymer films and micellar environments. Larger effects should be observed as the dimensionality of the system decreases. For coordination complexes, photochemical and homogeneous electron transfer rates are altered by magnetic fields. Spin-orbit coupling is higher in transition metal complexes than organic radicals because of higher nuclear charge and partially unquenched orbital angular momentum of the d-shell electrons. The rate of homogeneous electron transfer between $Co(NH_3)_6^{3+}$ and $Ru(NH_3)_6^{2+}$ is below that expected for diffusion controlled reactions; in a 7 T magnetic field, the rate is suppressed two to three-fold. It has been argued that $\Delta\chi_m$ (and $\Delta G_m$) is set by the magnetic susceptibility of the products, reactants, and activated complex, and a highly paramagnetic activated complex accounts for the field effect. For reversible electron transfer at electrodes in magnetic fields, no significant effect is expected. For quasireversible electron transfer with paramagnetic and diamagnetic species, electron transfer rates and transfer coefficients ($\alpha$) are unchanged by magnetic fields applied parallel to electrodes. Magnetic fields applied perpendicular to electrodes in flow cells generate potential differences, which just superimpose on the applied electrode potentials. Potentials of 0.25V have been reported. Reversing the applied magnetic field reverses the sign of the potential difference. This effect does not change standard rate constants, only the applied potential.

Mass Transport

Magnetically driven mass transport effects have been studied in electrochemical cells placed between the poles of large magnets. Effects vary depending on the orientation of the electrode, the relative orientation of the magnetic field and the electrode, forced or natural convection, and the relative concentrations of the redox species and electrolyte. Three cases are illustrated in FIGS. 1, 2 and 3.

For a charged species moving by natural or forced convection parallel to an electrode and perpendicular to a magnetic field which is also parallel to the electrode, a Lorentz force is generated which moves the charged particle toward the electrode (FIG. 1). This magnetohydrodynamic effect is characterized by $$F = q(E + v \times B), \quad (1)$$

where F, E, v, and B are vectors representing the Lorentz force on the charged species, the electric field, the velocity of the moving species, and the magnetic field, respectively; q is the charge on the species. For flow cells and vertical electrodes, flux enhancements of a few-fold and reductions in the overpotential of a few tenths volts have been found in the presence of the magnetic field. Also, embedded in Equation 1 is the Hall effect; when a charged species moves through a perpendicular magnetic field, a potential is generated. This potential superimposes on the applied potential and causes migration in low electrolyte concentrations.

When the electrode and magnetic field are parallel to the earth, thermal motion leads to vortical motion at the electrode surface unless the field (B) and the current density (j) are spatially invariant and mutually perpendicular (see FIG. 2). This is parameterized as:

$$F_v = c^{-1}[j \times B]. \quad (2)$$

In Equation (2) $F_v$ is the vector of magnetic force per volume and c is the speed of light. In general, these forces are smaller than Lorentz forces; flux enhancements of a few-fold and potential shifts of 10 to 20 mV are observed. Flux enhancements of paramagnetic and diamagnetic species are similar, but paramagnetic electrolytes enhance the flux of diamagnetic $Zn^{2+}$ two-fold. Vortices suppress thermal motion and eddy diffusion.

The final configuration, shown in FIG. 3, is for the magnetic field perpendicular to the electrode surface, and, therefore, parallel to the electric field. Various, and sometimes inconsistent, results are reported for several configurations: for vertical electrodes in quiescent solution, flux enhancements of $\leq 1000\%$; for electrodes parallel to the earth with forced convection, flux retardations of 10%; and for electrodes parallel to the earth and no forced convection, both enhancements and no enhancements are reported.

This summarizes the thermodynamic, kinetic, and mass transport effects for systems where the magnetic field is applied uniformly across a cell with an external magnet. None of these macroscopic effects predict or address properties dependent on the magnetic susceptibility of the redox species Quantum mechanical effects may also be important, especially on short length scales.

Fuel Cells

Since the incomplete reduction of oxygen limits the efficiency of $H_2/O_2$ solid polymer electrolyte fuel cells, the cathode must be pressurized about five-fold over the anode.

Proton exchange membrane (PEM) fuel cell design is one which employs hydrogen as an anode feed and oxygen in air as a cathode feed. These fuels are decomposed electrically (to yield water) at electrodes typically modified with a noble metal catalyst. The hydrogen and oxygen are separated from each other by a proton exchange membrane (such as Nafion) to prevent thermal decomposition of the fuels at the noble metal catalysts.

| Cathode | $O_2 + 4H^+ + 4e = 2H_2O$ | $E°_{cathode} = 1.23$ V |
|---|---|---|
| Anode | $2H^+ + 2e = H_2$ | $E°_{anode} = 0.00$ V |
| Net Reaction | $O_2 + 2H_2 = 2H_2O$ | $E°_{cell} = 1.23$ V |

However, the fuel cell is typically run under non-equilibrium conditions, and, as such, is subject to kinetic limitations. These limitations are usually associated with the reaction at the cathode.

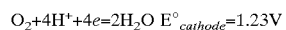
$O_2 + 4H^+ + 4e = 2H_2O$  $E°_{cathode} = 1.23$V

As the reaction at the cathode becomes increasingly kinetically limited, the cell voltage drops, and a second reaction path, the two electron/two proton reduction of oxygen to peroxide, becomes increasingly favored. This consumes oxygen in two electron steps with lower thermodynamic potential.

$O_2 + 2H^+ + 2e = H_2O_2$  $E°H_2O_2 = 0.68$V

The standard free energy of this reaction is 30% of the free energy available from the four electron reduction of oxygen to water. The decrease in current associated with the decreased number of electrons transferred and the decreased cell potential couple to yield substantially lower fuel cell power output.

One approach to enhance the efficiency of the cathodic reaction is to increase the concentration (pressure) of the feeds to the cathode—protons and oxygen—so as to enhance the flux (i.e., the reaction rate at the cathode in moles/cm²s) at the cathode. The proton flux is readily maintained at a sufficiently high value by the proton exchange membrane (usually Nafion) so as to meet the demand set by the cathode reaction. Normally, the method of enhancing the flux and biasing the reaction to favor the formation of water is to pressurize the air feed to the cathode. Pressures of 5–10 atmospheres are typical.

The need to pressurize air to the cathode in PEM fuel cells has been a major obstacle in the development of a cost effective fuel cell as a replacement for the internal combustion engine vehicle. In particular, pressurization of the cathode requires compressors. In transportation applications, power from the fuel cell is needed to run the compressor. This results in approximately 15% reduction in the power output of the total fuel cell system.

Free Radical Electrochemistry

Magnetic fields have been shown to affect heterogeneous and homogeneous electron transfer reactions in aqueous matrices. In this Chapter, we investigate magnetic effects on heterogeneous and homogeneous free radical electron transfer mechanisms in organic matrices (acetonitrile and methylene chloride). The systems investigated are all systems with diamagnetic organic reactants that undergo electron transfer reactions to form a free radical intermediate during the reaction. Because free radicals are highly reactive with multiple reaction pathways, we have not separated the homogeneous and heterogeneous electron transfer effects.

All organic free radicals have EPR g-values in the range of 1.9–2.1, values which differ substantially from the values for metal complex redox couples. Though the EPR g-values are similar for organic radicals, the hyperfine coupling constants can be quite different.

Magnetic effects of this sort has been investigated at a chemically modified electrode surface. The surface of a glassy carbon electrode is chemically modified with a composite of an ion exchange polymer and paramagnetic microspheres. Studies at these electrodes have shown that depending on the reactant, magnetic fields can increase, decrease, or have no impact on flux. In some cases morphology of the voltammogram is changed. This study shows a trend in the magnetic effects on free radicals as a function of the relative localization of spin and charge density in the molecule.

It has previously been determined that knowledge of spin density is an important part of understanding magnetic properties of and effects on paramagnetic molecules and materials. Spin and charge density are aspects of the overall spin polarization process.

Spin density is commonly thought of in the context of magnetic resonance spectroscopy as it relates to hyperfine coupling. Spin density provides clues as to the intrinsic magnetic properties of a molecule. Spin density is the probability of finding the unpaired spin localized at a particular nuclei (N). Therefore, spin density calculations provide the spin density at each atom in the free radical.

The unpaired spin density for a particular orbital with quantum number n and l can be expressed as shown in equation 3.

$$\rho(r_N) = \rho_H |\Psi_{nl}(r_N)|^2 \qquad (3)$$

where $r_N$ is the distance from the nucleus, $\rho$ is the unpaired spin density at the distance $r_N$ from the nucleus, $\Psi_{nl}$ is the wave function of the nl orbital, and $\rho_H$ is the spin density in a particular orbital. This orbital spin density is a fractional population of unpaired electrons on an atom.

Overall spin density may be represented according to equation 4.

$$\rho(r_N) = \int \psi * \sum_k 2S_{zk} \delta(r_k - r_N) \Psi \, dT \qquad (4)$$

where $S_{zk}$ is the spin in the z direction at distance k from the nuclei. The algebraic sum of the spin densities of each nuclei must equal the total spin of the molecule. For the free radical systems, the total spin is 1.0.

Hyperfine coupling constants are a function of the spin density at a given nuclei (N), as shown in equation 5.

$$a = \frac{4\pi}{3} g \beta g_N \beta_N \rho(r_N) \qquad (5)$$

The hyperfine coupling constant (a) is for a single nucleus. Total hyperfine coupling for the entire molecule is expressed in terms of the spin polarization constant (Q). Q is determined from the hyperfine coupling constants (a) and the spin density constants ($\rho(r_N)$) using the according to equation 6:

$$Q = \frac{a^H}{\rho(r_N)} \qquad (6)$$

where $\alpha^H$ is the hyperfine coupling constant for hydrogen (H), which is attached to heavy metal nucleus (N), and $\rho(r_N)$ is the spin density of the heavy metal atom (N). Heavy metal nucleus (N) is commonly a carbon, oxygen, nitrogen, or sulfur for these systems.

Charge has a measurable effect on Q. For instance, anthracene has both an anion and a cation radical form. Q for the radical anion is 25 Gauss, but Q for the radical cation is 29 Gauss. The only difference between the cation and anion radical is the charge. In order to determine the charge localized at each nuclei (N), charge density calculations are performed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is therefore an object of the invention to provide an improved electrode.

Another object of the invention is to provide a coating on an electrode to enhance the flux of magnetic species to the electrode.

Another object of the invention is to provide a separator to separate magnetic species from each other dependent upon magnetic susceptibility.

Another object of the invention is to provide a method for making a coating for an electrode to improve the flux of magnetic species to the electrode.

Another object of the invention is to provide an improved fuel cell.

Another object of the invention is to provide an improved cathode in a fuel cell.

Another object of the invention is to provide an improved battery.

Another object of the invention is to provide an improved membrane sensor.

Another object of the invention is to provide an improved flux switch.

Another object of the invention is to provide an improved fuel cell cathode with passive oxygen pressurization.

Another object of the invention is to provide an improved separator for separating paramagnetic species from diamagnetic species.

Another object of the invention is to provide an improved electrolytic cell.

Another object of the invention is to provide an improved electrolytic cell for an electrolyzable gas.

Another object of the invention is to provide an improved graded density composite for controlling chemical species transport.

Another object of the invention is to provide an improved dual sensor.

One advantage of the invention is that it can enhance the flux of paramagnetic species to an electrode.

Another advantage of the invention is that it can enhance the flux of oxygen to the cathode in a fuel cell, equivalent to passive pressurization.

Another advantage of the invention is that it can separate paramagnetic, diamagnetic, and nonmagnetic chemical species from a mixture.

Another advantage of the invention is that it can separate chemical species according to chemical, viscosity, and magnetic properties.

Another advantage of the invention is that it can take advantage of magnetic field gradients in magnetic composites.

Another advantage of the invention is that it can be designed to work with internal or external magnetic fields, or both.

One feature of the invention is that it includes a magnetically modified electrode.

Another feature of the invention is that it includes magnetic composites made from ion exchange polymers and non-permanent magnet microbeads with magnetic properties which are susceptible to externally applied magnetic fields.

Another feature of the invention is that it includes magnetic composites made from ion exchange polymers and organo-Fe (superparamagnetic or ferrofluid) or other permanent magnetic and nonpermanent magnetic or ferromagnetic or ferrimagnetic material microbeads which exhibit magnetic field gradients.

Another object of the present invention is to provide methods for making modified electrodes.

Another feature of the present invention is to provide magnetically modified electrodes and articles, such as batteries, including magnetically modified electrodes made according to the methods of the present invention. Such batteries include primary and secondary batteries. Examples of such batteries include, but are not limited to, nickel-metal hydride (Ni-MH) batteries, Ni—Cd batteries, Ni—Zn batteries and Ni—Fe batteries.

These and other objects, advantages and features are accomplished by a separator arranged between a first region containing a first type of particle and a second type of particle and a second region, comprising: a first material having a first magnetism; a second material having a second magnetism; a plurality of boundaries providing a path between the first region and the second region, each of the plurality of boundaries having a magnetic gradient within the path, the path having an average width of approximately one nanometer to approximately several micrometers, wherein the first type of particles have a first magnetic susceptibility and the second type of particles have a second magnetic susceptibility, wherein the first and the second magnetic susceptibilities are sufficiently different that the first type of particles pass into the second region while most of the second type of particles remain in the first region.

These and other objects, advantages and features are also accomplished by the provision of a cell, comprising: an electrolyte including a first type of particles; a first electrode arranged in the electrolyte; and a second electrode arranged in the electrolyte wherein the first type of particles transform into a second type of particles once the first type of particles reach the second electrode, the second electrode having a surface with a coating which includes: a first material having a first magnetism; a second material having a second magnetism; a plurality of boundaries providing a path between the electrolyte and the surface of the second electrode, each of the plurality of boundaries having a magnetic gradient within the path, the path having an average width of approximately one nanometer to approximately several micrometers, wherein the first type of particles have a first magnetic susceptibility and the second type of particles have a second magnetic susceptibility, and the first and the second magnetic susceptibilities are different.

These and other objects, advantages and features are also accomplished by the provision of a method of making an electrode with a surface coated with a magnetic composite with a plurality of boundary regions with magnetic gradients having paths to the surface of the electrode, comprising the steps of: mixing a first solution which includes a suspension of at least approximately 1 percent by weight of inert polymer coated magnetic microbeads containing between approximately 10 percent and approximately 90 percent magnetizable polymer material having diameters at least 0.5 micrometers in a first solvent with a second solution of at least approximately 2 percent by weight of ion exchange polymers in a second solvent to yield a mixed suspension; applying the mixed suspension to the surface of the electrode, the electrode being arranged in a magnetic field of at least approximately 0.05 Tesla and being oriented approximately 90 degrees with respect to the normal of the electrode surface; and evaporating the first solvent and the second solvent to yield the electrode with a surface coated with the magnetic composite having a plurality of boundary regions with magnetic gradients having paths to the surface of the electrode.

These and other objects, advantages and features are further accomplished by a method of making an electrode with a surface coated with a composite with a plurality of boundary regions with magnetic gradients having paths to the surface of the electrode when an external magnetic field is turned on, comprising the steps of: mixing a first solution which includes a suspension of at least 5 percent by weight of inert polymer coated microbeads containing between 10 percent and 90 percent magnetizable non-permanent magnet material having diameters at least 0.5 micrometers in a first solvent with a second solution of at least 5 percent of ion exchange polymers in a second solvent to yield a mixed suspension; applying the mixed suspension to the surface of the electrode; evaporating the first solvent and the second solvent to yield the electrode with a surface coated with the composite having a plurality of boundary regions with magnetic gradients having paths to the surface of the electrode when an external magnet is turned on.

These and other objects, advantages and features are also accomplished by an electrode for channeling flux of magnetic species comprising: a conductor; a composite of a first material having a first magnetism and a second material having a second magnetism in surface contact with the conductor, wherein the composite comprises a plurality of boundaries providing pathways between the first material and the second material, wherein the pathways channel the flux of the magnetic species through the pathways to the conductor.

These and other objects, advantages and features are further accomplished by an electrode for effecting electrolysis of magnetic species comprising: a conductor; and magnetic means in surface contact with the conductor for enhancing the flux of the magnetic species in an electrolyte solution to the conductor and thereby effecting electrolysis of the magnetic species.

These and other objects, advantages and features are further accomplished by an electrode for effecting electrolysis of magnetic species comprising: a conductor; and means in surface contact with the conductor for enhancing the flux of the magnetic species to the conductor and thereby effecting electrolysis of the magnetic species.

These and other objects, advantages and features are yet further accomplished by an electrode for electrolysis of magnetic species comprising: a conductor; a composite magnetic material in surface contact with the conductor, the composite magnetic material having a plurality of transport pathways through the composite magnetic material to enhance the passage of the magnetic species to the conductor and thereby effecting electrolysis of the magnetic species.

These and other objects, advantages and features are also accomplished by a system, comprising: a first electrolyte species with a first magnetic susceptibility; a second electrolyte species with a second magnetic susceptibility; and a means for channeling the first electrolyte species with a first magnetic susceptibility preferentially over the second electrolyte species with a second magnetic susceptibility, wherein the means comprises a first material having a first magnetism forming a composite with a second material having a second magnetism.

These and other objects, advantages and features are also accomplished by a system for separating first particles and second particles with different magnetic susceptibilities comprising: a first magnetic material with a first magnetism; and a second magnetic material with a second magnetism working in conjunction with the first magnetic material to produce magnetic gradients, wherein the magnetic gradients separate the first particles from the second particles.

These and other objects, advantages and features are accomplished by a composite material for controlling chemical species transport comprising: an ion exchanger; a graded density layer, wherein the ion exchanger is sorbed into the graded density layer.

These and other objects, advantages and features are further accomplished by a magnetic composite material for controlling magnetic chemical species transport according to magnetic susceptibility comprising: an ion exchanger; a polymer coated magnetic microbead material; and a graded density layer, wherein the ion exchanger and the polymer coated magnetic microbead material are sorbed into the graded density layer.

These and other objects, advantages and features are further accomplished by a composite material for controlling chemical species viscous transport comprising: an ion exchanger; a graded viscosity layer, wherein the ion exchanger is sorbed into the graded viscosity layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially perpendicular to a density gradient in the graded density layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially parallel to a density gradient in the graded density layer.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer and the staircase-like graded density layer and the ion exchanger are contained within the first side and the second side, wherein the first side is in closer proximity to the source of the chemical species and the second side is more distal to the source of the chemical species, and wherein the staircase-like graded density layer has lower density toward the first side and higher density toward the second side, substantially increasing in density in a direction from the first side toward the second side.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer, and the ion exchanger and the stair case-like graded density layer are contained within the first side and the second side, wherein the first side is in closer proximity to the source of the chemical species and the second side is more distal to the source of the chemical species, and wherein the staircase-like graded density layer has higher density toward the first side and lower density toward the second side, substantially decreasing in density in a direction from the first side toward the second side.

These and other objects, advantages and features are accomplished also by a dual sensor for distinguishing between a paramagnetic species and a diamagnetic species comprising: a magnetically modified membrane sensor; and an unmodified membrane sensor, wherein the magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species.

These and other objects, advantages and features are further accomplished by a dual sensor for distinguishing between a paramagnetic species and a nonmagnetic species comprising: a magnetically modified membrane sensor; an unmodified membrane sensor, wherein the magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic species, enabling the measurement of the concentration of at least the paramagnetic species.

These and other objects, advantages and features are further accomplished by a dual sensor for distinguishing between a first diamagnetic species and a second diamagnetic species comprising: a magnetically modified membrane sensor; and a differently magnetically modified membrane sensor; wherein the magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species.

These and other objects, advantages and features are further accomplished by a dual sensor for distinguishing between a first paramagnetic species and a second paramagnetic species comprising: a magnetically modified membrane sensor; and a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species.

These and other objects, advantages and features are further accomplished by a dual sensor for distinguishing between a diamagnetic species and a nonmagnetic species comprising: a magnetically modified membrane sensor; and an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

These and other objects, advantages and features are further accomplished by a flux switch to regulate the flow of a redox species comprising: an electrode; a coating on the electrode, wherein the coating is formed from a composite comprising: a magnetic microbead material with aligned surface magnetic field; an ion exchange polymer; and an electro-active polymer in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

These and other objects and advantages and features are also accomplished by a flux switch to regulate the flow of a chemical species comprising: an electrode; and a coating on the electrode, wherein the coating is formed from a composite comprising: a non-permanent magnetic microbead material; an ion exchange polymer; and a polymer with magnetic material contained therein in which a first form is paramagnetic and a second form is diamagnetic, wherein the flux switch is actuated by reversibly converting from the paramagnetic form to the diamagnetic form when an externally applied magnetic field is turned on and off.

These and other objects, advantages and features of the present invention are accomplished by a method for forming a magnetically modified electrode, which comprises: providing a substrate comprising a magnetic material; and forming a coating layer on said substrate, wherein said coating layer comprises particles capable of generating electrochemical energy in the presence of a magnetic field.

These and other objects, advantages and features of the present invention are accomplished by a method for forming a magnetically modified electrode, which comprises: providing a substrate; and forming a coating layer on said substrate, wherein said coating layer comprises particles capable of generating electrochemical energy in the presence of a magnetic field and magnetic particles.

These and other objects, advantages and features of the present invention are accomplished by a method for forming a magnetically modified electrode, which comprises: providing a substrate; and forming a coating layer comprising particles capable of generating electrochemical energy in the presence of a magnetic field on said substrate, wherein said method further comprises subjecting said particles to an external magnetic field before, during or after forming said coating layer.

These and other objects, advantages and features of the present invention are accomplished a magnetically modified electrode, which comprises: a substrate and a coating layer formed on said substrate, wherein said coating layer comprises particles capable of generating electrochemical energy in the presence of a magnetic field and magnetic particles.

These and other objects, advantages and features of the present invention are accomplished a magnetically modified electrode, which comprises: a magnetic substrate and a coating layer formed on said substrate, wherein said coating layer comprises particles capable of generating electrochemical energy in the presence of a magnetic field.

These and other objects, advantages and features of the present invention are accomplished a magnetically modified electrode, which comprises: a substrate and a coating layer formed on said substrate, wherein said coating layer comprises particles capable of generating electrochemical energy in the presence of a magnetic field and further wherein said particles capable of generating electrochemical energy in the presence of a magnetic field are subjected to an external magnetic field before, during or after said coating layer is formed on said substrate.

The above and other objects, advantages and features of the invention will become more apparent from the following description thereof taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 shows the influence of electrode orientation and solvent motion on magnetohydrodynamic fluid motion for one geometry.

FIG. 3 shows the influence of electrode orientation and solvent motion on magnetohydrodynamic fluid motion for a third geometry.

FIGS. 6A and 6B show the surface diffusion model including radial migration.

FIG. 19 shows a dual sensor 900 for distinguishing between a first species (particles A) and a second species (particles B).

FIG. 23 shows the spin and charge density calculation results for a methyl viologen.

FIG. 24 shows the chemical structure of benzyl viologen dication.

FIG. 26 shows the spin and charge density calculation results for benzyl viologen radical.

FIG. 29 shows the spin densities and charge densities of the semiquinone radical that were calculated using ab initio calculations.

FIG. 32 shows the spin and charge density calculation results for diphenylanthracene anion radical.

FIG. 33 shows the spin and charge density calculation results for diphenylanthracene cation radical.

FIG. 37 shows the spin and charge density calculations for dimethylanthracene anion radical.

FIG. 38 shows the spin and charge density calculations for dimethylanthracene cation radical.

FIG. 41 shows the spin and charge density calculations for anthracene anion radical.

FIG. 42 shows the spin and charge density calculation for anthracene cation radical.

FIG. 45 shows the spin and charge density calculation results of the electrochemistry of rubrene in acetonitrile.

FIG. 48 shows the spin and charge density calculations of tetracyanoquinodimethane at a Nafion modified electrode and a magnetic microsphere/Nafion modified electrode.

FIG. 51 shows the spin and charge density calculations of the electrochemistry at Nafion and magnetic microsphere/Nafion composite modified electrodes.

FIG. 54 shows the spin and charge density for thianthrene radical calculations.

FIG. 57 shows the results of FIG. 56.

DETAILED DESCRIPTION OF PREFERRED EMBODIMENTS

Interfacial Gradients in General

Figure 2:
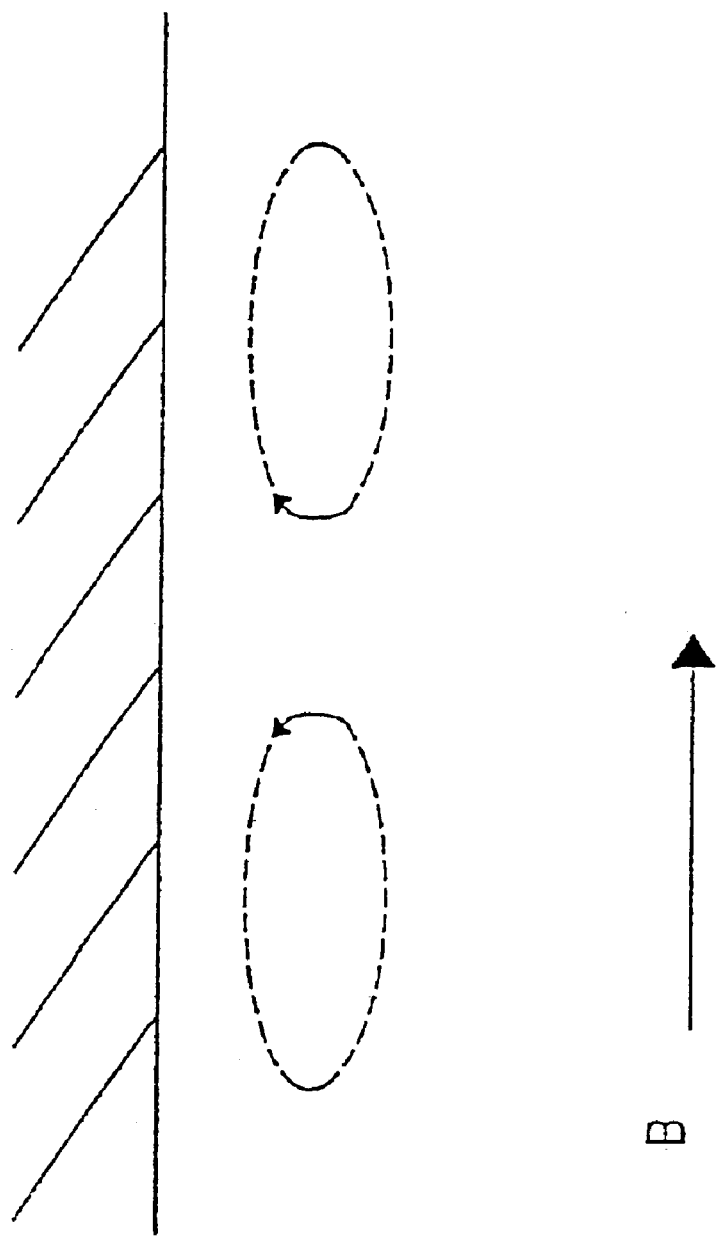
FIG. 2 shows the influence of electrode orientation and solvent motion on magnetohydrodynamic fluid motion for a second geometry.

It has been found that interfacial gradients of concentration, charge, dielectric constant, and potential tend to establish strong, interfacial forces which decay over a microstructural distance (1 to 100 nm). (For example, for an applied potential of 10 mV to 100 mV past the potential of zero charge at an electrode in 0.1 M aqueous electrolyte, the interfacial potential gradient (|electric field|) is $10^5$ V/cm to $10^6$ V/cm, but it decays over a distance of about 1 nm.) In a homogeneous matrix, with few interfaces, interfacial gradients have a negligible effect on bulk material properties. However, in a microstructured matrix where the ratio of surface area to volume is high, interfacial gradients can have a large effect on, or even dictate the properties of a composite. Models appropriate to the description of bulk materials have been found to be unsatisfactory when applied to these composites. Moreover, such composites provide an opportunity to design matrices to perform functions and exhibit properties not found in homogeneous materials as will be discussed.

The effects of gradients, associated with the interfaces between the ion exchanger and its support matrix, to enhance the transport of ions and molecules have been studied in ion exchange polymer composites. The composites were formed by sorbing ion exchange polymers into high surface area substrates with well-established geometries. The flux of solutes through the composites was determined voltammetrically. When the solute flux through the ion exchange portion of the composites and the flux through simple films of the ion exchanger were compared, flux enhancements were observed. These enhancements were often greater than an order of magnitude. Consistently, the ratio of surface area of the substrate to the volume of sorbed ion exchanger (SA/Vol) has been the critical factor in quantifying the flux enhancements. The flux enhancement characteristics were found to be dominated by the interface between the ion exchanger and the support. Several interfacial gradients have so far been identified as important: concentration gradients, leading to surface diffusion; electric potential gradients, leading to migration; and magnetic field gradients, leading to flux enhancements and electric potential shifts at electrodes.

Forming Composites

Composites were made by intimately mixing two or more components to form a heterogeneous matrix as will be discussed in more detail below. While composites retain some characteristics of their components, properties distinct from those of the starting materials have been demonstrated that make composites of special interest.

Results

The impact of microstructure on transport and selectivity in ion exchange polymers and their composites has been found to be significant. Novel characteristics arose not from the individual components of the composites, but from gradients established at the interfaces between the components. Ion exchange polymers with inherent microstructure, such as Nafion, exhibit superior transport, selectivity, and stability characteristics compared to polymers with no inherent microstructure, such as poly(styrene sulfonate). When ion exchange polymers were supported on inert substrates with microstructural (5 to 100 nm) features similar in length scale to the microstructural features of the ion exchanger (e.g., 5 nm micelles in Nafion), the structure of the ion exchanger was disrupted in an ordered manner. The relationship between the flux characteristics of the composites and the microstructure imposed by the substrates has yielded information about how microstructure contributes to the properties of ion exchangers. This relationship allows the specification of design paradigms for tailoring composites with specific transport and selectivity characteristics.

Surface Diffusion

The first composites studied were formed by sorbing Nafion into the collinear cylindrical pores of neutron track etched polycarbonate membranes. The ion exchange polymer, Nafion is a perfluorinated, sulfonic acid polymer with the following structure:

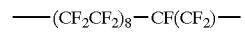

The $SO_3^-$ groups adsorb on the inert substrates to form a loosely packed monolayer of perfluorinated alkyl chains, $OCF_2CF_2OCF_3CF_2SO_3^-$, shown above in boldface. This creates a unique interfacial zone approximately 1 to 2 nm thick along the edge formed between the ion exchange polymer and the inert substrate. In systems with high ratio of surface area to volume, a large fraction of the molecules and ions which passed through these composites actually moved through this interfacial zone. That is, it was found that the molecules and ions have higher flux in this thin interfacial zone, where the interfacial fields were strongest.

Figure 4A:
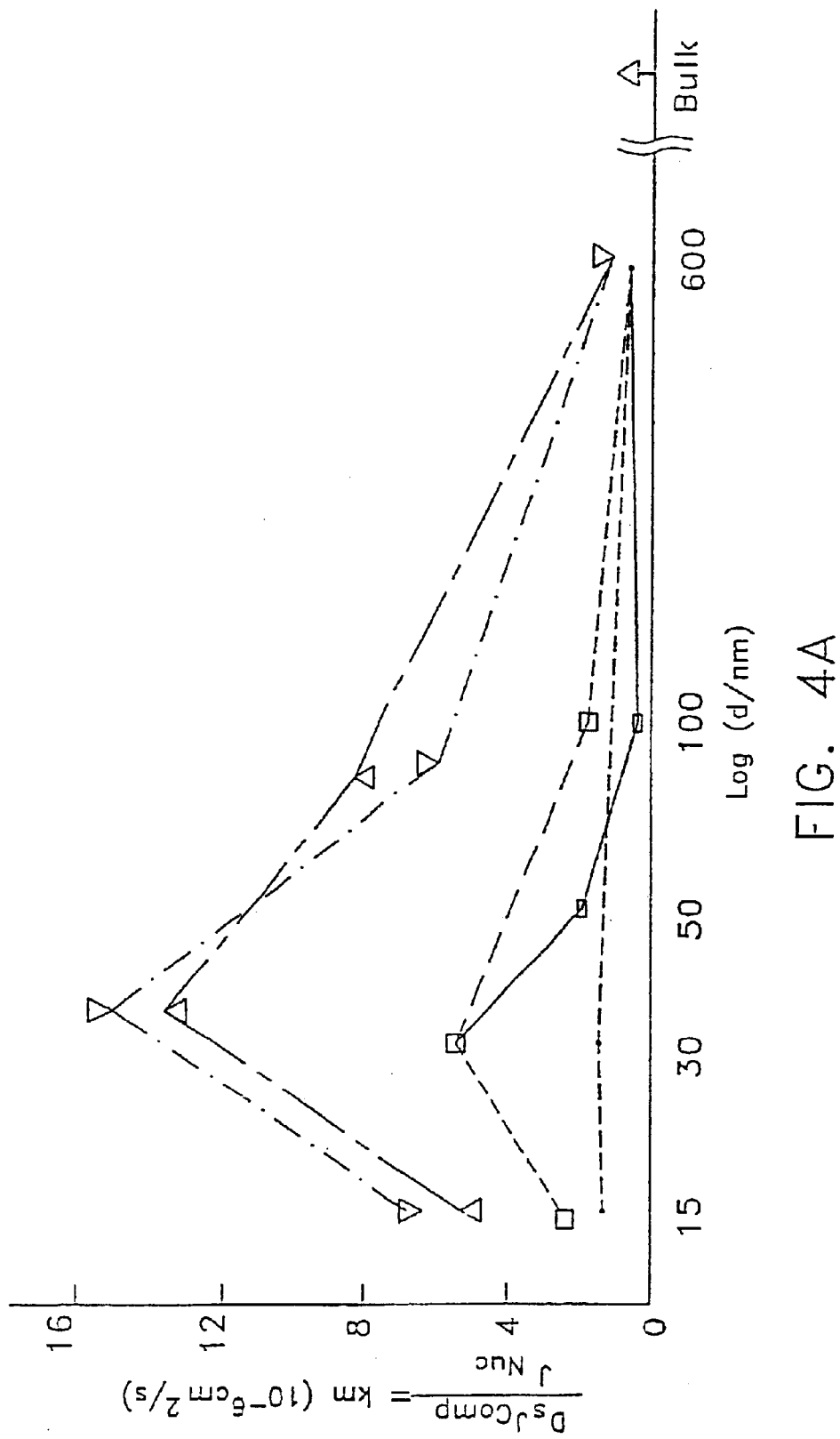
FIGS. 4A and 4B show plots of $6m$ values for neutron-track etched polycarbonate/Nafion composites versus functions of pore diameter, $d$.

In a given membrane, all pores had approximately the same diameter, d, ranging between 15 and 600 nm. The flux of electro-active species through the composites was determined by rotating disk voltammetry. In rotating disk voltammetry, the product 6m ($cm^2/s$) parameterizes the flux of a redox species through the Nafion portion of the composites, where 6 is the partition coefficient of the species into the Nafion and m ($cm^2/s$) is its mass transport coefficient. Simple Nafion films cast directly onto the electrode were also studied. The resulting plots of 6m as a function of log (d) are shown in FIG. 4A. As indicated in FIG. 4A, as the pore diameter decreased towards 30 nm, the flux through the Nafion portion increased as much as 3600% over the simple films. These studies showed that the interface between Nafion and a support matrix was pivotal in determining the flux characteristics of the composites.

Figure 4B:
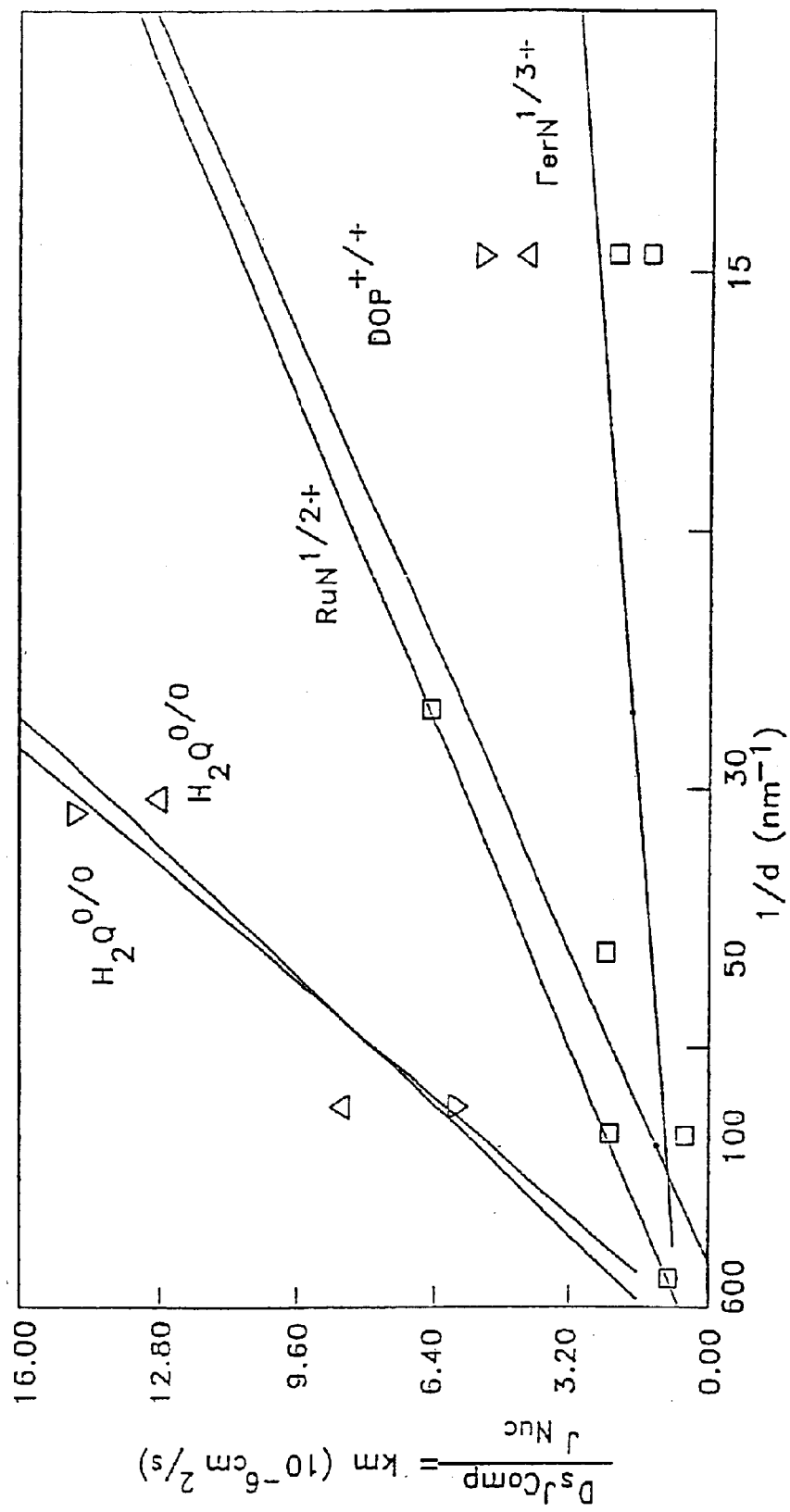

The flux enhancement model proposed here depends on the interface formed between the Nafion and the polycarbonate providing facile transport pathway to the electrode for the redox species. Bulk Nafion located in the center of the pore had a smaller transport coefficient (m) than the support matrix wall, but provided a volume to extract redox species from the center of the pore to feed the wall transport zone. The critical parameter for flux enhancement was found to be (for a cylindrical cross section path) the ratio of the surface area of the wall providing facile transport ($\pi d\lambda$), where 8 is the layer thickness, to the volume of Nafion feeding the interface ($\pi d^2\lambda/4$), i.e., 4/d. Plots of 6m versus 1/d are shown in FIG. 4B. Note that the plots are linear in FIG. 4B for d≧30 nm, and with the exception of dopamine, the intercepts as d→∞(1/d→0) correspond to 6m for bulk Nafion.

Figure 5B:
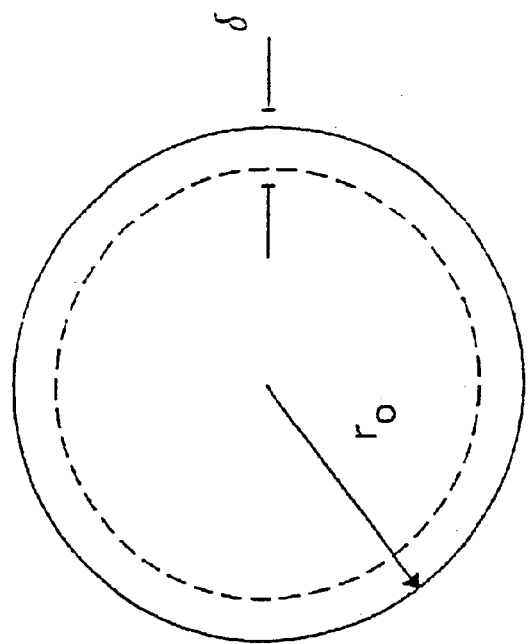
FIGS. 5A and 5B show the surface diffusion model assuming no limitations to the transport rate in the radial direction.
Figure 5A:
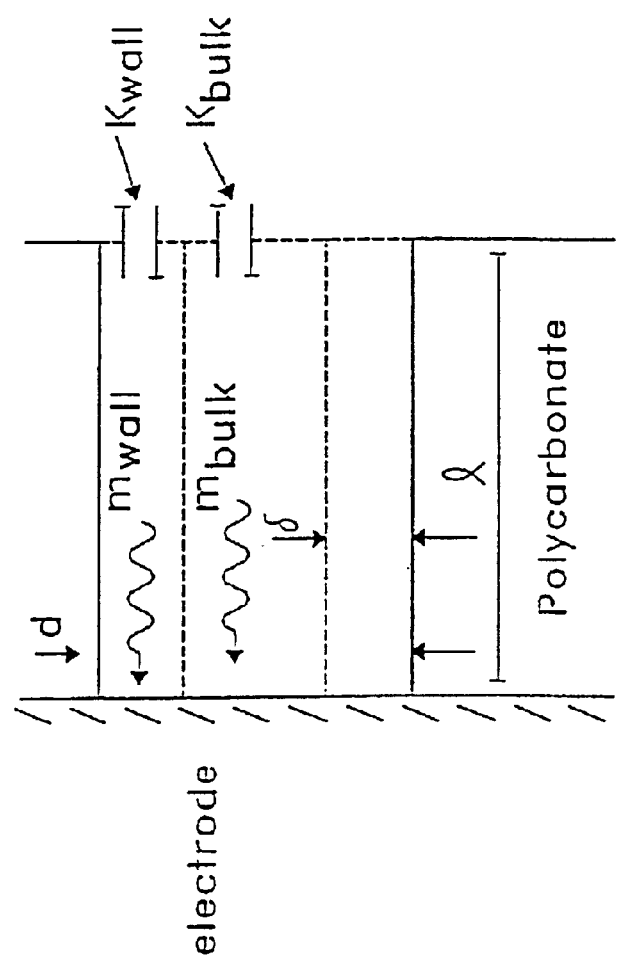

Predictive models of how interfaces and their associated concentration, field, etc. gradients dictate interface properties and function are provided below and further aid in the design of new composites tailored for specific applications. A simple surface diffusion model assuming no limitations to the transport rate in the radial direction is outlined. FIGS. 5A and 5B show the simple model where transport in the radial direction is not rate limiting. In the model $J_{comp}$ is the total flux through the composites, $J_{Nuc}$ is the flux through an empty pore, and $J_{bulk}$ and $J_{wall}$ are the fluxes in the bulk (center) of the pore and along the surface of the pore, respectively. To analyze the flux, as in FIG. 4B, $J_{bulk}$ and $J_{wall}$ must be normalized to the cross sectional area of the pore used to determine 6m, the product of the effective extraction and transport coefficients. From the final equation, the plot in FIG. 4B can be interpreted to have the slope and intercept shown in FIGS. 5A and 5B. If δ, the thickness of the interfacial zone, is taken as 1.5 nm, the values cited for $6_{wall}m_{wall}$ and $6_{bulk}m_{bulk}$ are found. The diffusion coefficients of each species in solution are also listed for comparison. In general, $6_{wall}m_{wall}\simeq(10$ to $10^2)@6_{bulk}m_{bulk}\simeq(1$ to $10)@D_{soln}$. In other words, for an interfacial zone thickness, δ, of 1.5 nm, $6_{wall}m_{wall}$ is up to one order of magnitude higher than $D_{soln}$, and one to two orders of magnitude higher than $6_{bulk}m_{bulk}$.

The interfacial transport zone occurs because of the irreversible exchange of Nafion sulfonic acid groups to polycarbonate surface sites to form a monolayer of inactive sulfonic acid groups. The side chains linking the sulfonic acid sites to the Nafion backbone form a loosely packed monolayer along the pore wall which facilitates the flux through the transport zone compared to transport through the tortuous environment of bulk Nafion. Given the length of the chains, a δ value of about 1.5 nm is consistent with $6_{wall}m_{wall}$ (and $6m/D_{soln}$) decreasing as transport is more hindered with increasing diameter of the redox species; i.e., $6_{wall}m_{wall}$ decreases as $H_2Q$ (0.6 nm)>$Ru(NH_3)_6^{3+}$(0.8 nm)>$DOP^+$(0.8 $nm^6$)>$FerN^+$(1 nm). Discrimination between these species has also been observed based on molecular shape in the neutron track-etched composites. For example, disk shaped molecules exhibit higher flux than comparably sized spherical molecules.

Radial Migration

The pore walls have a surface charge density of −0.2 $\mu C/cm^2$. For a 30 nm pore diameter composite, the corresponding charge is 0.5% of the total charge in the pore, and will have negligible effect on the number of cations extracted from the solution to move into the pore. However, the surface charge establishes a potential gradient (electric field) from the pore to the wall which tends to move positively charged ions radially outward from the center of the pore to the wall. An issue is whether this radial, interfacial potential gradient can be coupled to the concentration gradient along the wall to enhance solute flux to the electrode, as illustrated in FIGS. 6A and 6B.

The model was tested by varying the concentration of the electrolyte, nitric acid, from 0.50 to 0.01 M, for fixed dopamine concentration (2 mM). Flux was determined by rotating disk voltammetry at 400 rpm for the bare electrode and at infinite rotation rate for the modified electrodes (See Table 1). The electrolyte concentration did not dramatically affect the flux for the bare electrode, the 30 nm membrane containing no Nafion, and the Nafion film.

TABLE 1

| | Flux ($nmol/cm^2s$) for Dopamine Oxidation at Various [H+] | | | |
|---|---|---|---|---|
| $[H+]_{soln}$ | $Flux_{Film}^{Nafion}$ | $Flux_{30\,nm}$ | $Flux_{Film}^{Nafion}$ | $Flux_{30\,nm}^{Nafion}$ |
| 0.50 M | 38.6 | 54.8 | 4.2 | 2.4 |
| 0.10 M | 36.7 | 57.5 | 4.3 | 10.5 |
| 0.01 M | 44.6 | 73.1 | — | 39.0 |

However, for the 30 nm Nafion composite a fifty-fold decrease in electrolyte concentration led to >1600% increase in flux. Coupling of radial flux, driven by the interfacial potential gradient, to surface diffusion generates the enhancement. No enhancements were observed for a similar study of neutral hydroquinone. It should be noted that only charged species move by migration; dopamine is charged, while hydroquinone is not.

Since the selectivity coefficient for dopamine over protons is about 500 in Nafion, decreasing the electrolyte concentration fifty-fold only decreases the dopamine concentration by 10%. The dramatic effect produced by varying the proton concentration means that the protons, not the dopamine, compensate the wall charge to establish the interfacial potential gradient and enhance the radial flux of dopamine. This is possible because the dopamine, a cationic amine, is heavily ion paired to the sulfonic acid sites. With a dielectric constant of 20, substantial ion pairing can be anticipated in Nafion. Ion pairing may explain why the flux of cationic amines is lower than neutral hydroquinone as can be seen with reference to FIGS. 4A and 4B which show 6m values for neutron-track etched polycarbonate/Nafion composites. FIG. 4A shows 6m versus log(d), where d is the pore diameter. 6m increases above the values for bulk Nafion as d approaches 30 nm. The concentrations are 2 mM redox species and 0.1 M electrolyte for RuN+-Ruthenium (II) hexamine (□), $H_2Q$-Hydroquinone (Δ,∇), DOP+-Dopamine (○), and FerN+-Trimethylamminomethyl ferrocene (◇). The electrolyte is $H_2SO_4$ in all cases except for DOP+ and $H_2Q(\nabla)$. Lines represent no model and are only intended to indicate the trend in the data. FIG. 4B shows 6m versus $d^{-1}$, where 4 $d^{-1}$ is the surface area of the pore/volume of Nafion in the pore. As illustrated in FIGS. 6A and 6B, the slopes in FIG. 4B are indicative of the surface flux, and the intercept corresponds to the flux in bulk Nafion. Note, all the redox species except hydroquinone ate charged amines, and all have lower flux than hydroquinone.

Vapor Phase Electrochemistry/Microstructure in Two-dimensions

One way to alter microstructure is to reduce the conduction matrix from three to two-dimensions. A two-dimensional system is made by sulfonating the nonionic, polymeric insulator between the electrodes of a microelectrode assembly. Conduction across the surface cannot be studied in either an electrolyte solution or a pure solvent as the liquid provides a conductive path between the electrodes. However, by supporting the microelectrode assembly in an evacuated flask, and injecting hydrogen or hydrogen chloride and a small amount (:L) water, conduction can be studied by electrolyzing the gas. In these lower dimensional systems, the role of the ion exchange site and its concentration, as well as the role of water in ionic conduction can be studied. Preliminary studies were performed to study conduction through solvent layers adsorbed from the vapor phase across the nonionic surface of a microelectrode assembly. Electrolysis of gas phase solvents required the solvent to adsorb at greater than monolayer coverage to bridge the gap between the electrodes. Solvents with high autoprotolysis and acidity constants sustain higher currents than solvents less able to generate ions. These studies provided information about gas phase electrochemical detection and systems as well as atmospheric corrosion.

Composites Formed with Polymerized Microspheres

Figure 7A:
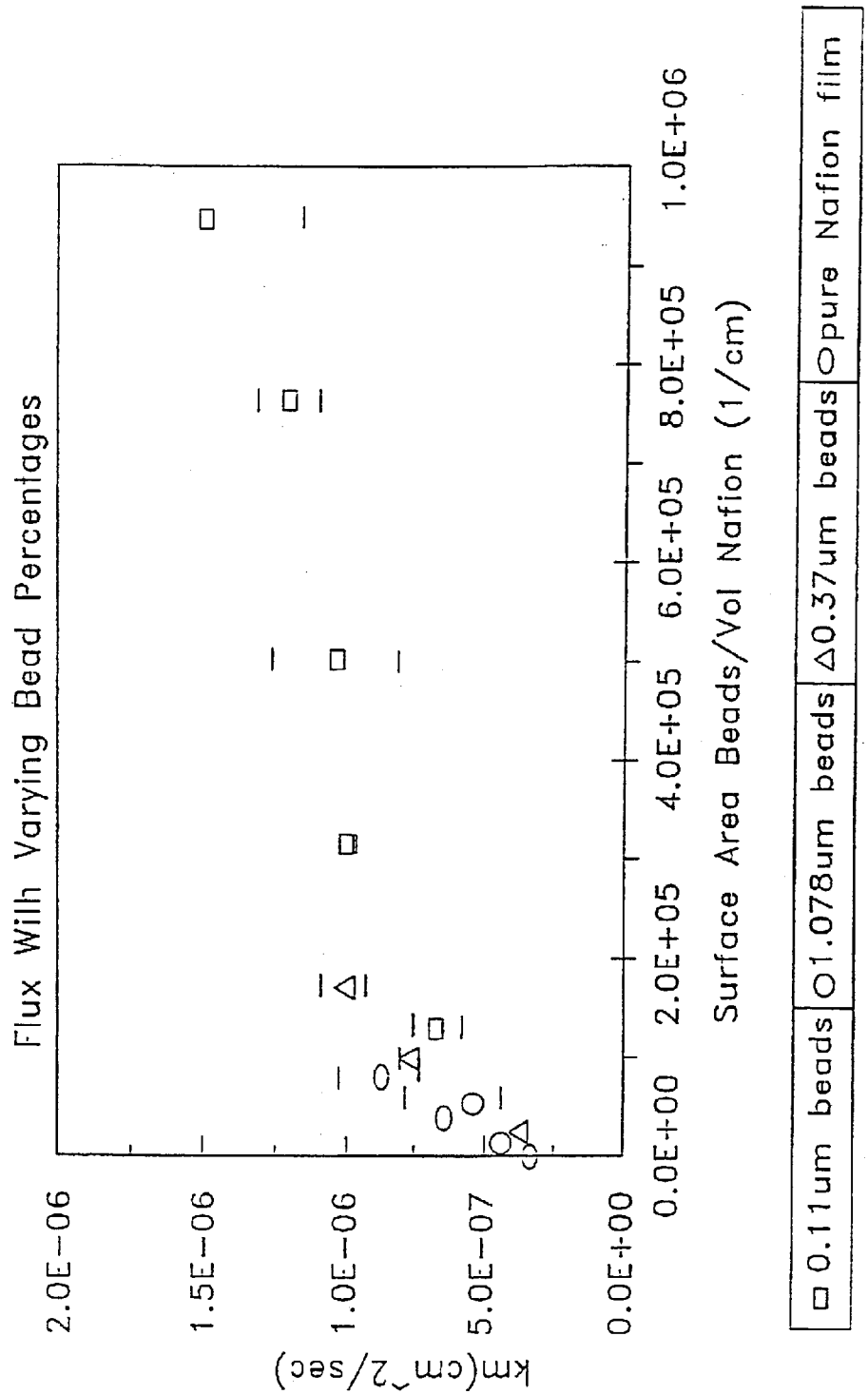
FIGS. 7A and 7B show 6m values of hydroquinone through polystyrene/Nafion composites for ratios of surface area of the microbeads to volume of Nafion.
Figure 7B:
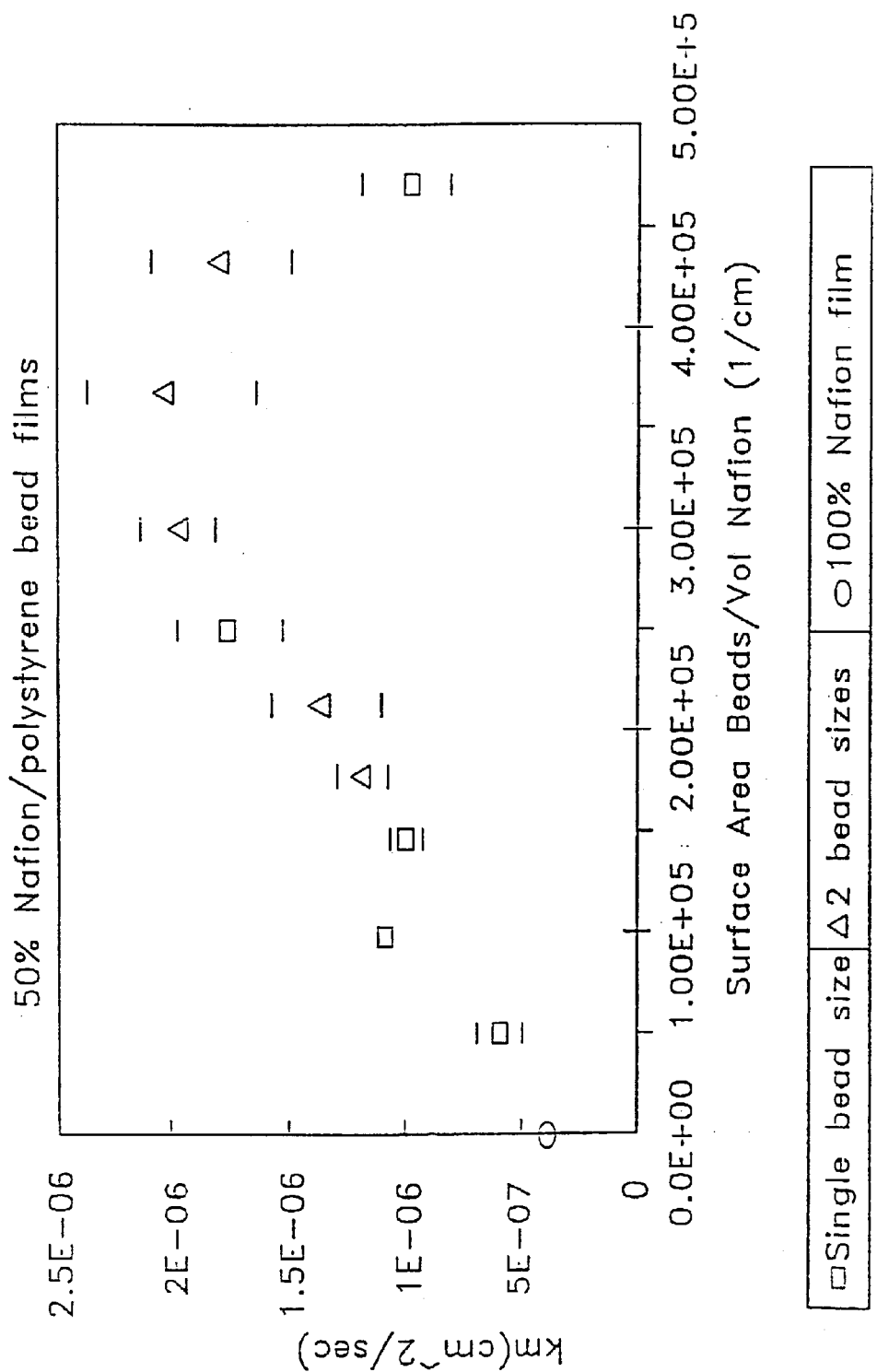

To test the generality of flux enhancement by interfacial forces, composites of Nafion and polymerized polystyrene microspheres were formed; diameters of 0.11 to 1.5 $\mu$m were used. FIGS. 7A and 7B show 6m of hydroquinone through polystyrene microbead/Nafion composites versus ratios of surface area of the microbeads to volume of Nafion. In particular, values of Km found for various ratios of bead surface area for transport to volume of Nafion for extraction (SA/Vol) are shown for three different bead diameters. As for the neutron track etched composites, linear plots were found, at least for the larger sizes, with intercepts comparable to bulk Nafion. Of these sizes, 0.37 $\mu$m beads exhibited the largest flux enhancement (600/%). FIG. 7A shows results for composites formed with single size beads, where the ratio of surface area to volume was varied by varying the volume fraction of beads in the composites. Positive slopes are shown consistent with flux enhancement by surface diffusion along the surface of the beads. The intercepts are consistent with transport through bulk Nafion.

The fraction of microspheres in the composite can be varied and different sizes mixed to allow a continuous range of SA/Vol. In particular, FIG. 7B shows results for composites for a range of SA/Vol with 50% total fraction of Nafion by volume in the film. 6m increases as SA/Vol increases to about 3.5 A10$^5$ cm$^{-1}$, analogous to 1.3 A10$^6$ cm$^{-1}$ found for the neutron track etched composites (FIG. 4A). Scanning electron micrographs of the 50% Nafion, single bead size composites showed packing of the 0.11 $\mu$m beads was different and may account for the lower 6m values found for d$^{-1}$>3.5 A10$^5$ cm$^{-1}$, where 0.11 $\mu$m beads were used. FIG. 7B shows results for composites formed with 50% Nafion by volume. The ratio of surface area to volume was varied by making composites with beads of one and two sizes. Flux increases as the ratio of surface area to volume increases to 3.5 A10$^5$ cm$^{-1}$; at the highest ratio, the composite contains 0.11 $\mu$m beads.

Figure 8:
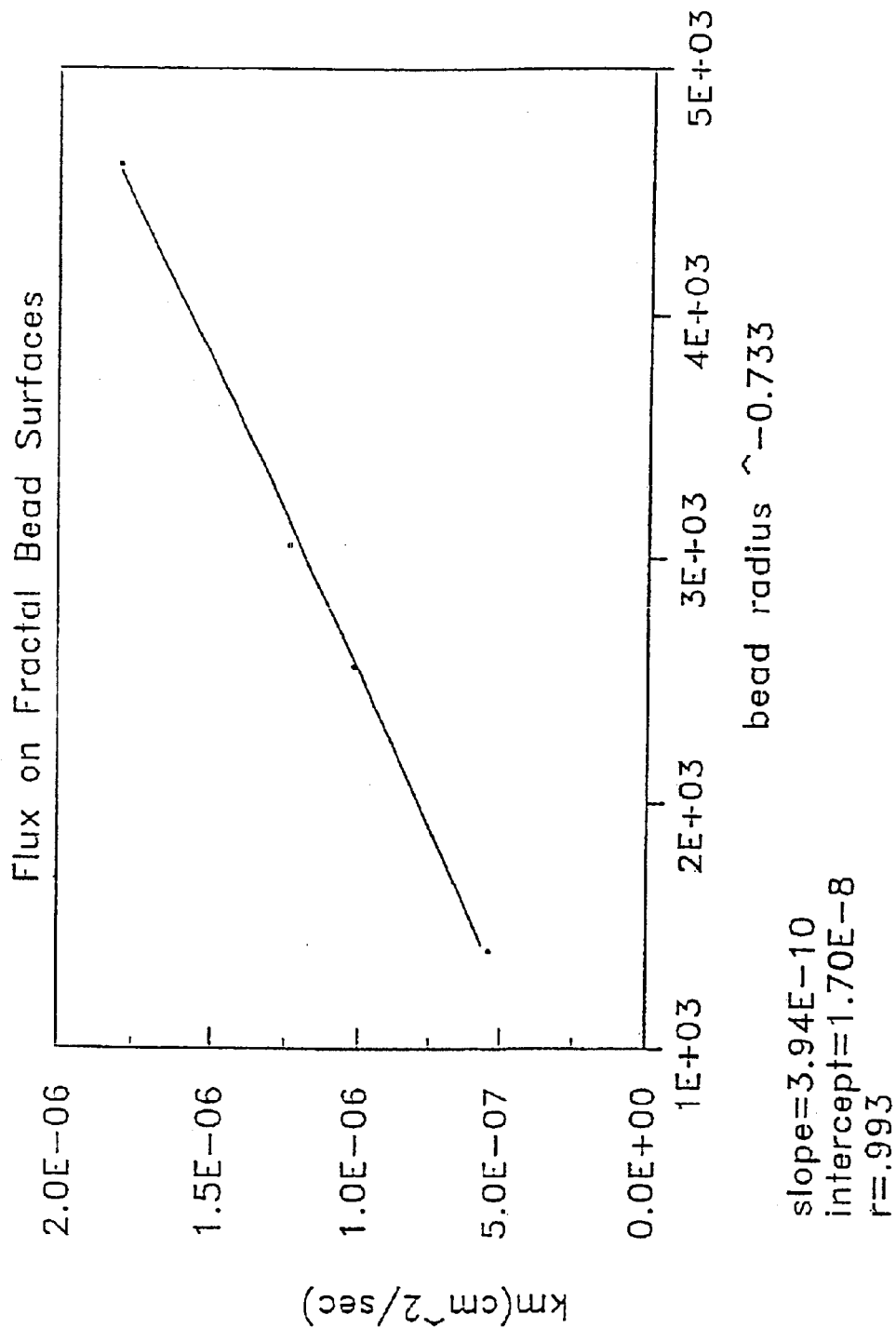
FIG. 8 shows an analysis of fractal diffusion along the surface of the microbeads in polystyrene Microbead/Nafion composites.

From the scanning electron micrographs, composites of beads larger than 0.11 $\mu$m exhibit the self-similarity typical of fractal materials. When 1n(6m) for these beads is plotted versus log(d), where d is the bead diameter, a linear plot with a slope of −0.733 was obtained; 6m versus d$^{-0.733}$ is shown in FIG. 8. For diffusion on a fractal of finitely ramified structure (e.g., the Sierpinski gasket), this is the power dependence expected for diffusion in a two-dimensional system. Thus, microbead composites exhibit transport typical of fractal diffusion along the microbead surface. This system confirms that surface diffusion provides a mechanism of flux enhancement. It also introduces the concept of fractal transport processes and the importance of surface dimensionality in ion exchange composites.

Poly(4-Vinylpyridine) Composites Formed on Neutron Track Etched Membranes

Figure 9:
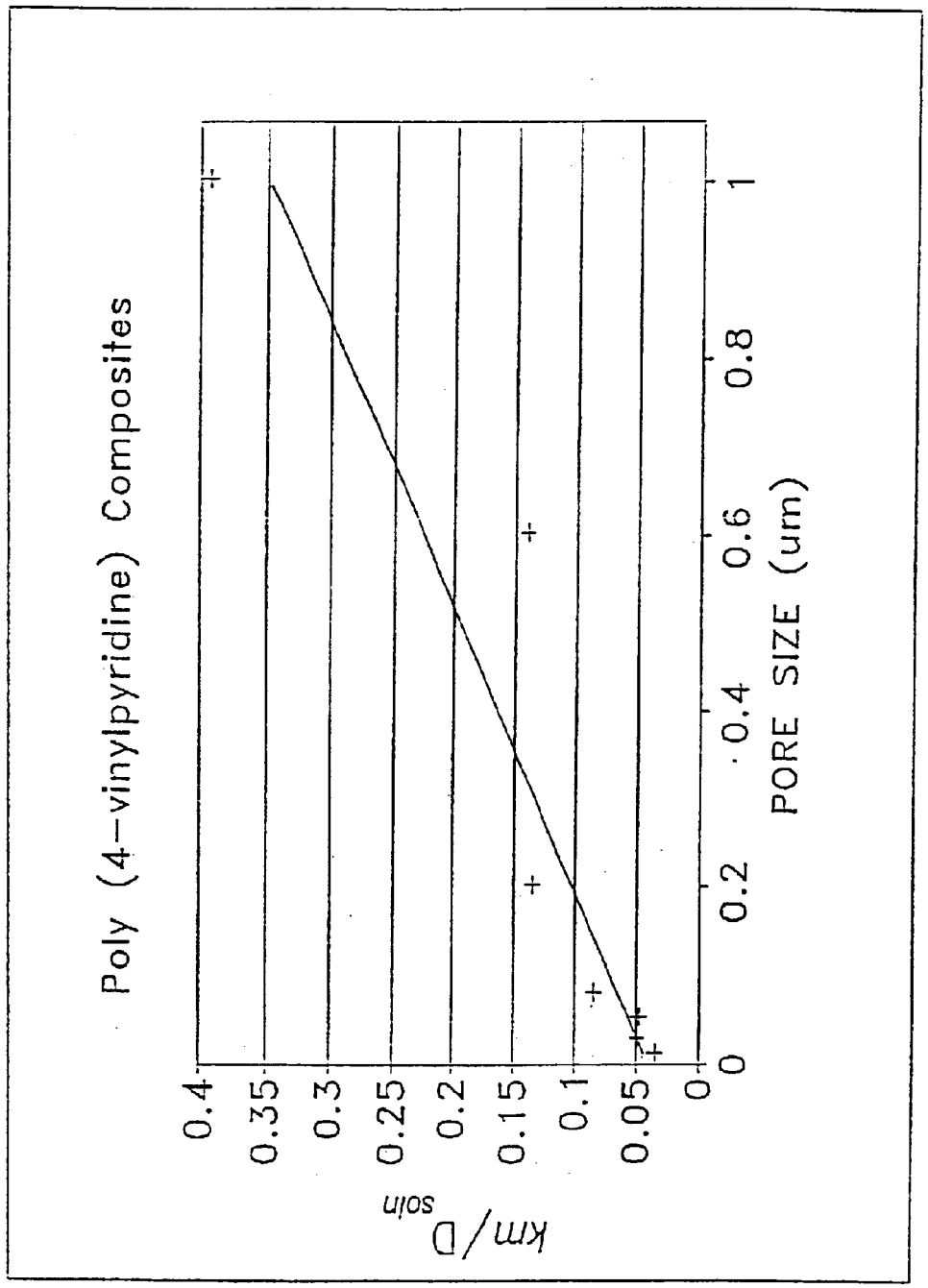
FIG. 9 shows preliminary 6m values for neutron-track etched polycarbonate/poly(4-vinylpyridine) composites.

To investigate surface diffusion in other ion exchangers, composites were formed of protonated poly(vinyl pyridine) and track etched membranes. From preliminary results, flux enhancements in these composites increased with d (volume/surface area); see FIG. 9. Such a dependency may be consistent with a transport rate which varies monotonically in the radial coordinate. Physically, a non-uniform density of PVP, produced by interaction with the wall charge, could generate a radially dependent transport rate.

Thermal Processing of Nafion

While commercial Nafion is heat cast, a process that yields inverted micelles, the vast majority of academic studies of Nafion have been performed on cold cast Nafion which produces normal micelles. A study of the mechanical properties of Nafion hot cast from organic solvents has been reported. Attempts have been made to hot cast Nafion films with microwave heating. In the highly ionic casting solution, the glass transition temperature of Nafion (105° C.) should be reached as the water evaporates. Plots of flux as a function of the time microwaved have a break at approximately 15 minutes. The flux changed by no more than a factor of three with a decrease in the flux of hydroquinone, and from preliminary studies, an increase in the flux of Ru(NH$_3$)$_6^{3+}$. This may indicate different transport mechanisms for the two species in the film. Microwaved, cold cast and commercial hot cast films have been compared.

Magnetic, Demagnetized, and Nonmagnetic Composites

Polystyrene coated, 1 to 2 $\mu$m Iron oxide (nonpermanent magnetic material) or organo-Fe (superparamagnetic or ferrofluid or permanent magnetic) microbeads are available (Bangs Labs or Polyscience) as a 1% suspension in water, and Nafion (C.G. Processing) is available as a 5% suspension in alcohol/water (other inert or active polymer coatings besides polystyrene could be employed as well, and in nonaqueous environments, it is possible to eliminate the polymer coating completely if, for example, its purpose is normally only to prevent oxidation in an aqueous environment). This discussion holds for superparamagnetic or ferrofluid or permanent magnetic or nonpermanent magnetic or ferromagnetic or ferrimagnetic material microbeads in general. This discussion also holds for other magnets and other magnetic materials which include, but are not limited to superconductors, and magnetic materials based on rare earth metals such as cobalt, copper, iron, samarium, cerium, aluminum and nickel, and other assorted metal oxides, or magnetic materials based on neodymium, e.g., magnequench, which contains iron and boron in addition to neodymium. The polymer coatings are required for use of these microbeads in an aqueous environment to prevent oxidation, but in a nonaqueous environment the polymer coating may not be required. Magnetic composites incorporating organo-Fe material microbeads are formed by casting appropriate volumes of each suspension onto an electrode centered inside a cylindrical magnet (5 cm inside diameter, 6.4 cm outside diameter, 3.2 cm height; 8 lb pull). Once the solvents evaporate and the magnet is removed, the oriented beads are trapped in the Nafion, stacked in pillars normal to the electrode surface. To minimize interbead repulsion, pillars form by stacking the north end of one bead to the south end of another; to minimize interpillar repulsion, the pillars arrange in a roughly hexagonal array. These aligned composites were formed with microbead fractions of ≤15%. Aligned composites were compared to other composites: unaligned composites—formed as above but with Iron oxide microbeads and without the magnet; nonmagnetic composites—formed with 1.5 μm nonmagnetic polystyrene beads; simple Nafion films; and demagnetized composites—aligned composites that were demagnetized. Demagnetized composites had the pillared structure, but it is not clear if they were fully demagnetized. Nonmagnetic composites had a coral-like structure (i.e., they do not form pillars). Note, composites may be formed wherein at least one component is reversibly changeable between a paramagnetic form and a diamagnetic form with, for example, a temperature variation with or without the presence of an externally applied magnetic field.

Magnetic Composites

Electrochemical Studies of Magnetic Composites

The composite was equilibrated in a solution of 1 mM electro-active species and 0.1 M electrolyte. The mass transport-limited current for the electrolysis of the redox species through the composite ($i_{meas}$), was then determined by steady-state rotating disk voltammetry at several different rotation rates (w). A plot of $i_{meas}^{-1}$ versus $w^{-1}$ yielded a slope characteristic of transport in solution, and an intercept characteristic of transport through the composite as:

$$\frac{nFA}{i_{meas}} = \frac{<^{1/6}}{0.62c^* D_{soln}^{2/3}} w^{-1/2} + \frac{l}{Km\epsilon c^*}. \quad (3)$$

In Equation (3), n is the number of electrons, F is the Faraday constant, A is the electrode area, $c^*$ and $D_{soln}$ are the concentration and diffusion coefficient of the redox species in solution, respectively, < is the kinematic viscosity, l is the composite thickness, 6 is the partition coefficient of the redox species, m is the mass transport rate of the redox species in the composite, and ε is the porosity of the composite. The partition coefficient, 6, is the ratio of the equilibrium concentration in the ion exchange portion of the composite to the solution concentration, in the absence of electrolysis. Equation (3) is appropriate for rate-limiting transport perpendicular to the electrode. This is ensured by choosing l and $D^{1/3}_{soln} w^{-1/2} <^{1/6}$ large compared to the microstructural dimensions of the composite, and is verified by the slope. Then, the composite can be treated as homogeneous with an effective 6m, and microstructural effects can be ascertained with rotating disk studies. Cyclic voltammetry yielded quantitative information for scan rates, v, sufficient to contain the transport length within the composite. For a reversible couple, the peak current, $i_{peak}$, is $$i_{peak} = 0.4463 (nF)^{3/2} [v/RT]^{1/2}, \quad (4)$$

where R is the gas constant and T is the temperature. When both rotating disk and cyclic voltammetry data are obtainable, 6 and m are separable because of their different power dependencies in Equations (3) and (4).

The flux of redox species through magnetic composites is enhanced in proportion to the absolute value of the difference in the magnetic susceptibilities of the products and reactants of the electrolysis. From cyclic voltammetry, the $\Delta E_p$ observed for reversible species, whether paramagnetic or diamagnetic, was little changed, but $E_{0.5}$ was shifted, where $E_{0.5}$ is the average of the anodic and cathodic peak potentials, and is a rough measure of the free energy of the electron transfer reaction. For a quasireversible, diamagnetic species which passed through a radical intermediate, dramatic changes in $\Delta E_p$ were found. The shifts and peak splittings were consistent with the stabilization and the concentration of the paramagnetic species. Results are summarized below.

Flux Enhancements for Paramagnetic Species

Values of 6m found by rotating disk voltammetry for diamagnetic hydroquinone and $Ru(bpy)_3^{2+}$, and paramagnetic $Ru(NH_3)_6^{3+}$ using Nafion films, nonmagnetic polystyrene microbead composites, and magnetic microbead composites are summarized in Table 2. Both bead composites contained 15% beads of 1 to 2 μm diameter; all modifying layers were 3.6 to 3.8 μm thick.

TABLE 2

| | 6m ($10^{-6}$ cm²/s) for Various Magnetic/ Nonmagnetic Species and Films | | |
|---|---|---|---|
| | 6m$_{Nafion}$ film | 6m$_{Nonmagnetic}$ | 6m$_{Magnetic}$ |
| Hydroquinone | 0.925 | 1.02 | 2.21 |
| $Ru(bpy)_3^{2+}$ | 0.290 | 0.668 | 0.869 |
| $Ru(NH_3)_6^{3+}$ | 0.570 | 1.01 | 3.80 |

In these examples, as in general, when flux of redox species through the magnetic composite was compared to flux through either Nafion films or composites formed with nonmagnetic beads, the flux was enhanced. In general, we find the flux enhancement is not dependent on whether the electrolysis is converting a diamagnetic to a paramagnetic species or a paramagnetic to a diamagnetic species, but that the enhancement increases as the absolute value of the difference in the molar magnetic susceptibility of the product and reactant.

Figure 10:
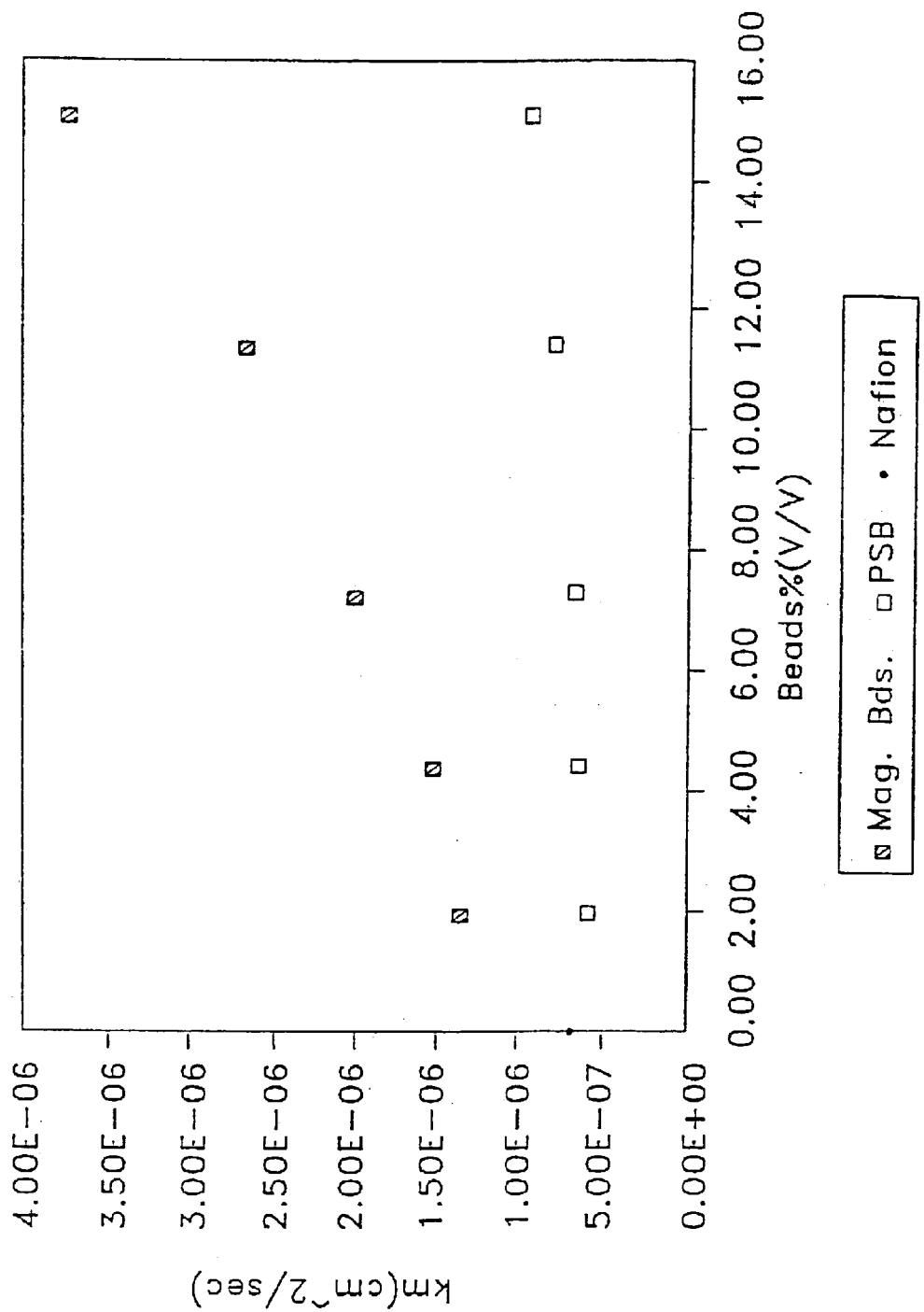
FIG. 10 shows 6m values for $Ru(NH_3)_6^{3+}$ as a function of volume fraction of microbeads in magnetic and nonmagnetic composites.

To further investigate paramagnetic ($Ru(NH_3)_6^{3+}$, 6 m values were found for magnetic and nonmagnetic composites made with various fractions of beads. Results are shown in FIG. 10. First, in FIG. 10 the flux of $Ru(NH_3)_6^{3+}$ increased strongly with the fraction of magnetic beads, but not with the fraction of nonmagnetic beads. Second, since the enhancement is not linear with the magnetic bead fraction, the enhancement was not due to either a simple concentration increase of the paramagnetic species about each bead or a simple increase in surface diffusion associated with more pillars at higher bead concentration. (Data are equally well linearized with correlation coefficient >0.99 as either In[6m] versus percent beads, or 6m versus volume of Nafion/surface area of the beads. Plots of both showed intercepts comparable to 6m for simple Nafion films.) Third, substantially higher flux was achieved with the magnetic beads than with the same fraction of nonmagnetic beads.

Magnetohydrodynamic models neither account for the discrimination between paramagnetic and diamagnetic species by the magnetic composites, nor do they predict the shape of the curve shown in FIG. 10.

Electrochemical flux of various redox species from solution-through either composites or films to the electrode surface was determined by cyclic and steady-state rotating disk voltammetry. Electrochemical flux of species through the composites is parameterized by 6 and m, where 6 is the extraction coefficient of the redox species from solution into the composite, and m (cm²/s) is its effective diffusion coefficient. For steady-state rotating disk voltammetry, the parameterization is 6m (determined from the intercept of a Koutecky Levich plot [12a]), and for cyclic voltammetry, the parameterization is $6m^{1/2}$ (extracted from the slope of peak current versus the square root of the scan rate (20 to 200 mV/s) [12b]). All measurements were made in solutions containing 1 to 2 mM redox species at a 0.45 cm² glassy carbon electrode. The electrolyte was 0.1 M $HNO_3$, except for the reduction of $Co(bpy)_3^{2+}$ (0.2 M $Na_2SO_4$) and for the oxidation of $Co(bpy)_3^{2+}$ and reduction of $Co(bpy)_3^{3+}$ (0.1 M sodium acetate/acetic acid buffer at pH=4.5). Anionic ferricyanide was not detected electrochemically through the anionic Nafion films and composites, consistent with defect-free layers. All potentials were recorded versus SCE.

First, 6m values were determined for the oxidation of paramagnetic $Ru(NH_3)_6^{3+}$ to diamagnetic $Ru(NH_3)_6^{2+}$ through magnetic and nonmagnetic composites as the bead fraction was increased. $|\Delta\chi_m|$=1,880 A10⁻⁶ cm³/moles[13]. From FIG. 10, 6 m for the nonmagnetic composites varies little with bead fraction, while 6m for the magnetic composites increases superlinearly by several fold.

Figure 11:
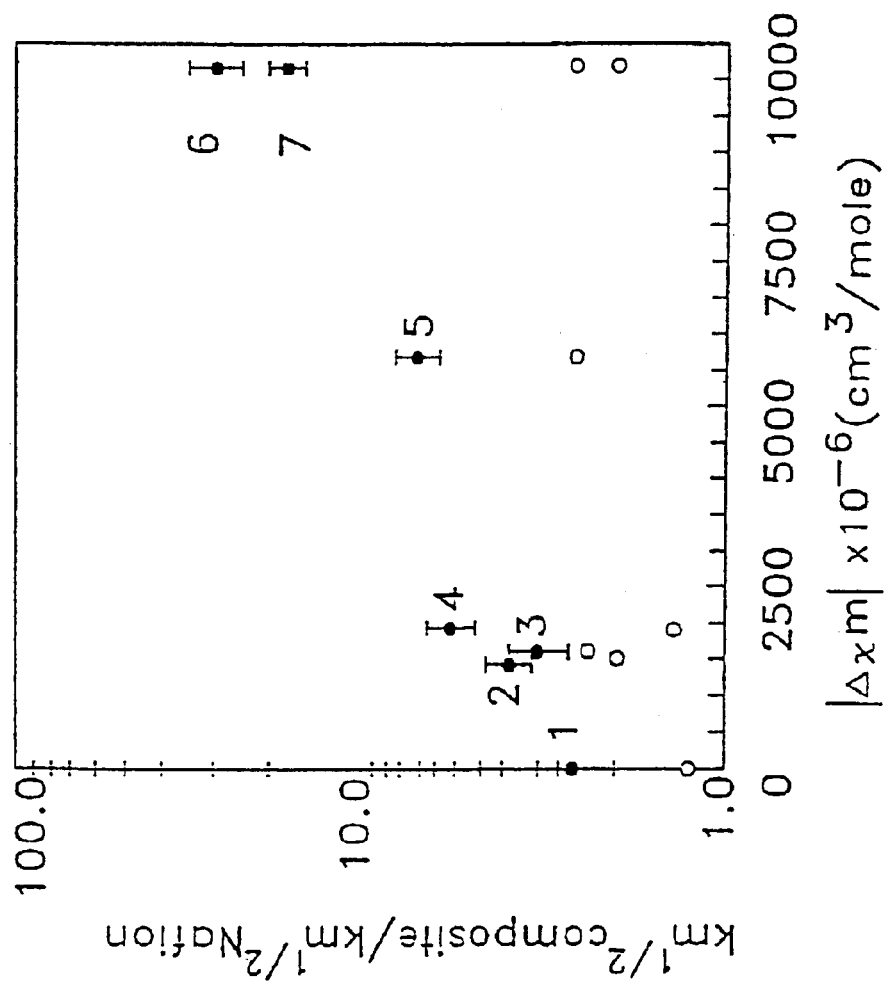
FIG. 11 shows the relative flux of redox species on the y-axis, where the maximum cyclic voltammetric current for a composite with magnetic microbeads is normalized by the maximum cyclic voltammetric current for a Nafion film containing no magnetic material, with the ratio giving the flux enhancement.

Second, $6m^{1/2}$ values were determined for various redox reactions for magnetic composites, nonmagnetic composites, and Nafion films. Exclusive of any magnetic field effects, electrochemical flux through Nafion can be altered by the size, charge, and hydrophobicity of the transported species, interaction and binding with the exchange sites, and intercalation into the hydrated and perfluoninated zones of the Nafion. To minimize effects not related to interactions between the redox moieties and the magnetic beads, $6m^{1/2}$ values for the magnetic and nonmagnetic composites are normalized by $6m^{1/2}$ for the Nafion films. The normalized $6m^{1/2}$ values are plotted in FIG. 11 versus $|\Delta\chi_m|$ for the various redox reactions [13], [14]. FIG. 11 illustrates the relative flux of redox species on the y-axis, where the maximum cyclic voltammetric current for a composite with magnetic microbeads is normalized by the maximum cyclic voltammetric current for a Nafion film containing no magnetic material. The ratio is the flux enhancement. On the x-axis is the absolute value of the difference in the molar magnetic susceptibilities of the products and reactants of the electrolysis, $|)P_m|$. The composites contain 15% magnetic microbeads and 85% Nafion by volume. The redox species are numbered as follow, where the reactant products are listed sequentially: (1) hydroquinone to benzoquinone; (2) $Cr(bpy)_3^{3+}$ to $Cr(bpy)_3^{2+}$; (3) $Ru(bpy)_3^{2+}$ to $Ru(bpy)_3^{3+}$; (4) $Ru(NH_3)_6^{3+}$ to $Ru(NH_3)_6^{2+}$; (5) $Co(bpy)_3^{2+}$ to $Co(bpy)_3^{1+}$; (6) $Co(bpy)_3^{2+}$ to $Co(bpy)_3^{3+}$; and (7) $Co(bpy)_3^{3+}$ to $Co(bpy)_3^{2+}$. All redox species are 1 mM to 2 mM. Film thicknesses are 3.6 micrometers to 3.8 micrometers. For the nonmagnetic composites, the normalized $6m^{1/2}$ values are independent of $|\Delta\chi_m|$. This suggests the normalization is effective in minimizing steric and electrostatic differences in the interactions of the various redox species with Nafion. For the magnetic composites, normalized $6m^{1/2}$ increases monotonically with $|\Delta\chi_m|$, with the largest enhancements approaching 2000%.

The logarithmic increase of electrochemical flux in FIG. 11 with $|\Delta\chi_m|$ is consistent with a free energy effect of a few kJ/mole. Effects of this magnitude have not been generated in uniform, macroscopic magnetic fields. Strong, non-uniform magnetic fields established over short distances (a few nanometers) at the interface between Nafion and magnetic microbeads could produce local effects of this magnitude. Magnetic concepts appropriate to uniform macroscopic magnetic fields and to molecular magnetic interactions are not applicable to this system, and instead, a microscopic parameterization is necessary. Establishing sufficiently strong and nonuniform local magnetic fields at interfaces in microstructured systems makes it possible to orchestrate chemical effects in micro-environments which cannot otherwise be achieved with uniform fields applied by large external magnets.

Cyclic Voltammetric Peak Splittings for Quasireversible Species

Figure 12A:
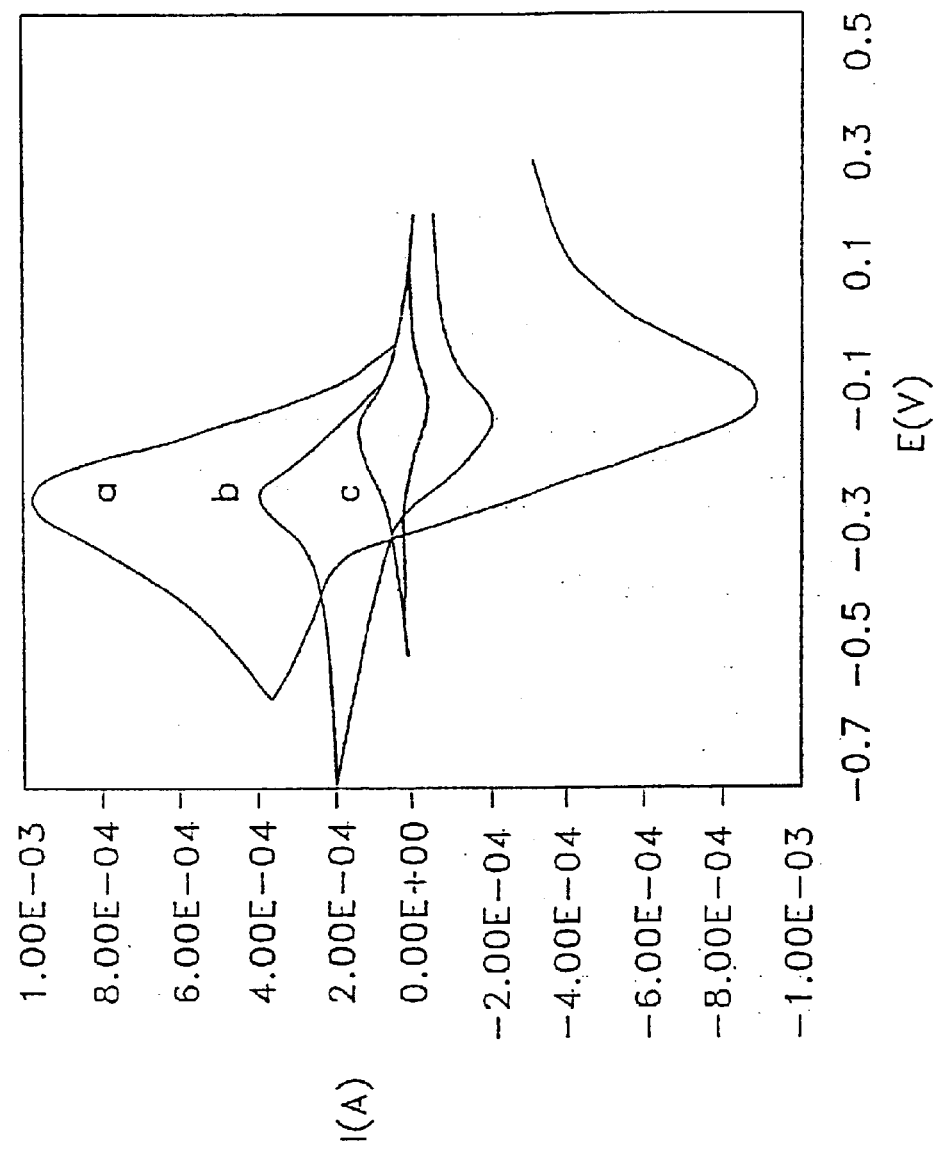
FIGS. 12A, 12B, and 12C show cyclic voltammetric results for the reversible species $Ru(NH_3)_6^{3+}$ and $Ru(bpy)_3^{2+}$ and for the quasireversible species hydroquinone.
Figure 12B:
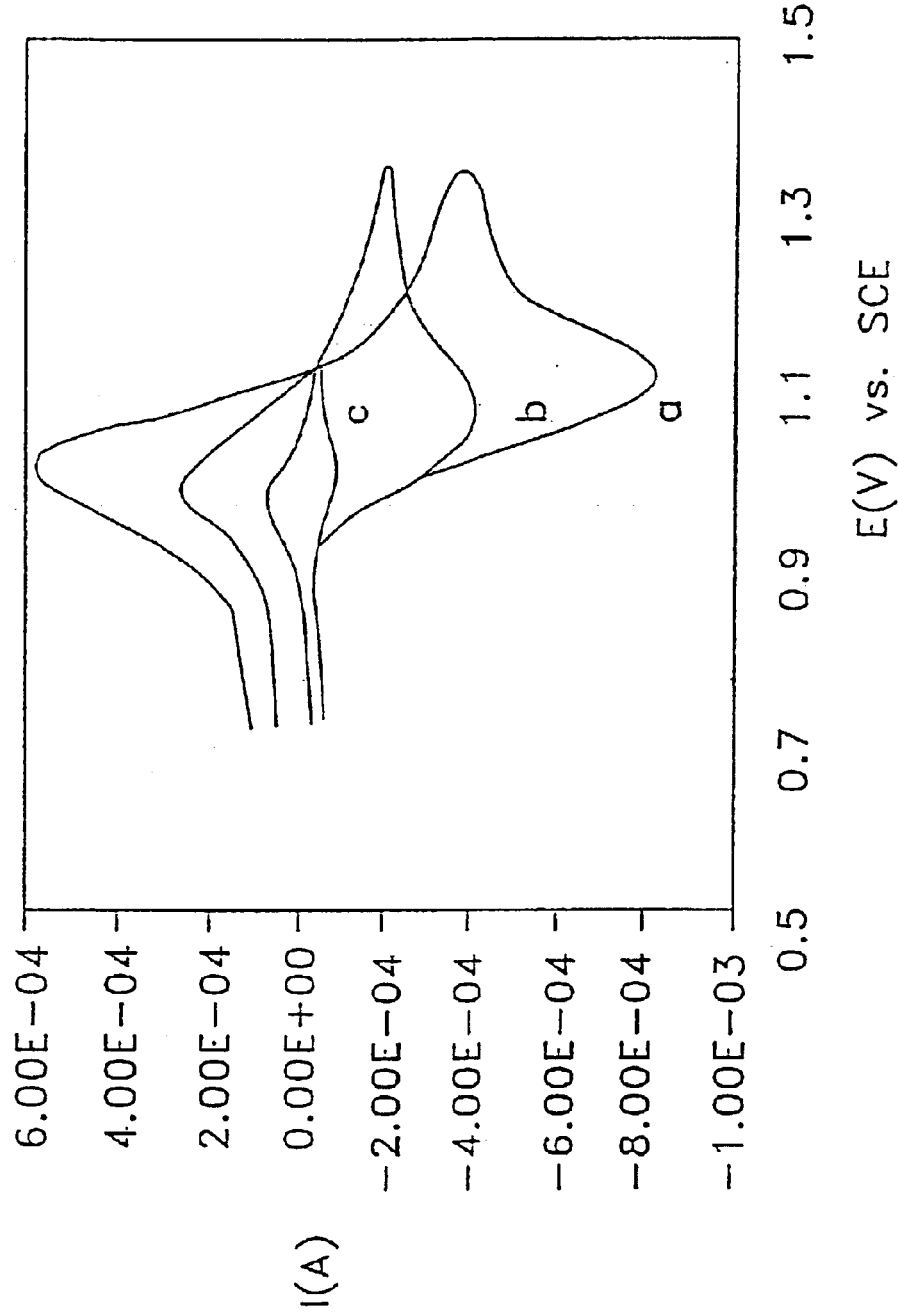

Peak splittings in cyclic voltammetry are used to determined heterogeneous electron transfer rates. FIGS. 12A and 12B show cyclic voltammetric results for the reversible species $Ru(NH_3)_6^{3+}$ and $Ru(bpy)_3^{2+}$, respectively. Cyclic voltammograms at 100 mV/s are shown for $Ru(NH_3)_6^{3+}$ (FIG. 12A) and $Ru(bpy)_3^{2+}$ (FIG. 12B) for magnetic composites, Nafion films, and the bare electrode. Cyclic voltammetric results are shown for the reduction of paramagnetic $Ru(NH_3)_6^{3+}$ in FIG. 12A. The concentration of the redox species is 1 mM, and the electrolyte is 0.1 M $HNO_3$; the reference is an SCE; and the films are 3.6 $\mu$m thick. For both species, when $E_{0.5}$ is compared for the magnetic composite and the Nafion films, the shift in $E_{0.5}$ is to positive potentials. The electron transfer kinetics for $Ru(NH_3)_6^{3+}$ are fairly strong with $k^0$>0.2 cm/s. Note that the peak splittings for the magnetic composites and Nafion film are similar, consistent with the resistance of the two layers being similar. Similar peak splittings are also observed for $Ru(bpy)_3^{2+}$, as shown in FIG. 12B. Therefore, when compared to the Nafion films, the magnetic composites have little effect on the rate of electron transfer of reversible species.

Figure 12C:
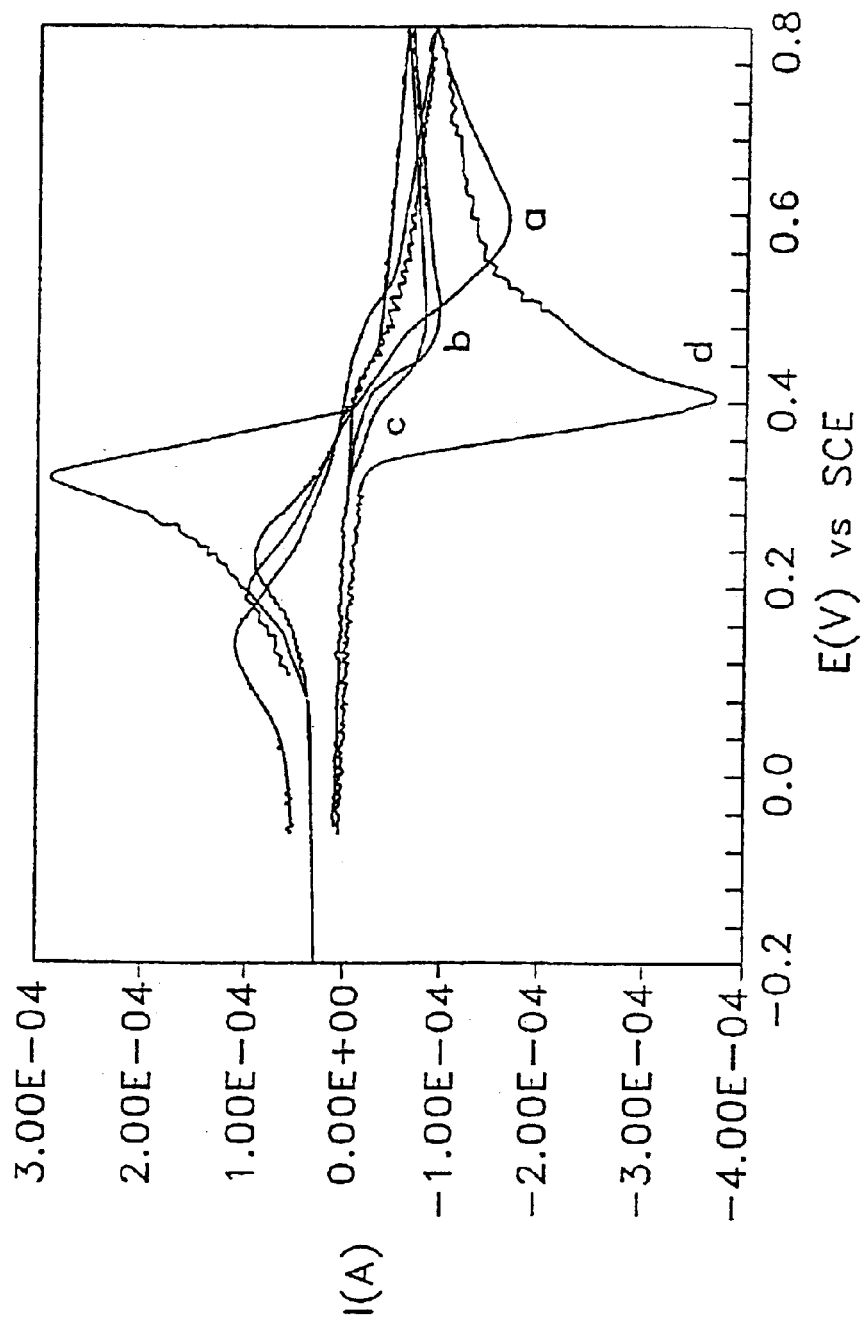

In particular, FIG. 12C shows cyclic voltammograms at 100 mV/s for 1 mM hydroquinone in 0.1 M $HNO_3$ for magnetic composites, nonmagnetic composites, Nafion films, and the bare electrode. The films are 3.6 $\mu$m thick. It is observed in the voltammogram of FIG. 12C that the peak splitting is almost doubled for the magnetic composite compared to the Nafion film. The question arises as to whether the enhanced peak splitting is consistent with the stabilization of the paramagnetic semiquinone intermediate in the two electron/two proton oxidation. In FIG. 12C, voltammograms ate shown at 0.1 V/s for hydroquinone, a diamagnetic species that undergoes quasireversible, two electron/two proton oxidation to diamagnetic benzoquinone while passing through a radical, semiquinone intermediate. The voltammograms for the Nafion film and the nonmagnetic composites are fairly similar, with $\Delta E_p$ values of 218 and 282 mV, respectively. For the magnetic composite, $\Delta E_p$=432 mV, or twice that of the Nafion film. From the results for the reversible couples above, this is not due to a higher resistance in the magnetic composites. The asymmetry in the peak shifts compared to the other three systems shown in FIG. 12C also argues against a resistance effect. (Note that the interpretation of the kinetics can be complicated by the proton concentration. However, there is no reason to think the concentration is drastically different in the magnetic and nonmagnetic composites.) The peak shift may be due to the stabilization of the paramagnetic semiquinone intermediate.

While the hydroquinone electrolysis is too complex to interpret cleanly, it does raise the interesting question of whether quasireversible electron transfer rates can be influenced by an applied magnetic field. Reversible rates will not be affected, but it is not clear what would happen with quasireversible rates. There are many quasireversible electron transfer species uncomplicated by homogeneous kinetics and disproportionation reactions which can be used to better resolve this question. If the kinetics of quasireversible processes can be influenced by magnetic fields, numerous technological systems could be improved.

Cyclic Voltammetric Peak Shifts

When magnetic composites and Nafion films were compared, voltammograms taken at 0.1 V/s for the reversible species exhibited no change in $\Delta E_p$. However, the peak potential for reduction, $E_p^{red}$, for $Ru(NH_3)_6^{3+}$ was shifted 14 mV positive. Similarly, the oxidation potential peak, $E_p^{ox}$, for $Ru(bpy)_3^{2+}$ was shifted 64 mV positive. Shifts of $E_{0.5}$ while $\Delta E_p$ is unchanged are consistent with one species being held more tightly in the composites, and thereby, having a lower diffusion coefficient. In general, a shift in potential of approximately +35 mV is observed for all reversible redox species, whether the electron transfer process converts the redox species from diamagnetic to paramagnetic or paramagnetic to diamagnetic. Larger potential shifts are observed with less reversible electron transfer processes. Shifts as large as 100 mV have been observed. (Note that for the film thicknesses used herein ($\simeq$ 3.6 $\mu$m) and a scan rate of 0.1 V/s, $m \leq 10^{-8}$ cm$^2$/s is needed for the diffusion length to be confined within the film during the sweep. Since m is not known in these systems, it is not clear whether the voltammetric results also probe behavior at the composite/solution interface.)

The above discussion further shows that interfacial gradients other than concentration and electric potential, e.g., magnetic gradients, can be exploited effectively in microstructured matrices. In composites formed with magnetic materials, locally strong (and nonuniform) magnetic fields could alter transport and kinetics. The influence of the magnetic field on species in composites may be substantial because the species are concentrated in a microenvironment, where the distance between the field source and chemical species is not large compared to the field decay length. Magnetic composites were made by casting films of polystyrene coated magnetic beads and the perfluorinated, cation exchange polymer, Nafion, onto an electrode. Approximately 1 $\mu$m diameter magnetic beads were aligned by an external magnet as the casting solvents evaporated. Once the solvents evaporated and the external magnet was removed, the beads were trapped in the Nafion, stacked as magnetic pillars perpendicular to the electrode surface.

Preliminary voltammetric studies comparing the magnetic composites to simple Nafion films yielded several interesting results. First, flux of redox species through magnetic microbead composites is enhanced compared to flux through composites formed with nonmagnetic microbeads. Second, for species which underwent reversible electron transfer (i.e., $Ru(NH_3)_6^{3+}$ and $Ru(bpy)_3^{2+}$), the cyclic voltammetric peak potential difference ($\Delta E_p$) was unaffected, but the average of the peak potentials ($E_{0.5}$) shifted consistent with the stabilization of the paramagnetic species. Third, hydroquinone oxidation was quasireversible and proceeded through paramagnetic semiquinone. For hydroquinone at 0.1 V/s, voltammograms for the magnetic composites exhibited a 40 mV positive shift of $E_{0.5}$ and a $\Delta E_p$ twice that of Nafion. The potential shifts and flux enhancements, while consistent with concentration and stabilization of the paramagnetic form of the redox couples, are as yet unexplained.

Electrochemical flux of ions and molecules through magnetic composites formed of Nafion ion exchange and polystyrene coated Iron oxide particles has been observed to be as much as twenty-fold higher than the flux through simple Nafion films. Flux enhancements have been observed with increasing difference in the magnetic susceptibility of the halves of the redox reaction.

Figure 13:
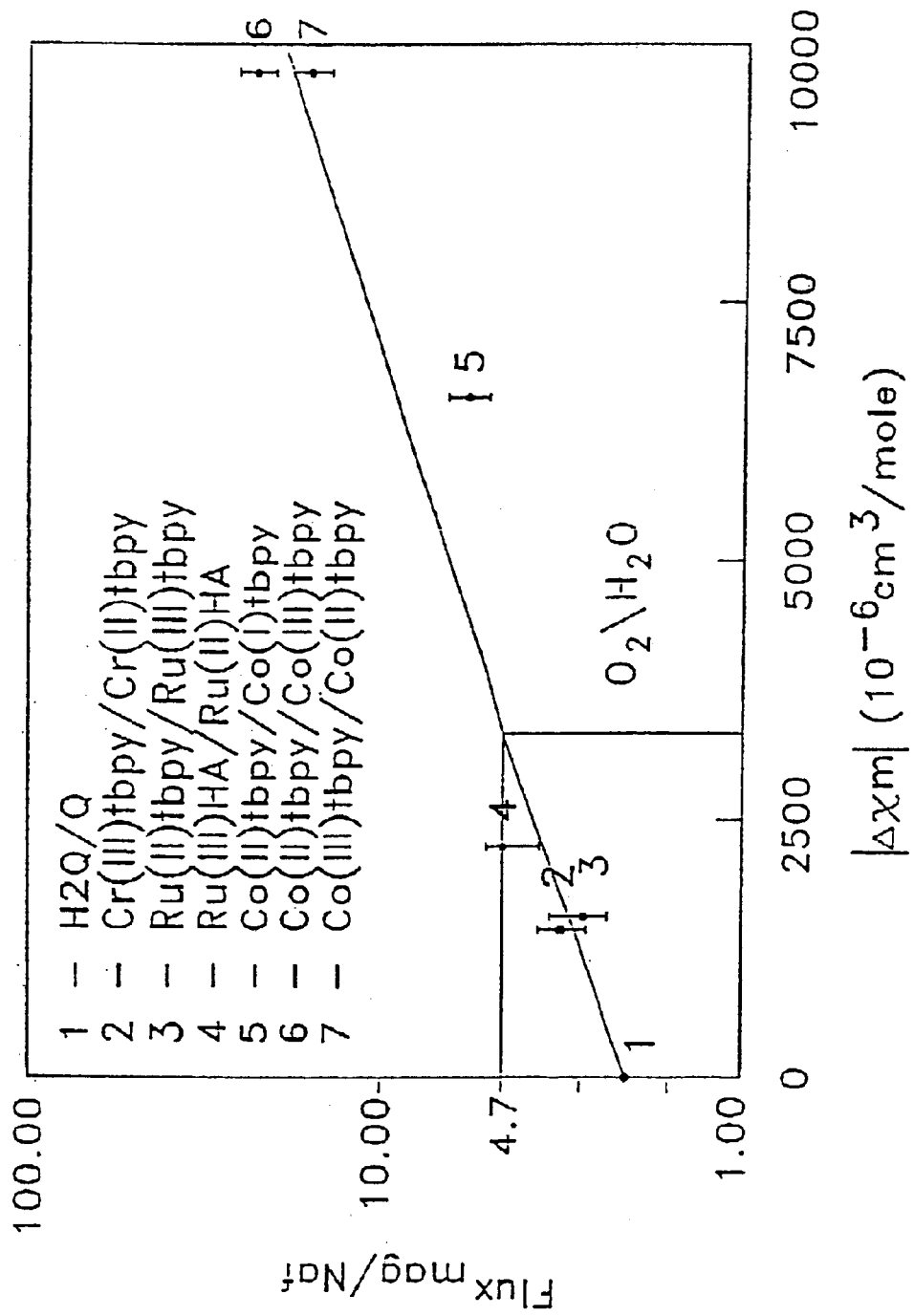
FIG. 13 shows a plot of the flux for seven redox species that is used for predicting a roughly five-fold flux enhancement of oxygen through a 15% magnetic Nafion composite over Nafion.

A passive, magnetic composite may be used to enhance the flux of oxygen at the cathode in a fuel cell. Oxygen has two unpaired electrons, and is therefore susceptible to this magnetic field in the same way as described in the experiments above. If oxygen is consistent with the observations made thus far for other ions and molecules, the electrochemical flux of oxygen to a magnetically modified cathode can be enhanced by approximately 500% as compared to a nonmagnetic cathode (FIG. 13). Such an enhancement would be comparable to that achieved by pressurization to 5 atmospheres at the cathode.

Based on the above discussion, it is possible to predict a roughly five-fold flux enhancement of oxygen through a 15% magnetic/Nafion composite over Nafion. This is understood by considering the fluxes through magnetic/Nafion composites and Nafion films of the seven redox species listed in the upper left hand corner of FIG. 13 and are the same species as listed in FIG. 11. The fluxes were determined by cyclic voltammetry. The flux ratio for magnetic composites to Nafion films is the y-axis and the absolute value of the difference in the molar magnetic susceptibilities ($|\chi_m|$) of products and reactants of the electrolysis reaction is the x-axis of FIG. 13, respectively. (The larger the value of $\chi_m$, the more susceptible a species is to interaction with a magnetic field.) From FIG. 13, the flux increases exponentially as $|\chi_m|$ increases. For the most extreme case, the flux is increased about twenty-fold. For the reduction of oxygen to water, $|\chi_m| \approx 3500$ A$10^{-6}$ cm$^3$/mole. This point on the x-axis is extrapolated to therefore suggest that the flux enhancement for oxygen in the magnetic composite will approach five-fold.

Figure 14:
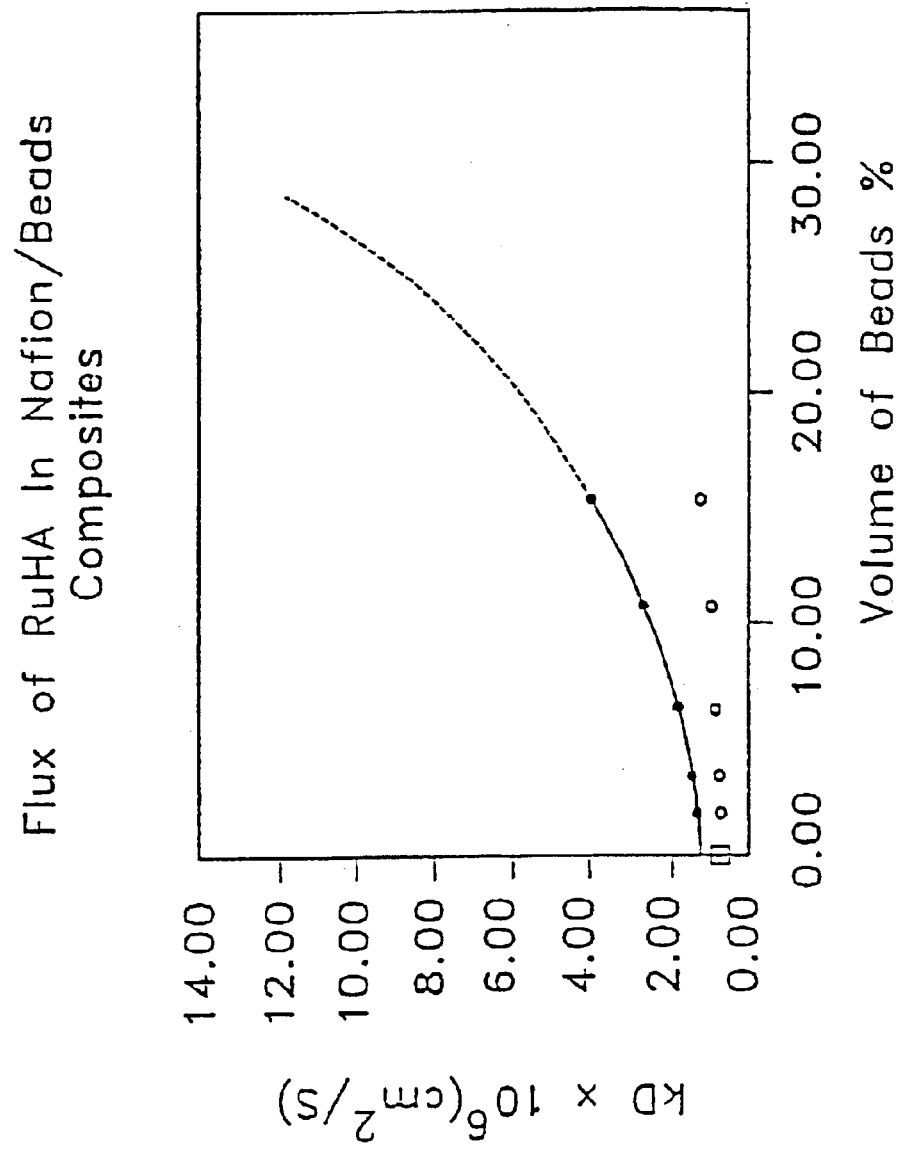
FIG. 14 shows a plot of the flux of $Ru(NH_3)_6^{3+}$ in magnetic bead/Nafion composites increasing as the fraction of magnetic beads increases.

Experiments have been conducted with Nafion composites of up to 15% Iron oxide particle beads. FIG. 14 shows a curve of the increase in flux based on the percentage of magnetic beads. The dotted line on FIG. 14 is the projected effect on flux of higher bead concentrations.

For paramagnetic species, the flux through the magnetic composites increases as the fraction of magnetic beads increases. In FIG. 14, the flux of $Ru(NH_3)_6^{3+}$ through magnetic bead/Nafion composites (●) increases as the fraction of magnetic beads in the composite is increased to 15%. Larger enhancements may be possible with higher bead fraction composites or composites formed with magnetic beads containing more magnetic material. Compared to a simple Nafion film (□), the flux is 4.4 fold larger. $Ru(NH_3)_6^{3+}$ is less paramagnetic than oxygen. For comparison, composites formed with nonmagnetic polystyrene beads (○) were examined; these exhibited no flux enhancement as the bead fraction increased. The line shown on the plot is generated as a logarithmic fit to the data for the magnetic composites. It illustrates the flux enhancement that might be found for composites formed with a higher fraction of magnetic beads. The extrapolation suggests that at 30% magnetic beads, the flux through the magnetic composites of $Ru(NH_3)_6^{3+}$ might approach twenty times its value in simple Nafion films. As oxygen is more paramagnetic than $RuNH_3)_6^{3+}$ even larger enhancements might be anticipated for oxygen.

Oxygen Susceptibility to Magnetic Composites and Magnetic Concepts

Paramagnetic molecules have unpaired electrons and are drawn into (aligned by) a magnetic field (i.e., a torque will be produced; if a magnetic field gradient exists, magnetic dipoles will experience a net force). Radicals and oxygen are paramagnetic. Diamagnetic species, with all electrons paired, are slightly repelled by the field; most organic molecules are diamagnetic. (Metal ions and transition metal complexes are either paramagnetic or diamagnetic.) How strongly a molecular or chemical species responds to a magnetic field is parameterized by the molar magnetic susceptibility, $P_m$ (cm$^3$/mole). For diamagnetic species, $P_m$ is between $(-1$ to $-500) \text{A} 10^{-6}$ cm$^3$/mole, and is temperature independent. For paramagnetic species, $P_m$ ranges from 0 to +0.01 cm$^3$/mole, and, once corrected for its usually small diamagnetic component, varies inversely with temperature (Curie's Law). While ions are monopoles and will either move with or against an electric field, depending on the sign of the potential gradient (electric field), paramagnetic species are dipoles and will always be drawn into (aligned in) a magnetic field, independent of the direction of the magnetic vector. A net force on a magnetic dipole will exist if there is a magnetic field gradient. The magnetic susceptibilities of species relevant to this proposal are summarized below.

TABLE 3

| Molar Magnetic Susceptibilities, $P_m$ | | |
|---|---|---|
| Species | Temperature (K) | $P_m$(10$^{-6}$cm$^3$/mole) |
| O$_2$ | 293 | 3449 |
| H$_2$O | 293 | −13 |
| H$_2$O$_2$ | — | −18 |

Magnetic field effects were observed in electrochemical systems. Because electrochemistry tends to involve single electron transfer events, the majority of electrochemical reactions should result in a net change in the magnetic susceptibility of species near the electrode. Little has been reported, however, in electrochemistry on magnetic fields. What has been reported relates to magnetohydrodynamics. Magnetohydrodynamics describes the motion of the charged species (i.e., an ion) perpendicular to the applied magnetic field and parallel to the applied electric field(Lorentz force). In the composites described herein, the magnetic field, the direction of motion, and the electric field were all normal to the electrode. Because magnetohydrodynamics (see FIGS. 1–3) does not predict a motion dependence on the magnetic susceptibility of the moving species and requires that all the field and motion vectors are perpendicular (i.e., for magnetic effects), the effects described here are unlikely to be macroscopic magnetohydrodynamic effects.

Graded Density Composites

The following protocol is used to form density layers on electrodes with the density layers parallel to the electrode surface or other surface: A solution of a copolymer of sucrose and epichlorhydrin (commercially available as Ficoll and used to make macroscopic graded density columns for separations of biological cells by their bouancy) are made in water at concentrations varying from a few percent to 50% by weight. The viscosity of the solution is a monotonic function of the weight percent polymer. Small volumes of polymer solution (5 to 100 microliters) are pipetted onto to an electrode surface and the electrode spun at 400 rpm for two minutes; this creates a single polymer layer. By repeating this process with polymer solutions of different concentrations, a graded interface with density and viscosity varied as a function of the composition of the casting solution can be created. The thickness of each step in the staircase structure depends on the number of layers cast of a given concentration, and can range from 200 nm to several micrometers.

A similar structure with graded layers of ion exchange sites in ion exchange polymers can be formed by (1) spin casting a mixture of density gradient polymer and ion exchange polymer on the electrode or other surfaces as described above; (2) forming a density graded layer of density polymer first, and then adsorbing the ion exchange polymer into the matrix; (3) spin coating layers of ion exchange polymers on surfaces from solution of different concentrations. It should be possible to cast such layers, and then peel them off surfaces to form free standing films. Such films would have utility in controlling solvent transport across electrochemical cells, including fuel cells.

A protocol is proposed to form density layers on electrodes with the density layers perpendicular to the electrode surface or other surface. Electrodes and surfaces can be envisioned in which more than one gradient is established on the surface for purposes of separating molecules in more than one spatial and temporal coordinate and by more than one property. One example is to form composites with a magnetic gradient in one coordinate and a density gradient in the other. These materials could be formed by creating a magnetic gradient perpendicular to the electrode surface by placing magnetic beads on an electrode or surface and allowing the composite to be cast in a nonuniform field, where the external magnet is aligned so the beads are on the surface but not in columns perpendicular to the surface. A density payer could be cast (as opposed to spun coat) by pipetting small volumes of different concentration of density gradient polymer and/or ion exchange polymer and allowing the solvents to evaporate, thereby building up a graded layer parallel to the electrode surface. Once the entire layer is cast, the external magnet can be removed if the magnetic material is superparamagnetic, and left in place if the magnetic material is paramagnetic.

These would be fairly sophisticated composites, and complex to understand, but unusual flux enhancements and separations should be possible in several dimensions. It should be possible to design even more complex structures than these.

Modified Ion Exchangers

The surface of the magnetic microbeads have ion exchange groups on them which would allow ready chemical modification, e.g., like coating with a magnetically oriented liquid crystal for a local flux switch. Examples of such modified structures may have use in the quest to build microstructured devices and machines.

Applications

General Applications

Figure 15A:
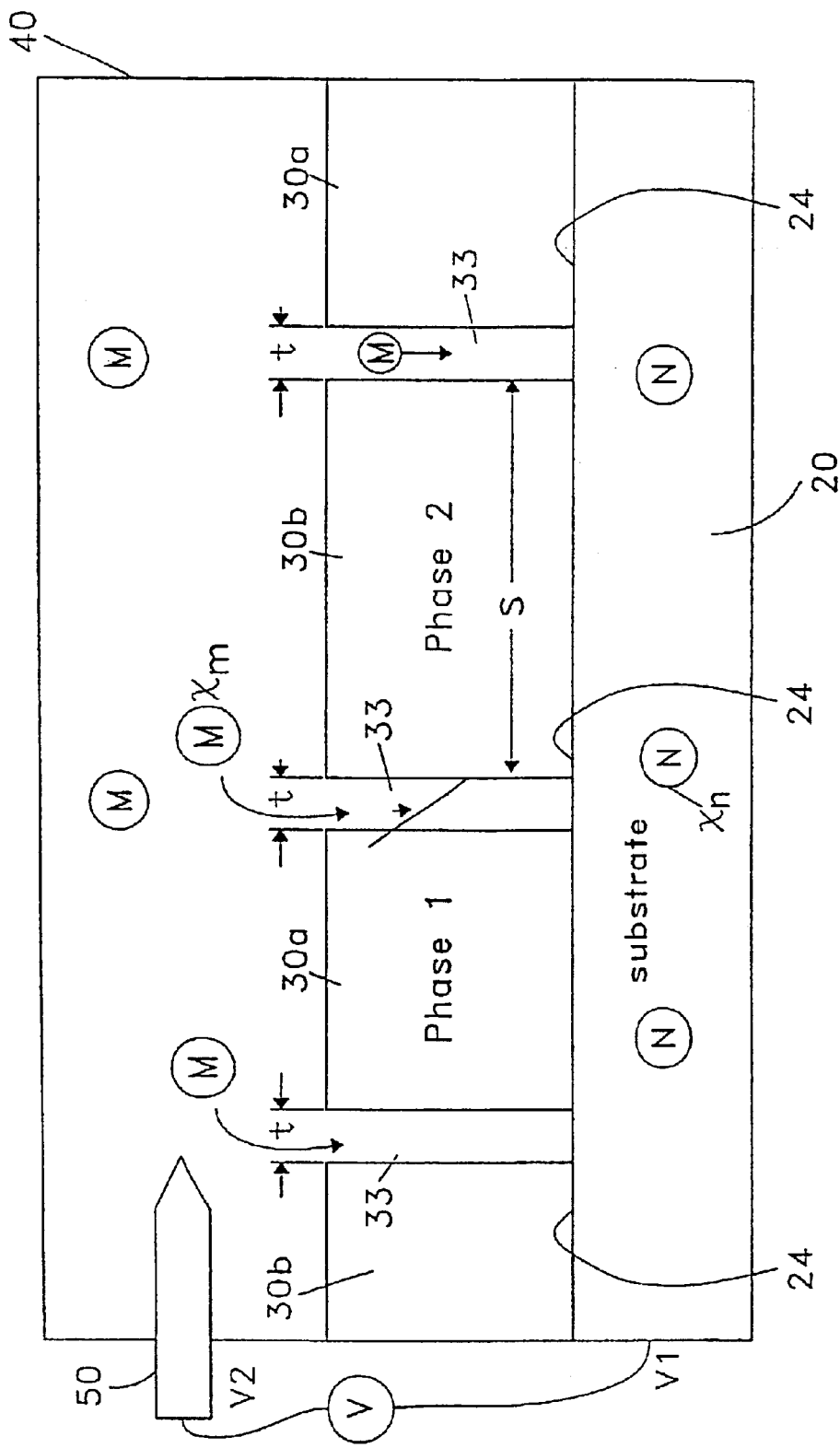
FIG. 15A shows a simplified representation used to describe how magnetic microboundaries influence a standard electrochemical process.

FIG. 15A shows a simplified representation which will be used to describe how magnetic microboundaries 10a, 10b 10c influence a standard electrochemical process. Here, a substrate 20 with a surface 24 serves as a conductor and hence can electrically conduct like a metal, a semiconductor or a superconductor. Substrate 20 is maintained at a first potential V1. Two different phases of materials 30a and 30b have two different magnetic fields, i.e., are in two different magnetic phases, phase 1 and phase 2 and are applied to surface 24 of substrate 20. Since materials 30a and 30b have different magnetic fields, boundary regions 33 have magnetic gradients. Boundary regions 33 are not necessarily sharp or straight, but the magnetic field of material 30a smoothly changes into the magnetic field of material 30b according to electromagnetic boundary conditions. Therefore, width t represents an average width of boundaries 33. Width t should be approximately between a few nanometers to a few micrometers and preferably between one nanometer and approximately 0.5 micrometers. Boundary regions 33 are separated from each other by varying distances and S represents the average of these distances. The effect of varying distances S will be described below.

Particles M have a magnetic susceptibility $\chi_m$ and are in an electrolyte 40 which is at a potential V2 due to an electrode 50. This makes a potential difference of V between electrolyte 40 and substrate 20 (substrate 20 can effectively act as a second electrode). Boundary regions 33 are paths which can pass particles M. Particles M are then either driven electrically or via a concentration gradient toward substrate 20. Once particles M reach substrate 20, they either acquire or lose electrons, thereby turning into particles N with magnetic susceptibility $P_n$. The absolute value of the difference between the magnetic susceptibilities of phase 1 and phase 2 is a measure of the magnitude of the magnetic gradient in region 33 and will be referred to as the magnetic gradient of boundary region 33. It will be shown below that the flux of particles M increases approximately exponentially with respect to increasing the magnetic gradient of boundary region 33 with materials 30a and 30b when compared to the flux without materials 30a and 30b. This increase in flux can be over a factor of 35-fold or 3500% resulting in significant improvements in efficiency of many electrochemical processes.

Specific examples of electrochemical systems where magnets might improve an electrochemical cell or process include: chloralkali processing, electrofluoridation, corrosion inhibition, solar and photocells of various types, and acceleration of electrochemical reactions at the electrode and in the composite matrix. Potential shifts of $E_{0.5}$ are always observed and suggest an energy difference is generated by the magnetic fields and gradients in the composites; generically, this could improve performance of all electrochemical energy devices, including fuel cells, batteries, solar and photocells. In other application, sensors, including dual sensors for parametric species; optical sensors; flux switching; and controlled release of materials by control of a magnetic field, including release of drugs and biomaterials. There may also be applications in resonance imaging technology.

Boundaries 33 do not have to be equally spaced and do not have to have equal widths or thicknesses t. Materials 30a and 30b can be liquid, solid, gas or plasma. The only restriction is that a boundary 33 must exist, i.e., materials 30a and 30b must have two different magnetic fields to create the magnetic gradient within the width t. Magnetic gradient of region 33 can be increased by (1) increasing the magnetic content of the microbeads; (2) increasing the bed fraction in the composite; (3) increasing the magnetic strength of the beads by improving the magnetic material in the beads; and (4) enhancing the field in the magnetic microbeads by means of an external magnet. In general, the flux of particles M and N is correlated with magnetic susceptibility properties, $P_m$ and $P_n$. The above phenomena can be used to improve performance of fuel cells and batteries.

Figure 15B:
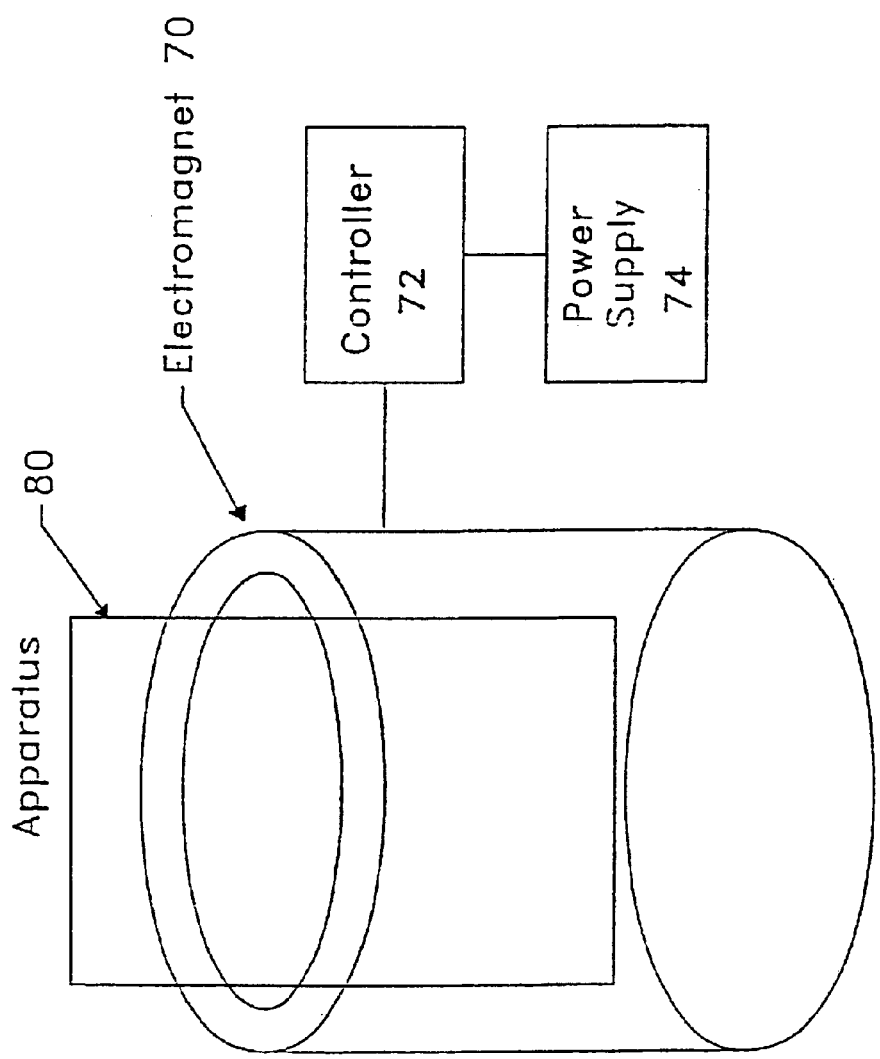
FIG. 15B shows a simplified representation of embodiments of the invention placed in an externally applied magnetic field provided by an electromagnet to alter the magnetic properties of those embodiments, where the field may be turned on or off, or it may be oscillated.
Figure 16:
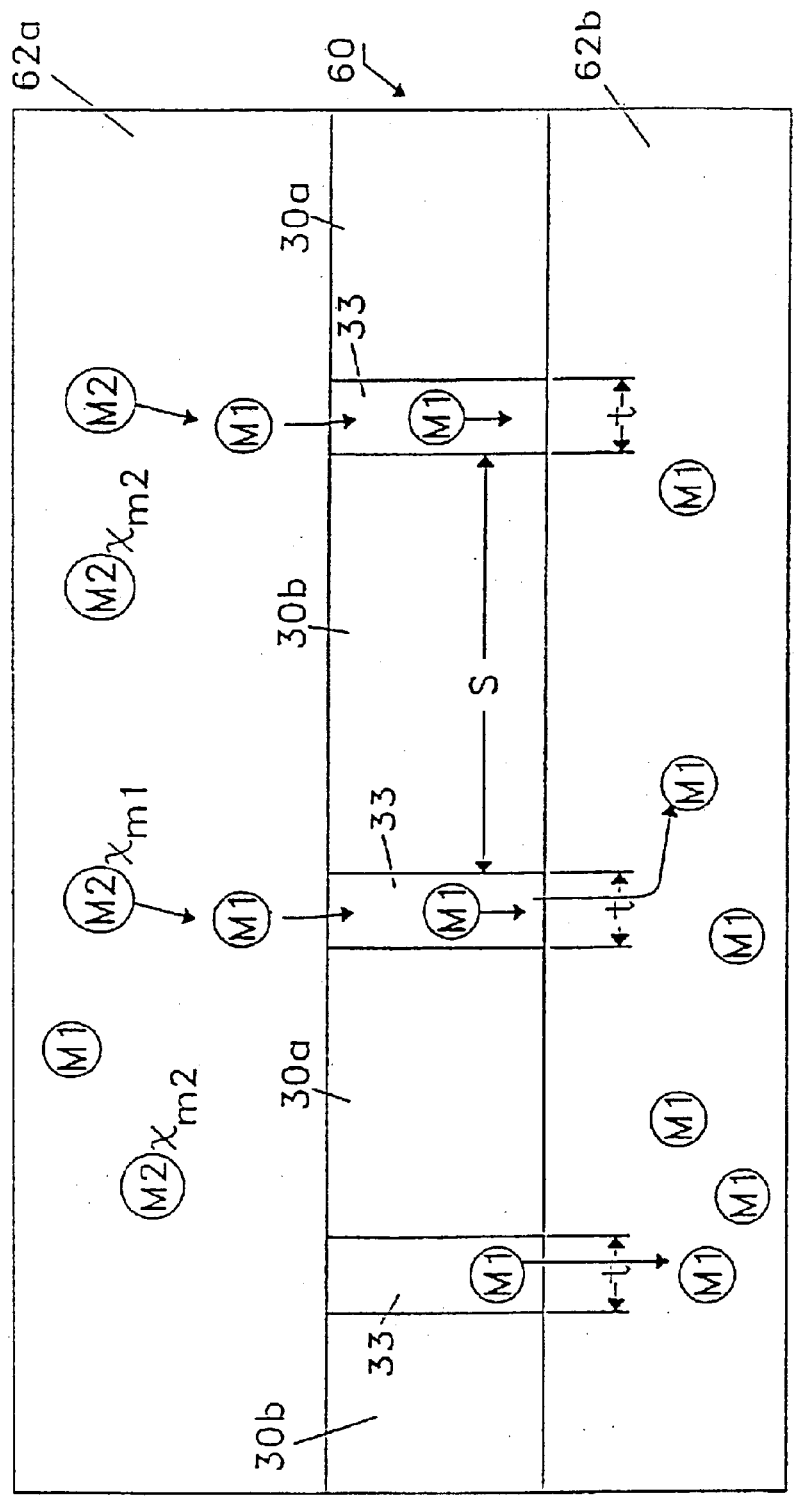
FIG. 16 shows a simplified diagram of a separator with no electrode or conductive substrate which separates a mixture of particles between a first solution and a second solution.

FIG. 15B shows apparatus 80 which corresponds to any of the above discussed embodiments as well as the embodiments shown in FIG. 16 or after. Some of the embodiments in their implementation require the presence of a magnetic field such as that produced by electomagnet 70 and some of the embodiments do not require electromagnet 70, although they can do so. Apparatus 80 corresponds to, for example, some embodiments of the magnetically modified electrode, the fuel cell, the battery, the membrane sensor, the dual sensor, and the flux switch. Electromagnet 70 can be any source of a magnetic field. Electromagnet 70 can also be used in the above discussed methods of forming the composite magnetic materials that require the presence of an externally applied magnetic field. Electromagnet 70 can be controlled by controller 72 to produce a constant or oscillating magnetic field with power supplied by power supply 74.

FIG. 16 shows another simplified diagram showing a second manifestation of the above described phenomenon and hence a second broad area of application. Namely, FIG. 16 shows a separator 60 which separates a first solution 62a from a second solution 62b. Here, there is no electrode or conductive substrate 20. Solution 62a has at least two different types of particles $M_1$ and $M_2$ with two different magnetic susceptibilities $\chi_{m1}$ and $\chi_{m2}$, respectively. Once particles $M_1$ or $M_2$ drift into an area near any one of boundaries 33, they are accelerated through the boundaries 33 by the magnetic gradient therein. Here, $\chi_{m1}$ is greater than $\chi_{m2}$, which causes the flux of particles $M_1$ through separator 60 to be greater than the flux of particles $M_2$ through separator 60. This difference in flux can again be over a factor of 3500%, and may somewhat cancel out any difference in acceleration due to different masses of particles $M_1$ and $M_2$. Consequently, if the above process is allowed to proceed long enough, most of the particles $M_1$ will have passed through separator 60 before particles $M_2$, thereby making first solution 62a primarily made up of particles $M_2$ and second solution 62b primarily made up of particles $M_1$. Note, separation of particles $M_1$ and $M_2$ may require some special tailoring of the separator 60 and also relies on how much time is allowed for particles $M_1$ and $M_2$ to separate. In an infinite amount of time, both particles $M_1$ and $M_2$ may cross separator 60. Particle size may also have a bearing on the ultimate separation of particles $M_1$ and $M_2$ by separator 60.

The above discussion with respect to FIG. 16 involves two types of particles, $M_1$ and $M_2$, but the discussion also holds for any number of particles. Consider, for example, solution 62a having particles $M_1$, $M_2$, $M_3$ and $M_4$ with susceptibilities $\chi_{m1}$, $\chi_{m2}$, $\chi_{m3}$ and $\chi_{m4}$, respectively. If $\chi_{m1} > \chi_{m2} > \chi_{m3} > \chi_{m4}$, then $M_1$ would pass more easily through separator 60, followed by $M_2$, $M_3$ and $M_4$. The greater the difference between magnetic susceptibilities, the better the separation. The above phenomenon can be used to improve performance of fuel cells and batteries. Other applications include separation technology in general, chromatographic processes—includes higher transition metal species (Oanthanides and actinides), and photography.

In the above discussion with respect to FIGS. 15 and 16, the greater the number of boundary regions 33 per unit area (i.e., the smaller S), the greater the effects due to the presence of boundary regions 33 macroscopically manifest themselves. S can vary from fractions of a micrometer to hundreds of micrometers. In quantum systems with smaller structures, S is further reduced to less than approximately 10 nm.

Design paradigms are summarized below to aid in tailoring composites for specific transport and selectivity functions.

Forces and gradients associated with interfaces, which are of no consequence in bulk materials, can contribute to and even dominate the transport processes in composites.

Increasing the microstructure of composites can enhance the influence of interfacial gradients.

The closer a molecule or ion is placed to the interface, the stronger the effect of the interfacial field on the chemical moiety. Systems should be designed to concentrate molecules and ions near interfaces.

The ratio of surface area for transport to volume for extraction parameterizes surface transport.

Fields in a microstructural environment can be non-uniform, but locally strong.

Strong but short range electrostatic and magnetic fields are better exploited in microstructured environments than in systems with externally applied, homogeneous fields.

Vectorial transport is plumbed into microstructured matrices by coupling two or more field or concentration interfacial gradients; the largest effects will occur when the gradients are either perpendicular or parallel to each other.

Control of surface dimensionality (fractality) is critical in optimizing surface transport in composites.

Several advantages are inherent in ion exchange composites over simple films. First, composites offer properties not available in simple films. Second, composites are readily formed by spontaneous sorption of the ion exchanger on the substrate. Third, while surfaces dominate many characteristics of monolayers and composites, three-dimensional composites are more robust than two-dimensional monolayers. Fourth, interfaces influence a large fraction of the material in the composite because of the high ratio of surface area to volume. Fifth, composites offer passive means of enhancing flux; external inputs of energy, such as stirring and applied electric and magnetic fields, are not required. Sixth, local field gradients can be exploited in composites because the fields and molecular species are concentrated in a micro-environment where both the decay length for the field and the microstructural feature length are comparable. In some of the composites, the field may be exploited more effectively than by applying an homogeneous field to a cell with an external source.

SPECIFIC EXAMPLES

Fuel Cells

Hence it would be very beneficial to achieve high efficiency compressor/expander power recovery technology. One way to improve the efficiency of the compressor/expander would be to reduce the pressure requirement. If a passive pressurization process could be provided within the fuel cell itself, at no cost to the power output of the fuel cell, power production from present day fuel cells would be increased by approximately 20%.

Magnetically modified cathodes may reduce the need for pressurization as oxygen is paramagnetic. The field may also alter oxygen kinetics. Potential shifts of +35 mV to +100 mV represent a 5% to 15% improvement in cell efficiency, a comparable savings in weight and volume. Also, in fuel cells, as hydrated protons cross the cell, the cathode floods and the anode dehydrates. Water transport may be throttled by composite separators of graded density and hydration.

Membrane Sensors

Membrane sensors for the paramagnetic gases $O_2$, $NO_2$, and NO (recently identified as a neurotransmitter) could be based on magnetic composites where enhanced flux would reduce response times and amplify signals. Sensors for other analytes, where oxygen is an interferant, could distinguish between species by using dual sensors, identical except one sensor incorporates a magnetic field. Examples of these sensors could be optical, gravimetric, or electrochemical, including amperometric and voltammetric. In sensors, the measured signal is proportional to the concentration of all species present to which the sensor applies. The presence of a magnetic component in the sensor will enhance sensitivity to paramagnetic species. Through a linear combination of the signal from two sensors, similar in all respects except one contains a magnetic component, and the sensitivity of the magnetic sensor to paramagnetic species (determined by calibration), it is possible to determine the concentration of the paramagnetic species. In a system where the sensors are only sensitive to one paramagnetic and one diamagnetic species, it is possible to determine the concentration of both species.

Flux Switches

As nanostructured and microstructured materials and machines develop into a technology centered on dynamics in micro-environments, flux switches will be needed. Externally applied magnetic fields can actuate flux switches using electrodes coated with composites made of paramagnetic polymers and iron oxide or other non-permanent magnetic material, or internal magnetic fields can actuate flux switches using electrodes coated with composites made of electro-active polymers or liquid crystals, where one redox form is diamagnetic and the other is paramagnetic, and organo-Fe or other superparamagnetic or ferro-fluid materials or permanent magnetic or aligned surface magnetic field material. Also, an external magnet can be used to orient paramagnetic polymers and liquid crystals in a composite containing paramagnetic magnetic beads. Enhanced orientation may be possible with magnetic beads containing superparamagnetic of ferrofluid materials.

Batteries

Batteries with increased current densities and power, as well as decreased charge and discharge times may be made with magnetic bead composites. The improvements would be driven by flux enhancement, transport enhancement, electron kinetic effects, or by capitalizing on a potential shift. The required mass of microbeads would little affect specific power. Since magnetic fields can suppress dendrite formation, secondary battery cycle life maybe extended. Examples include magnetically modified electrodes. The magnetic coatings may be on the electrodes or elsewhere in the battery structure.

Figure 17:
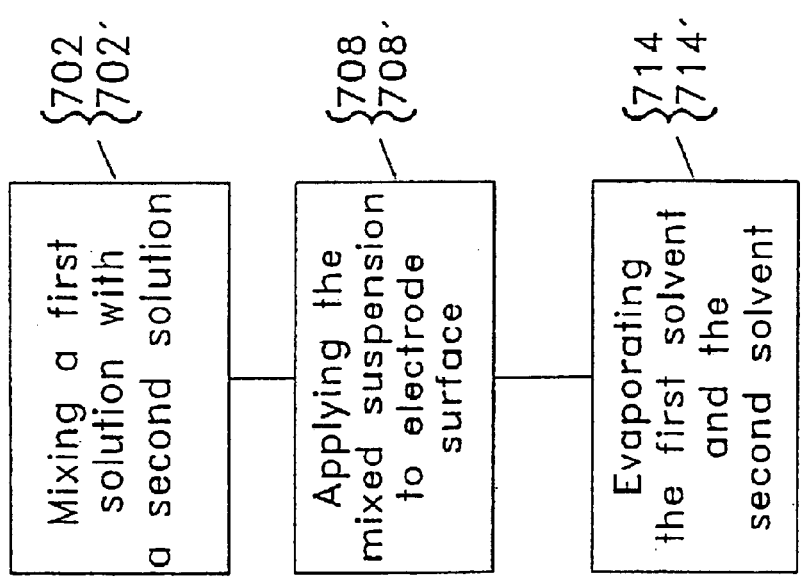
FIG. 17 is a short summary of steps involved in a method of making an electrode according to two embodiments of the invention.

FIG. 17 is a short summary of steps involved in a method of making an electrode according to two embodiments of the invention. In one embodiment, the method is a method of making an electrode with a surface coated with a magnetic composite with a plurality of boundary regions with magnetic gradients having paths to the surface of the electrode according to one embodiment of the invention. In particular step 702 involves mixing a first solution which includes a suspension of at least approximately 1 percent by weight of inert polymer coated magnetic microbeads containing between approximately 10 percent and approximately 90 percent magnetizable polymer material having diameters at least about 0.5 micrometers in a first solvent with a second solution of at least approximately 2 percent by weight of ion exchange polymers in a second solvent to yield a mixed suspension. Step 708 then involves applying the mixed suspension to the surface of the electrode. The electrode is arranged in a magnetic field of at least approximately 0.05 Tesla, wherein the magnetic field has a component oriented approximately along the normal of the electrode surface and preferably is entirely oriented approximately along the normal of the electrode surface. Step 714 then involves evaporating the first solvent and the second solvent to yield the electrode with a surface coated with the magnetic composite having a plurality of boundary regions with magnetic gradients having paths to the surface of the electrode.

Step 702 can include mixing the first solution which includes a suspension of between approximately 2 percent and approximately 10 percent by weight of inert polymer coated magnetic microbeads with the second solution. Alternatively, step 702 can include mixing the first solution which includes inert polymer coated magnetic microbeads containing between 50 percent and 90 percent magnetizable polymer material with the second solution. Alternatively, step 702 can include mixing the first solution which includes inert polymer coated magnetic microbeads containing 90 percent magnetizable polymer material with the second solution.

In addition, step 702 can include mixing a first solution which includes a suspension of at least approximately 5 percent by weight of inert polymer coated magnetic microbeads containing between approximately 10 percent and approximately 90 percent magnetizable polymer material having diameters ranging between approximately 0.5 micrometers and approximately 12 micrometers. Alternatively, step 702 can include mixing a first solution which includes a suspension of at least approximately 5 percent by weight of inert polymer coated magnetic microbeads containing between approximately 10 percent and approximately 90 percent magnetizable polymer material having diameters ranging between approximately 1 micrometer and approximately 2 micrometers.

Mixing step 702 can also involve mixing a first solution which includes a suspension of at least approximately 5 percent by weight of inert polymer coated magnetic microbeads containing between approximately 10 percent and approximately 90 percent magnetizable polymer material having diameters at least 0.5 micrometers in a first solvent with a second solution of at least approximately 5 percent by weight of Nafion in a second solvent to yield the mixed suspension.

Step 702 can involve mixing a first solution which includes a suspension of at least approximately 5 percent by weight of inert polymer coated magnetic microbeads containing between approximately 10 percent and approximately 90 percent organo-Fe material having diameters at least 0.5 micrometers in a first solvent with a second solution of at least approximately 5 percent by weight of ion exchange polymers in a second solvent to yield the mixed suspension.

Step 708 can include applying approximately between 2 percent and approximately 75 percent by volume of the mixed suspension to the surface of the electrode. Alternatively, step 708 can include applying between 25 percent and 60 percent by volume of the mixed suspension to the surface of the electrode. In yet another approach step 708 can involve applying the mixed suspension to the surface of the electrode, the electrode being arranged in a magnetic field between approximately 0.05 Tesla and approximately 2 Tesla and preferably the magnetic field is approximately 2 Tesla.

An alternative embodiment involving steps 702' through 714' (also shown is FIG. 17) involves the use of an external magnetic field. That is, again the method of making an electrode with a surface coated with a composite with a plurality of boundary regions with magnetic gradients having paths to the surface of the electrode when the external magnetic field is turned on. The steps 702 through 714 are then modified into steps 702' through 714' as follows. Step 702' involves mixing a first solution which includes a suspension of at least 5 percent by weight of inert polymer coated microbeads containing between 10 percent and 90 percent magnetizable non-permanent magnet material having diameters at least 0.5 micrometers in a first solvent with a second solution of at least 5 percent of ion exchange polymers in a second solvent to yield a mixed suspension. Step 708' then involves applying the mixed suspension to the surface of the electrode. Step 714' involves evaporating the first solvent and the second solvent to yield the electrode with a surface coated with the composite having a plurality of boundary regions with magnetic gradients having paths to the surface of the electrode when the external magnet is turned on.

Figure 18A:
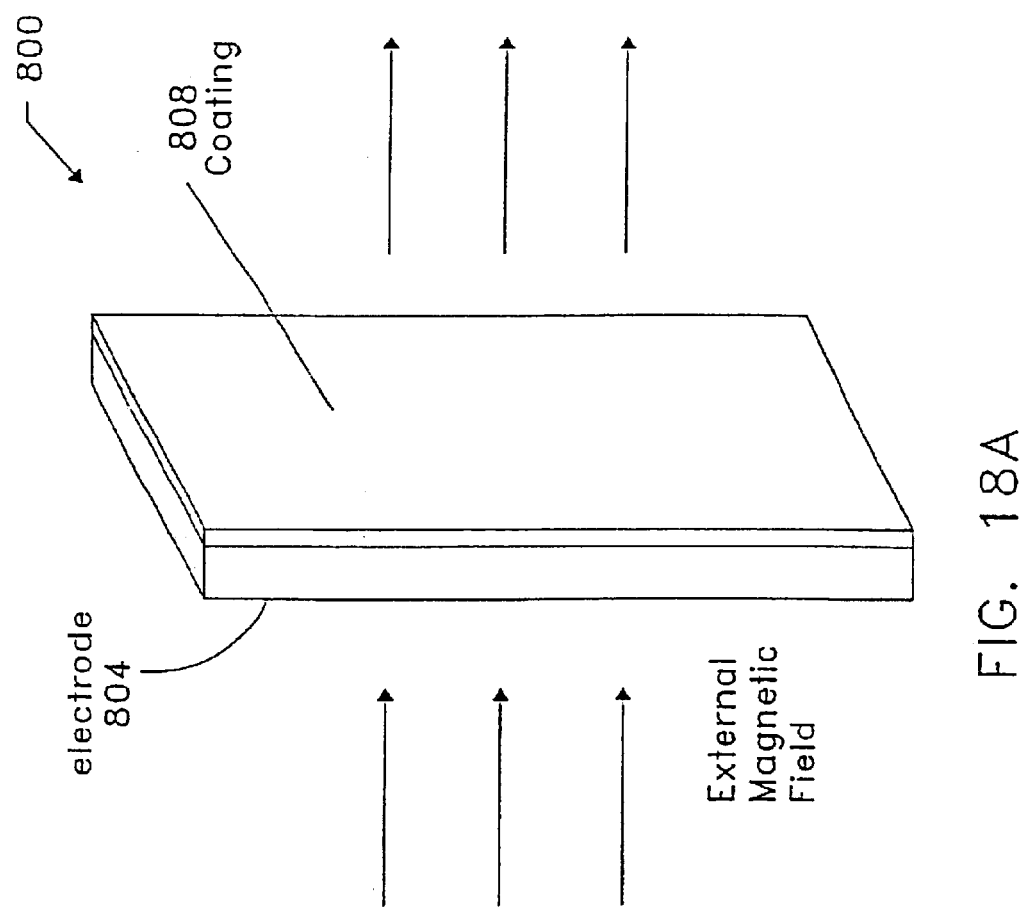
FIGS. 18A and 18B show a flux switch 800 to regulate the flow of a redox species according to yet another embodiment of the invention.
Figure 18B:
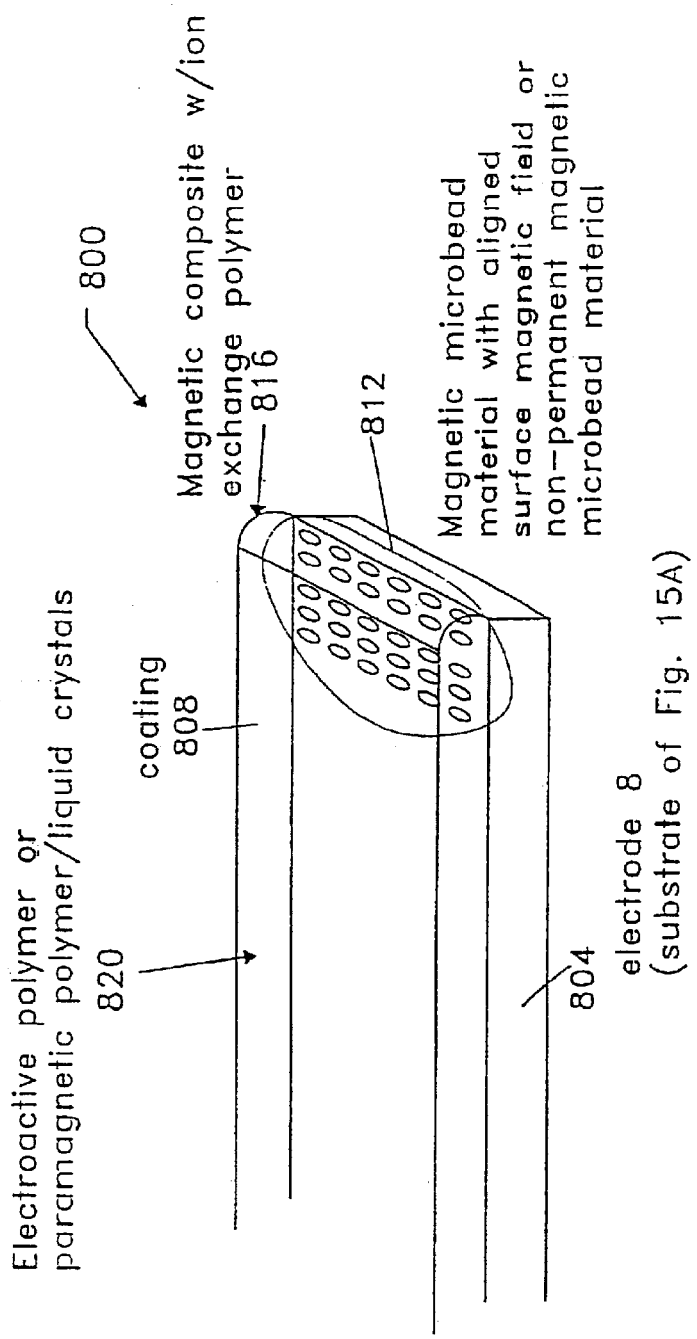

FIGS. 18A and 18B show a flux switch 800 to regulate the flow of a redox species according to yet another embodiment of the invention. In particular, FIGS. 18A and 18B show an electrode 804 and a coating 808 on the electrode 804. Coating 808 is formed from a composite which includes magnetic microbead material 812 with an aligned surface magnetic field., an ion exchange polymer 816; and an electro-active polymer 820 in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

Microbead material 812 can include organo-Fe material. The redox species can be more readily electrolyzed than the electro-active polymer. Electro-active polymer 820 can be an electro-active liquid crystal with chemical properties susceptible to said magnetic field or an electro-active liquid crystal with viscosity susceptible to said magnetic field. Electro-active polymer 820 include an electro-active liquid crystal with phase susceptible to said magnetic field. Electro-active polymer 812 can include poly(vinyl ferrocenium). In addition, the externally applied magnetic field, and wherein said magnetic microbead material comprises organo-Fed material.

FIG. 19 shows a dual sensor 900 for distinguishing between a first species (particles A) and a second species (particles B). The dual sensor includes a first membrane sensor 906 which preferentially passes the first species over the second species; and a second membrane sensor 912, which preferentially enhances the concentration of the second species over the first species, thereby enabling the measurement of at least the first species. The first and second species can be in any state such as liquid, gaseous, solid and plasma.

In one embodiment, the first species can include a paramagnetic species and the second species can include a diamagnetic species. In this case, the first membrane sensor 906 is a magnetically modified membrane sensor, and the second membrane sensor 912 is an unmodified membrane sensor. The magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species. More particularly, the paramagnetic species can be one of $O_2$, $NO_2$, and $NO$. The diamagnetic species can be $CO_2$.

In another embodiment, the first species can include a paramagnetic species and the second species can include a nonmagnetic species. In this case, the first membrane sensor 906 is a magnetically modified membrane sensor, and the second membrane sensor includes an unmodified membrane sensor. The magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic gaseous species, thereby enabling the measurement of the concentration of at least the paramagnetic species. More particularly, the paramagnetic species can be one of O2, NO2, and NO.

In yet another embodiment, the first species can include a diamagnetic species and the second species can include a second diamagnetic species. In this case, the first membrane sensor 906 is a magnetically modified membrane sensor, and the second membrane sensor 912 is a differently magnetically modified membrane sensor. The magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species. The first diamagnetic species can include $CO_2$.

In yet another embodiment, the first species can be a first paramagnetic species and the second species can be a second paramagnetic species. In this case, the first membrane 906 is a magnetically modified membrane sensor, and the second membrane 912 is a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species. Again, the first paramagnetic species is one of $O_2$, $NO_2$, and NO.

In yet another embodiment of the invention, the first species can be a diamagnetic species and the second species can be a nonmagnetic species. In this case, the first membrane sensor 906 is a magnetically modified membrane sensor, and the second membrane sensor 912 is an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

Figure 20:
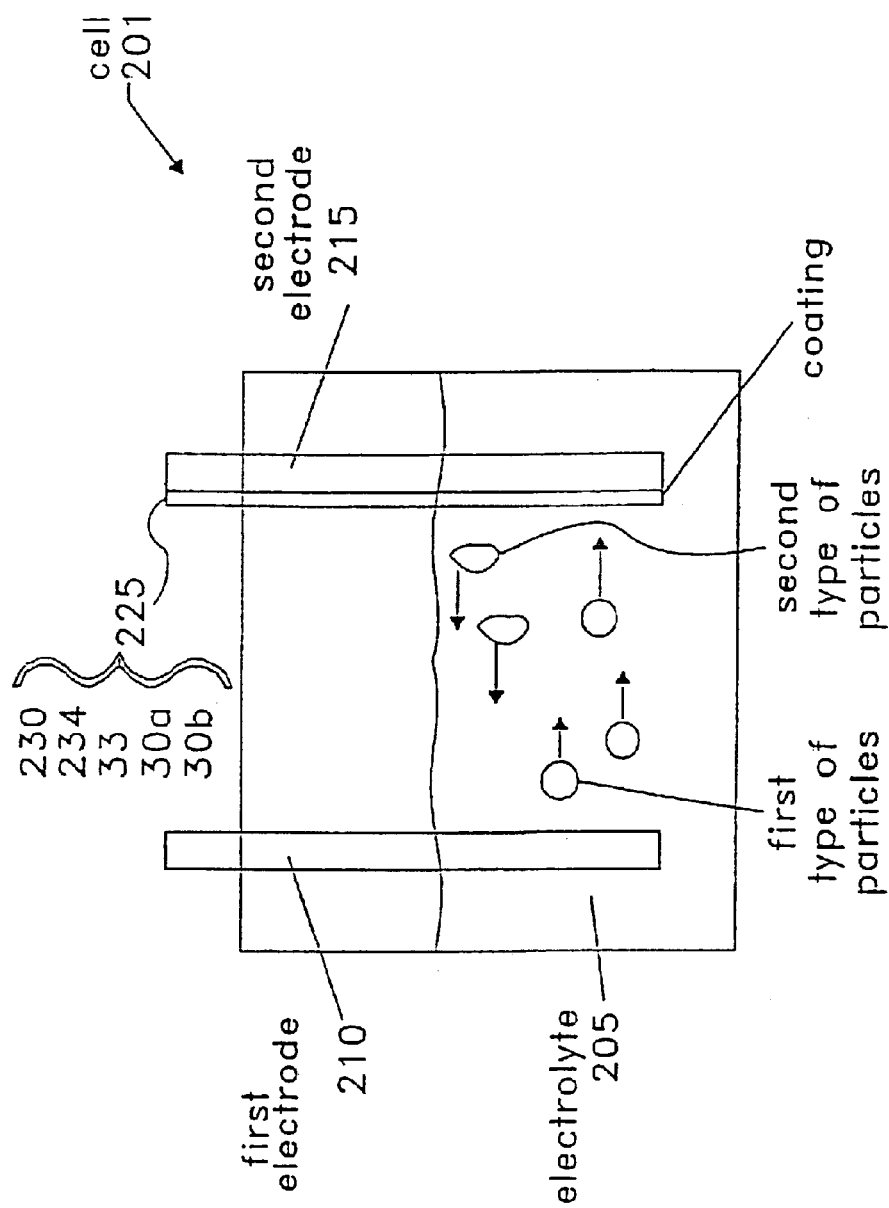
FIG. 20 shows a cell 201 according to another embodiment of the invention.

FIG. 20 shows a cell 201 according to another embodiment of the invention. In particular, FIG. 20 shows an electrolyte 205 including a first type of particles. A first electrode 210 and a second electrode 215 are arranged in electrolyte 205. The first type of particles transform into a second type of particles once said first type of particles reach said second electrode 215. Second electrode 215 has a surface with a coating 225 fabricated according to the above methods. Coating 225 includes a first material 230 having a first magnetism, a second material 234 having a second magnetism, thereby creating a plurality of boundaries (33 of FIG. 15A) providing a path between said electrolyte 205 and said surface of said second electrode 215. Each of said plurality of boundaries having a magnetic gradient within said path, said path having an average width of approximately one nanometer to approximately several micrometers, wherein said first type of particles have a first magnetic susceptibility and said second type of particles have a second magnetic susceptibility and the first and said second magnetic susceptibilities are different. Coating 225 operates in the manner described with respect to FIG. 16.

First material 230 in coating 225 can include a paramagnetic species and said second material 234 can include a diamagnetic species. Alternatively, first material 230 can include a paramagnetic species having a first magnetic susceptibility and the second material 234 can include a paramagnetic species having a second magnetic susceptibility, and said first magnetic susceptibly is different from said second susceptibility. In yet another approach, said first material 230 can include a diamagnetic species having a first magnetic susceptibility while said second material 234 includes a diamagnetic species having a second magnetic susceptibility, and said first magnetic susceptibly is different from said second susceptibility. In another approach, the first material 230 could alternatively include a paramagnetic species having a first magnetic susceptibility and said second material 234 comprises a nonmagnetic species. In another approach, said first material 230 can include a diamagnetic species having a first magnetic susceptibility and said second material 234 can include a nonmagnetic species. Electrolyte can be an electrolyzable gas such as $O_2$ or can include a chlor-alkali.

While not wishing to be bound by theory, it is thought that the reaction proceeds faster in the presence of a magnetic field, which suggests higher rates for nickel metal hydride batteries charge and discharge. The higher peak currents for magnetized electrodes also means that battery resistance is reduced with magnetic field and could increase batteries capacity and working potential.

Numerous and additional modifications and variations of the present invention are possible in light of the above teachings. It is therefore to be understood that within the scope of the appended claims, the invention may be practiced otherwise than as specifically claimed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

Electrosynthesis

It has been found that for the free radical systems, if charge and spin are localized in the same atoms of a molecule, no magnetic field effect is observed cyclic voltammetrically. However, if charge and spin are dispersed or localized in different areas of a molecule, magnetic field effects are observed. Thus, by employing magnetically modified electrodes in electrosynthetic processes where radical intermediates do not have charge and spin density localized on the same atom, it may be possible to change reaction pathways and/or reaction rates.

The implications of such uses of magnetically modified electrodes are far reaching, since they may be applied to any system having radical intermediates. According to the present invention, one can determine whether charge and spin density are localized on the same atom. If charge and spin density are not localized, the use of magnetically modified electrodes in the electrochemical process may enhance the rate of reaction or change reaction pathways in the process.

Therefore, a preferred embodiment of the present invention is directed to a method for enhancing an electrosynthetic process having radical intermediates, which comprises determining the structure of radical intermediates present in an electrosynthetic process; performing spin and charge density calculations for the radical intermediates; and employing a magnetically modified electrode in the process, provided that charge and spin density are not localized on the same atom of said radical intermediates.

Another preferred embodiment of the present invention is directed to an improvement on conventional electrosynthetic processes. According to such embodiments, in an electrosynthetic process having radical intermediates, the improvement comprises performing spin and charge density calculations for the radical intermediates; and employing a magnetically modified electrode in the process, provided that charge and spin density are not localized on the same atom of the radical intermediates.

According to such embodiments, the magnetic particles may be either coated or uncoated and may be employed as part of a coating layer on a substrate material, such as Nafion or other conductive polymeric materials having magnetic particles incorporated therein formed on a substrate material.

Alternatively, an electrode made from a magnetic material may be employed in the electrosynthetic process. Such magnetic materials include, but are not limited to Ni, Fe, Co, NdFeB, $Sm_2O_7$, combinations thereof and other magnetic materials known in the art. According to certain preferred embodiments of the present invention, such magnetic materials have a coating layer including magnetic particles formed thereon.

The substrate material may be glass, metal, polymeric, a semiconductor, conductive, such as graphite, magnetic or combinations thereof.

Electrochromic Devices

Electrochromic cells comprise a thin film of an electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film is in ion-conductive contact, preferably direct physical contact, with a layer of ion-conductive material. The ion-conductive material may be solid, liquid or gel. The electrochromic film and ion-conductive layers are disposed between two electrodes.

As a voltage is applied across the two electrodes, ions are conducted through the ion-conducting layer. When the electrode adjacent to the electrochromic film is the cathode, application of an electric field causes darkening of the film. Reversing the polarity causes reversal of the electrochromic properties, and the film reverts to its high transmittance state. Typically, the electrochromic film, e.g. tungsten oxide, is deposited on a glass substrate coated with an electroconductive film such as tin oxide to form one electrode. The counter electrodes include a carbon-paper structure backed by a similar tin oxide coated glass substrate or a metal plate.

Examples of ion conductive materials used in electrochromic devices is methyl violgen and other organic redox species. According to an embodiment of the present invention, a magnetically modified electrode is employed in an electrochromic device. Preferably, the electrochromic device comprises an organic redox species having charge and spin density not localized on the same atoms in at least one of the oxidized or reduced forms. For instance, magnetic particles may be incorporated into at least one of the electrodes or onto a surface of at least one of the electrodes, such as a coating layer containing magnetic particles dispersed in a medium, such as a polymer, metal oxide, or the like, formed on an electrode surface. Examples of electrochromic devices are disclosed in U.S. Pat. Nos. 5,215,821; 4,786,865; 4,726,664; 4,645,307; 4,773,741 and 4,818,352, each of which is incorporated herein in its entirety.

Spectroelectrochemical Sensors

Another use of the present invention is in spectroelectrochemical sensors. Such sensors are used, for instance, to measure the presence of contaminants in a composition, e.g., metals such as the pertechnate ion ($TcO_4^-$) and organic compounds such as methyl viologen, as well as to measure the relative amounts of compounds in a mixture, such as CO and $O_2$.

A typical spectroelectrochemical sensor includes an optically transparent electrode coated with a selective film. Sensing is based on the change in the optical signal of light passing through the OTE that accompanies an electrochemical reaction of an analyte at the electrode surface. Examples include a glass substrate coated with indium tin oxide or another conductive, optically transparent material. Such sensors also may include with a selective polymeric coating, such as a cation selective Nafion-$SiO_2$ film or an anion selective PDMDAAC-$SiO_2$ film, where PDMDAAC= polydimethyldiallylammonium chloride.

It has been found according to the present invention, that such sensors may be enhanced by incorporating magnetic particles at or near the electrode surface. For instance, magnetic particles may be added to the selective metal oxide coating. Alternatively, magnetic particles may be dispersed in the selective polymeric coating.

Experimental

Cyclic voltammetry was performed on each organic redox couple at both a Nafion modified electrode and a magnetic microsphere/Nafion composite modified electrode. Ab initio calculations of spin and charge density were performed on each organic redox couple in its free radical oxidation state.

I. Reagents

The following redox couples were examined: N,N,N',N'-tetramethyl-1,4-phenylenediamine, anthracene, 9,10-dimethylanthracene, 9,10-diphenylanthracene, tetracyanoquinodirnethane, thianthrene, 2,3,7,8,12,13,17,18-octaethyl-21H,23H-porphine nickel(II), 1,4-benzoquinone, benzyl viologen dichloride, rubrene, and methyl viologen dichloride. All were used as received from Aldrich. Solutions and were made in HPLC Grade acetonitrile (Fisher) that was dried over molecular sieves. The concentration of the redox species was 1 mM with 0.1 M tetrabutylammonium tetrafluoroborate (SACEM) electrolyte.

II. Electrode Preparation

A glassy carbon disk working electrode (A=0.459 cm) was polished with 1.0 $\mu$m, 0.3 $\mu$m, and 0.05 $\mu$m alumina, successively, on Svelt polishing clothes (Buehler). The electrode was then sonicated for 5 minutes in 18 MΩ water to remove remaining alumina. The electrode was soaked in concentrated nitric acid for 2 minutes and thoroughly rinsed with 18 MΩ water.

The electrode surface was modified with either a Nafion film or a magnetic microsphere/Nafion composite. Nafion films were prepared by pipetting an appropriate volume of 5% by wt. Nafion solution onto the electrode surface. The magnetic microparticle/Nafion composite were prepared by pipetting an appropriate volume of composite stock solution on the electrode surface in the presence of an external cylindrical magnet (6.4 cm O.D., 4.8 cm I.D., 3.2 cm, 8 lb. pull, approximately 0.25 Telsa, McMaster-Carr).

The composite stock solution was prepared by adding fractions of 5% by wt. Nafion solution and 2.5% by wt. Polysciences paramagnetic microsphere solution (polystyrene shrouded iron oxide spheres, 1–2 µm in diameter). The fractions were calculated so that the dry composite film was composed of 10% by weight magnetic microspheres and 90% by weight Nafion. All films thickness were 5.1 µm. After the modified electrodes were dried in the external magnet, they were placed in a vacuum desiccator overnight to ensure thorough removal of casting solvents.

III. Electro Chemical Measurements

Electrochemical flux of each redox species through the membrane layer to the electrode surface was studied using cyclic voltammetry. Nafion film and magnetic microparticle/Nafion composite modified working electrodes were equilibrated in 1 mM redox couple and 0.1 M tetrabutylammoniumtetrafluoroborate for 30 minutes before measurements were taken. To eliminate interferences from overlapping peaks and quenching by oxygen, the solutions were degassed with nitrogen during both equilibration and experiment.

The reference electrode was a silver wire. The counter electrode was an approximately 1 in$^2$ piece of platinum gauze spot welded to platinum wire. Data were collected and analyzed on a Pentium computer interfaced to a BioAnalytical Systems Model 100B/W Potentiostat. Cyclic voltammetry was performed at scan rates ranging from 50 to 200 mV/s.

For cyclic voltammetry, peak currents ($i_p$) and peak potentials were the diagnostics of kinetic changes. Peak currents ($i_p$) provided information about the apparent diffusion coefficient of the redox species and other kinetic information. The mass transfer limited peak current expression is provided in Equation 5.

$$i_p(v) = (2.69 \times 10^5) n^{3/2} A D_{app}^{1/2} v^{1/2} \varepsilon k C^* \quad (5)$$

where n is the number of electrons transferred, F is Faraday's constant, A is the area of the electrode, v is the scan rate, $\varepsilon$ is the porosity of the film, and C* is the concentration of the redox species in solution. The extractions and apparent diffusion coefficients are k and $D_{app}$, respectively.

IV. Spin and Charge Density Calculations

Ab initio spin and charge density calculations were done for all free radical intermediates. The geometry was optimized and density calculations were performed using Gaussian 94W for a variety of different basis sets. The data presented in the following Tables are for the largest basis set. Further increases in the size of the basis set did not alter the calculated results.

V. Redox Couples

A. Methyl Viologen

Figure 21:
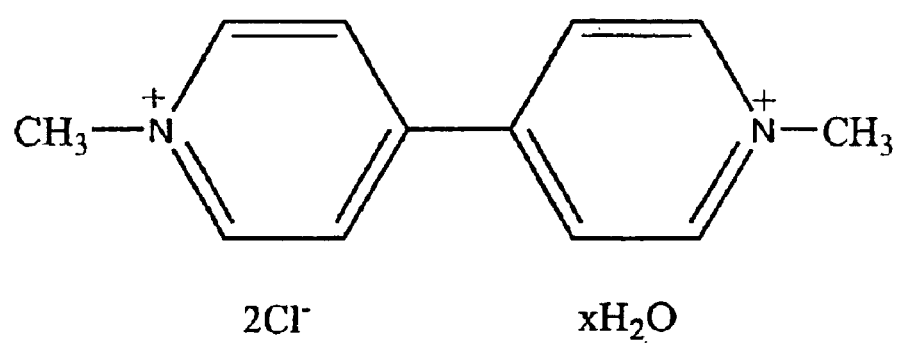
FIG. 21 shows methyl viologen dication, an organic molecule that is commonly used in spectroelectrochemistry.

Methyl viologen dication is an organic molecule that is commonly used in spectroelectrochemistry. The chemical structure of methyl viologen dication is shown in FIG. 21. Methyl viologen dication undergoes two single electron transfers. The first single electron transfer forms a methyl viologen cation radical. The second single electron transfer reacts with the cation radical to form neutral methyl viologen.

Figure 22:
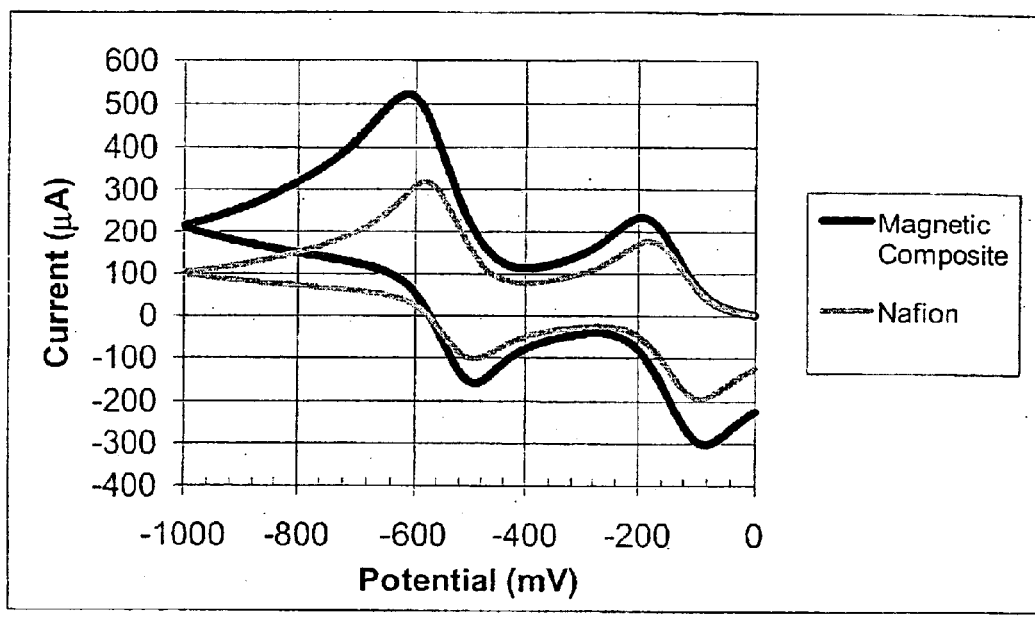
FIG. 22 shows a typical cyclic voltammogram of methyl viologen at a Nafion modified electrode and at a 10% by wt. magnetic microsphere/Nafion composite modified electrode.

A typical cyclic voltammogram of methyl viologen at a Nafion modified electrode and at a 10% by wt. magnetic microsphere/Nafion composite modified electrode are shown in FIG. 22. The cyclic voltammogram shows an increase in the peak currents for all electron transfer processes at the magnetically modified electrode. These flux enhancements are more about 40%.

The spin and charge density calculation results for methyl viologen are presented in the FIG. 23. The sum of charge density is +1.0 and the total sum of spin density is 1.0. The spin is localized on C1, C3, N1, and N2. C1 and C3 are the two methyl carbons attached to the nitrogens. Therefore, all of the spin density is concentrated on the methyl ends of the molecule. Some negative charge density is localized on the two nitrogens, but the positive charge density is dispersed through all the hydrogens in the molecule. C1 and C3 have very little charge density.

B. Benzyl Viologen

Figure 25:
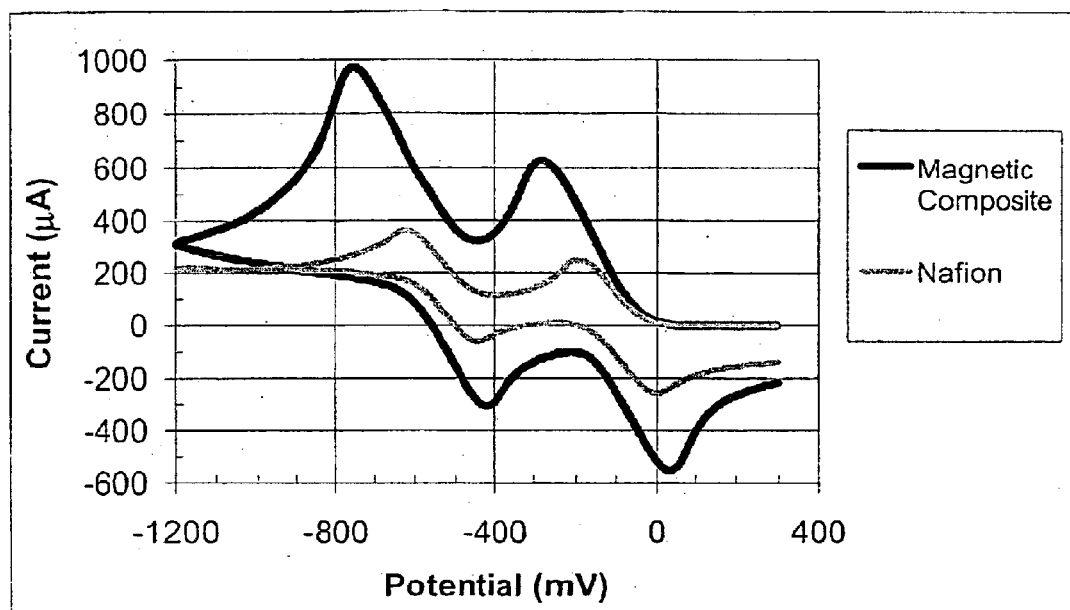
FIG. 25 shows cyclic voltammetry of benzyl viologen at Nafion and magnetic composite modified electrodes.

The chemical structure of benzyl viologen dication is shown in FIG. 24. Benzyl viologen has similar electrochemistry to methyl viologen, as shown in FIG. 25 for the cyclic voltammetry of benzyl viologen at Nafion and magnetic composite modified electrodes.

For benzyl viologen, peak currents for both anodic and cathodic peaks of both electron transfers are enhanced. The enhancements range from 75%–300% depending on the stability of the film. This is a dramatic magnetic effect on the electron transfer kinetics of an organic molecule. There are also substantial shifts in peak potentials. The difference between the cathodic and anodic peak potentials increases by approximately 200 mV in the presence of the magnetic field.

The spin and charge density calculation results for benzyl viologen radical are shown in the FIG. 26. The spin and charge density calculations are similar to those for methyl viologen. The total charge is 1.0 and the total spin is 1.0. There is very little spin or charge density localized in the 2 benzyl groups. The spin density is centered on the C1, C3, N1, and N2 atoms. The carbons C1 and C3 are the benzyl carbons attached to the nitrogens. The negative charge density is centered on the nitrogen atoms, but the positive charge density is delocalized throughout the structure.

C. Benzoquinone

Figure 27:
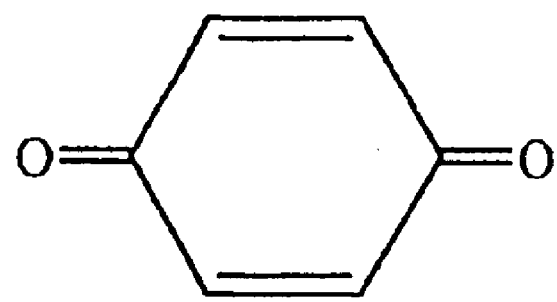
FIG. 27 shows the structure of benzoquinone.

Benzoquinone is an organic molecule that is commonly studied electrochemically. The structure of benzoquinone is shown in FIG. 27. Benzoquinone can undergo two single electron transfers. The first single electron transfer forms a semiquinone radical. The second single electron transfer reacts to semiquinone radical forms a diamagnetic benzoquinone di-anion.

Figure 28:
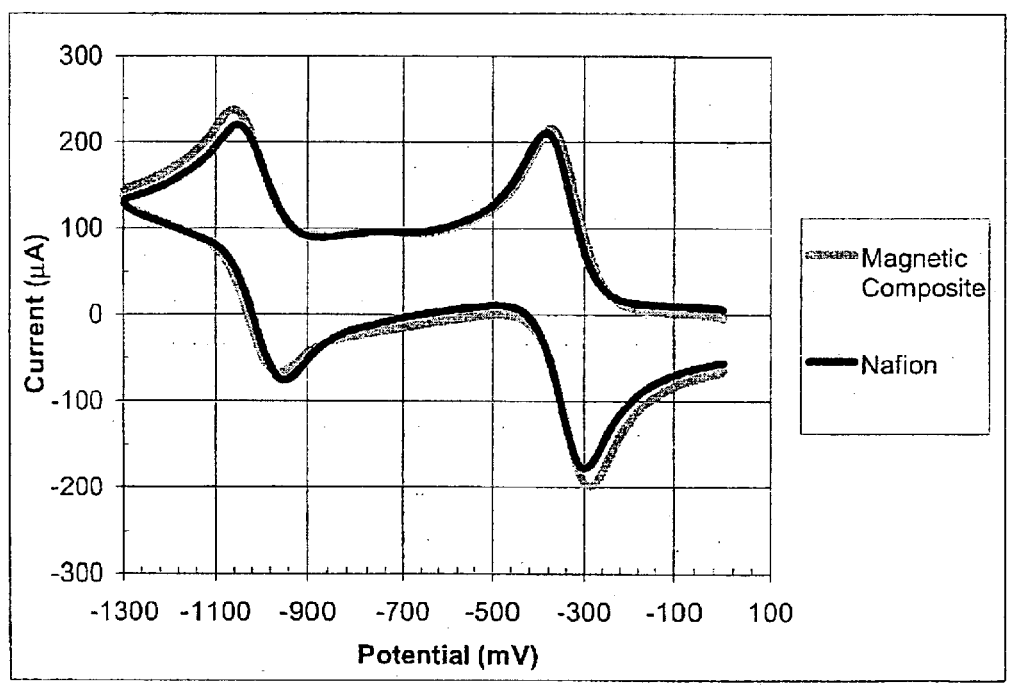
FIG. 28 shows a typical cyclic voltammogram of benzoquinone at a Nafion modified electrode and at a 10% by wt. magnetic microsphere/Nafion composite modified electrode.

A typical cyclic voltammogram of benzoquinone at a Nafion modified electrode and at a 10% by wt. magnetic microsphere/Nafion composite modified electrode is shown in FIG. 28. There is no significant difference between the cyclic voltammetry of the Nafion film coated electrode and the 10% by wt. magnetic microsphere/Nafion composite modified electrode. Therefore, there are no appreciable magnetic field effects on the heterogeneous and homogeneous electron transfer reactions occurring in this system. It should be noted that in aqueous matrices, the behavior of hydroquinone is significantly impacted by magnetic modification.

FIG. 29 shows the spin densities and charge densities of the semiquinone radical that were calculated using ab initio calculations. The total charge is −1.0 and the total spin is 1.0. The spin and charge density are both centered mainly on the oxygen atoms, O1 and O2.

D. Diphenylanthracene

Figure 30:
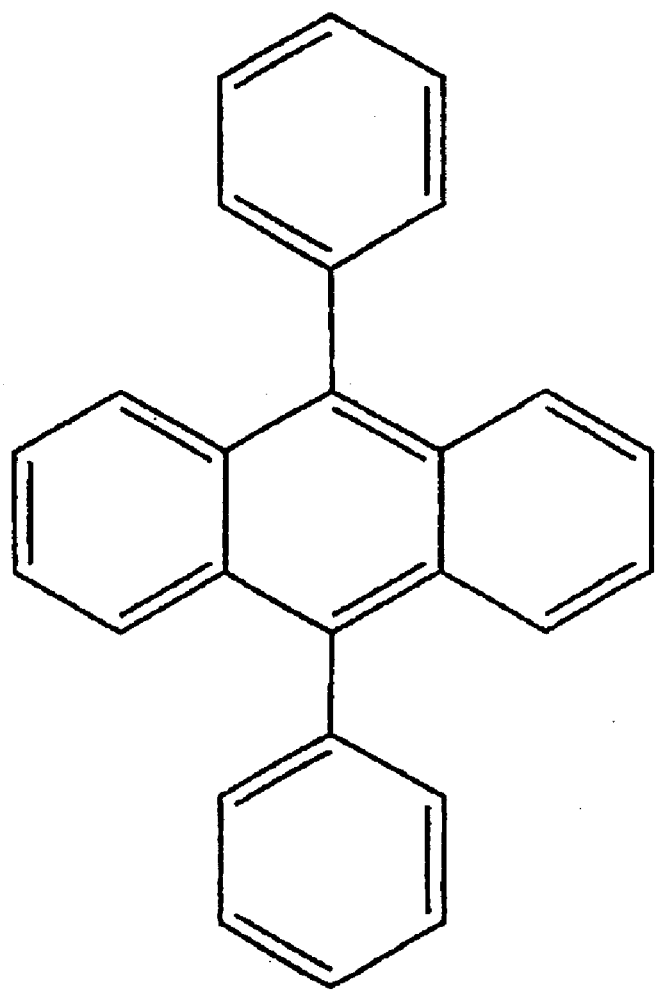
FIG. 30 shows the chemical structure of diphenylanthracene.

Diphenylanthracene is an organic redox couple that is commonly used in electrochemi-luminescence studies. The chemical structure of diphenylanthracene is shown in FIG. 30. Diphenylanthracene can be oxidized and reduced to form either a cation radical or an anion radical.

Figure 31:
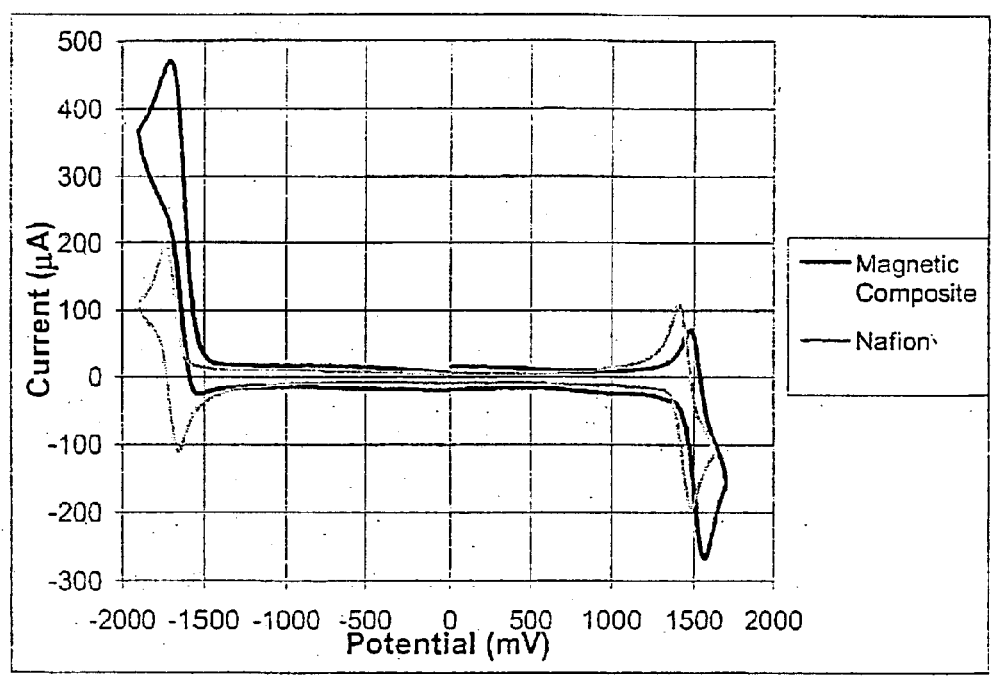
FIG. 31 shows a typical cyclic voltammogram of diphenylanthracene in a Nafion film and a 10% by wt. magnetic microsphere/Nafion composite.

A typical cyclic voltammogram of diphenylanthracene in a Nafion film and a 10% by wt. magnetic microsphere/Nafion composite can be seen in FIG. 31. The larger cyclic voltammogram without the reverse oxidation wave is for the magnetic composite.

The cyclic voltammetric peaks at approximately −1.75 V correspond to reduction of diphenylanthracene to diphenylanthracene anion radical and oxidation of diphenylanthracene anion radical to diphenylanthracene. Peak currents increase 2–3 fold for the magnetic microsphere/Nafion composite, and there is no reverse peak for the magnetic microsphere/Nafion composite. While not wishing to be bound by theory, this suggests that there is a probability the diphenylanthracene anion radical is either being stabilized in the presence of the magnetic field or undergoing a homogeneous reaction path. The cyclic voltammetric peaks at approximately 1.3–1.5 V correspond to oxidation of diphenylanthracene to diphenylanthracene cation radical and reduction of diphenylanthracene cation radical to diphenylanthracene. There are small peak current increases for the magnetic micro-sphere/Nafion composite during the oxidation process, but a decrease in relative peak currents for the reduction back to diphenylanthracene.

The spin and charge density calculation results for diphenylanthracene anion radical are shown in the FIG. 32. The total spin is 1.0 and the total charge is −1.0. The spin density is centered at C7 and C8 which are the center carbons on the middle ring at the 9,10 positions. The charge density is delocalized throughout the molecule.

The spin and charge density calculation results for diphenylanthracene cation radical are shown in the FIG. 33. The total spin is 1.0 and the total charge is 1.0. The spin density is localized on C7 and C8, but the charge density is delocalized throughout the molecule.

E. Dimethylanthracene

Figure 34:
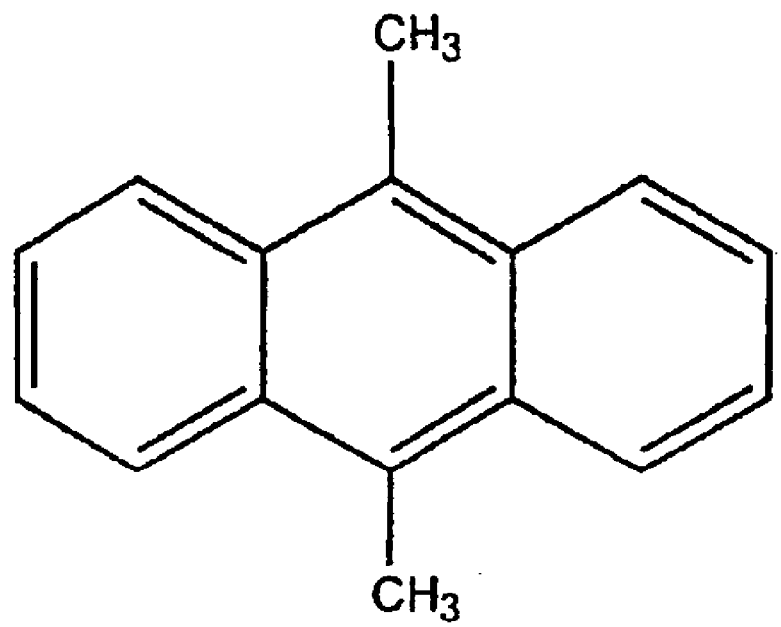
FIG. 34 shows the chemical structure of dimethylanthracene.
Figure 35:
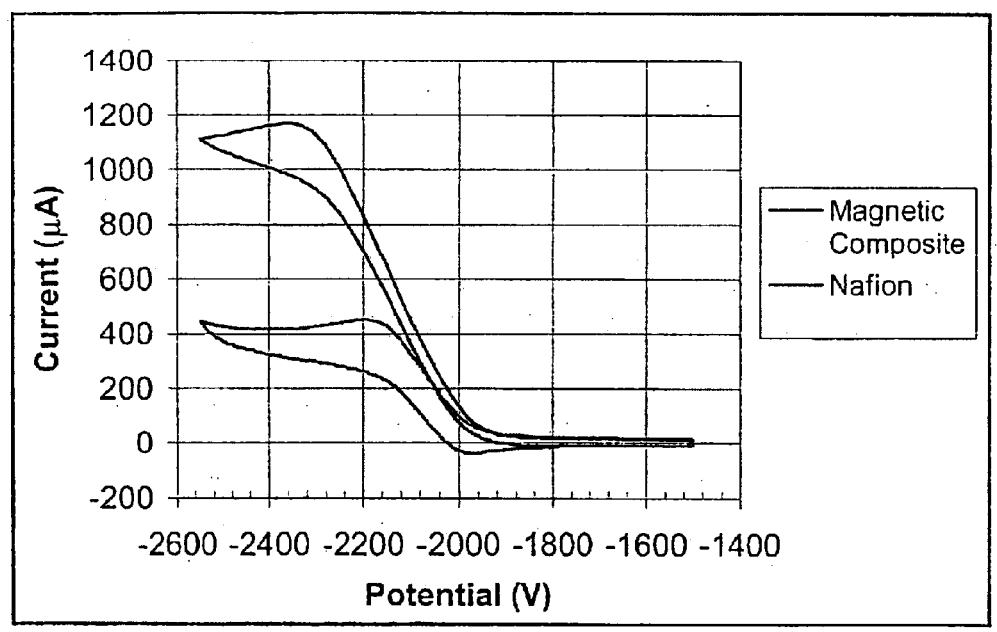
FIG. 35 shows the cyclic voltammetry of dimethylanthracene reduction to dimethylanthracene anion radical.
Figure 36:
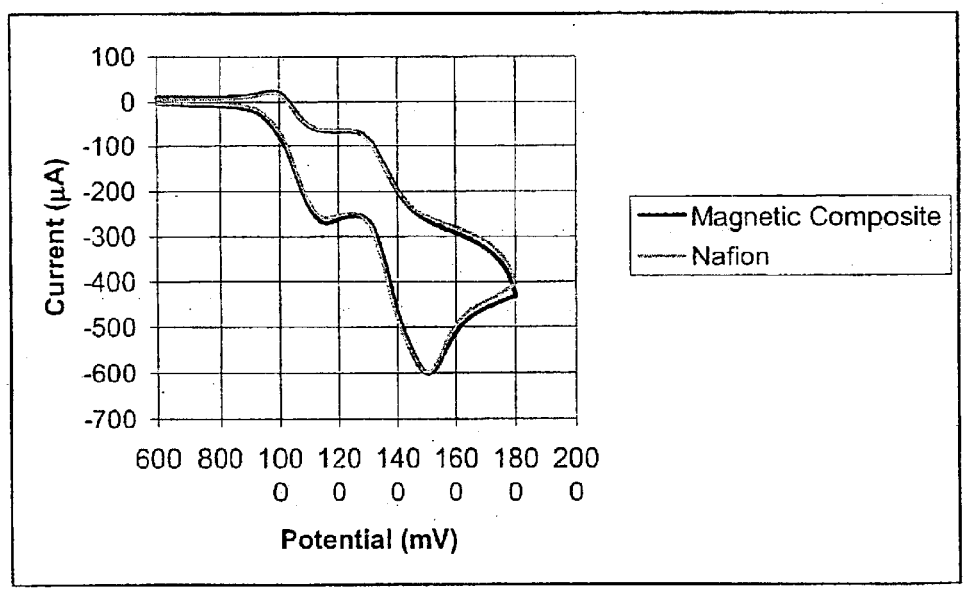
FIG. 36 shows the cyclic voltammetry of dimethylanthracene oxidation to dimethylanthracene cation radical.

Dimethylanthracene is an anthracene analog that is similar in structure and chemistry to diphenylanthracene. The chemical structure of dimethylanthracene is shown in FIG. 34. The cyclic voltammetry of dimethylanthracene reduction to dimethylanthracene anion radical is shown in FIG. 35. The cyclic voltammetry of dimethylanthracene oxidation to dimethylanthracene cation radical can be seen in FIG. 36. Dimethylanthracene shows the same trend in magnetic effects that diphenylanthracene does. A large flux enhancement for the formation of the anion radical, but a much smaller (or negligible) magnetic effect for the formation of dimethylanthracene cation radical.

The spin and charge density calculations for dimethylanthracene anion radical are presented in FIG. 37. The spin and charge density calculations for dimethylanthracene cation radical are presented in FIG. 38. The sum of the spin densities for both radicals is 1.0. The total charge of the anion radical is −1.0 and the total charge of the cation radical is 1.0. The charge density is delocalized throughout the molecule, but the spin density if concentrated on C7 and C8, which are the center carbons on the middle ring.

F. Anthracene

Figure 39:
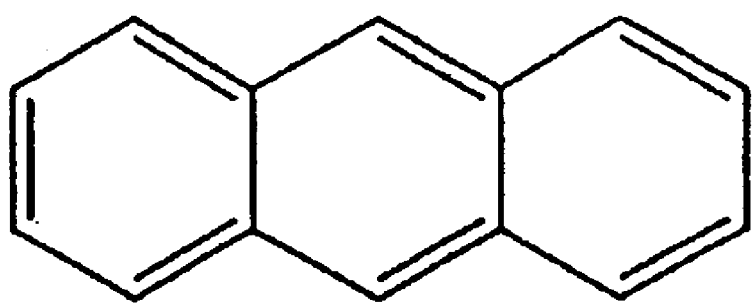
FIG. 39 shows the chemical structure of anthracene.
Figure 40:
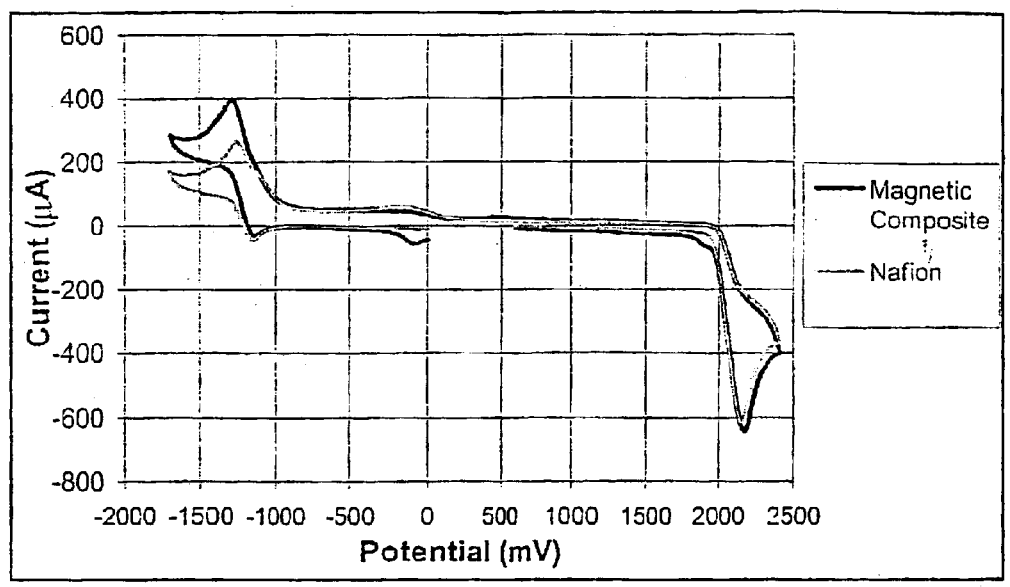
FIG. 40 shows the cyclic voltammetry of anthracene.

Anthracene is a common organic redox couple. The chemical structure of anthracene can is shown in FIG. 39. Anthracene undergoes electrochemistry similar to that of diphenylanthracene and dimethylanthracene. The cyclic voltammetry of anthracene is shown in FIG. 40.

The spin and charge density calculations for anthracene anion radical are presented in FIG. 41. The spin and charge density calculation for anthracene cation radical are presented in FIG. 42. The sum of the spin densities of both radicals is 1.0. The total charge of the anion radical is −1.0. The total charge of the cation radical is 1.0. The charge density of both radicals is delocalized over the whole molecule. The spin density of both of the radicals is concentrated on C7 and C8, which are the center carbons on the middle ring.

G. Rubrene

Figure 43:
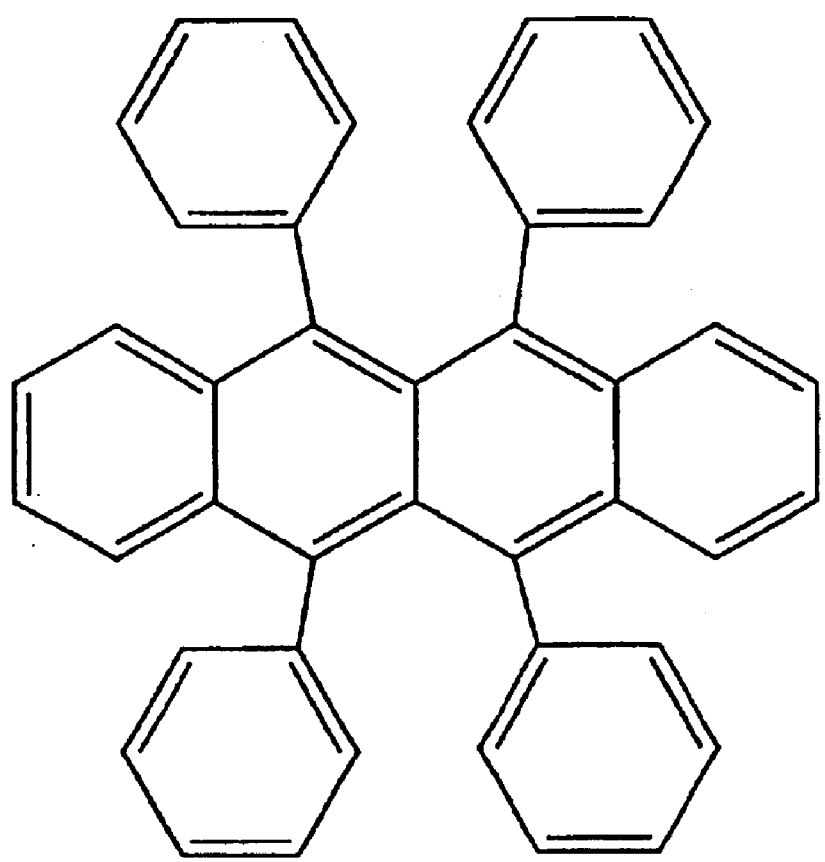
FIG. 43 shows the chemical structure of rubrene.
Figure 44:
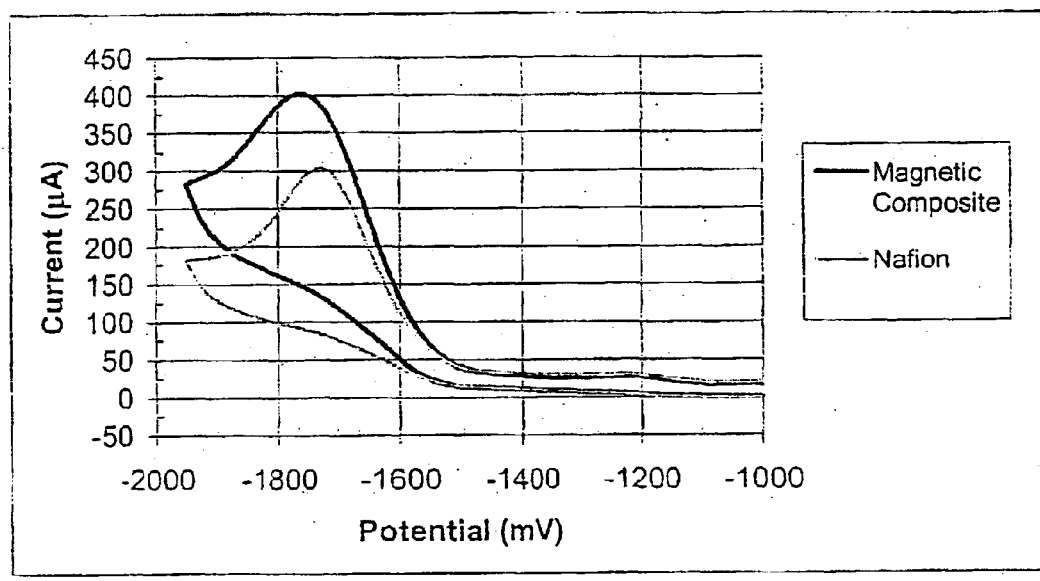
FIG. 44 shows the electrochemistry of rubrene in acetonitrile.

Rubrene is a large organic redox couple. The chemical structure of rubrene is shown in FIG. 43. The electrochemistry of rubrene is similar to other anthracene analogs, except that the peaks are shifted slightly. Therefore, only one electron transfer step is within the potential window for acetonitrile. The electrochemistry of rubrene in acetonitrile is shown in the cyclic voltammograms in FIG. 44. Rubrene is reduced to rubrene anion radical. The current is somewhat enhanced for the magnetic composite.

The spin and charge density calculation results are shown in the FIG. 45. The total spin is 1.0 and the total charge is −1.0. The spin is localized on C7, C8, C23, and C24, which are the middle carbons on the center rings to which the phenyl groups are attached. The charge density is delocalized throughout the molecule.

H. Tetracyanoquinodimethane

Figure 46:
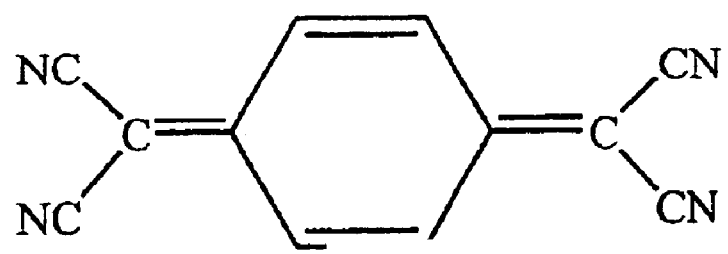
FIG. 46 shows the chemical structure of tetracyanoquinodimethane.
Figure 47:
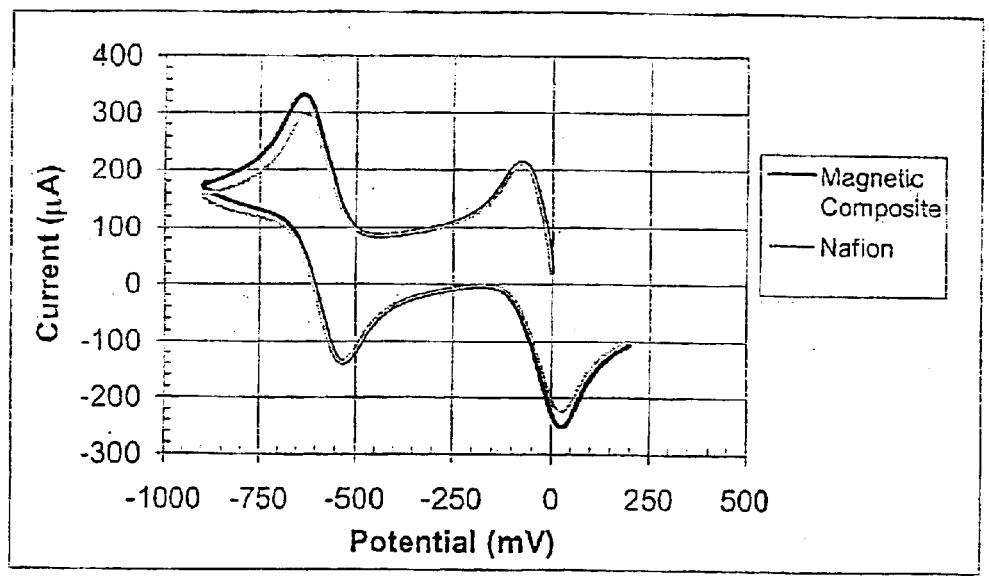
FIG. 47 shows the cyclic voltammetry of tetracyanoquinodimethane at a Nafion modified electrode and a magnetic microsphere/Nafion modified electrode.

Tetracyanoquinodimethane is an organic redox couple that undergoes two single electron transfers. The chemical structure of tetracyanoquinodimethane is shown in FIG. 46. Tetracyanoquinodimethane can be reduced to its anion radical. Then, it can be further reduced to the diamagnetic di-anion. The cyclic voltammetry of tetracyanoquinodimethane at a Nafion modified electrode and a magnetic microsphere/Nafion modified electrode are shown in FIG. 47.

Tetracyanoquinodirnethane shows negligible magnetic field effects in the cyclic voltammogram. Therefore, there are no appreciable changes in heterogeneous and homogeneous electron transfer kinetics. The spin and charge density calculations are shown in FIG. 48. The total spin is 1.0 and the total charge is −1.0. The spin density is localized at the 2 nitrogen atoms attached to the same carbon. The negative charge density is also localized at the nitrogen atoms.

I. Tetramethylphenylenediamine

Figure 49:
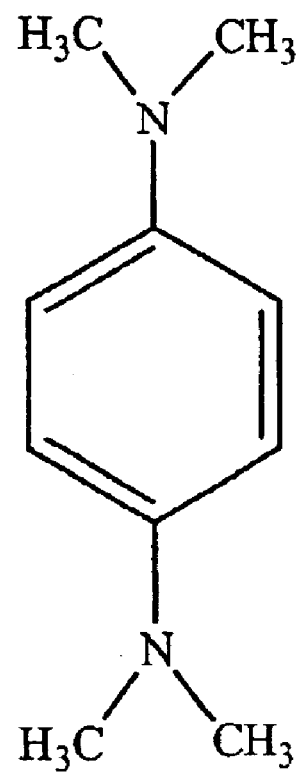
FIG. 49 shows tetramethylphenylenediamine commonly known as Wurster's Reagent.

Tetramethylphenylenediamine (FIG. 49) is commonly known as Wurster's Reagent. It is used frequently in spectroelectrochemistry. Tetramethylphenylenediamine undergoes two single electron transfer steps. The first electron transfer occurs when tetramethylphenylenediamine oxidizes to tetramethylphenylenediamine cation radical. The second electron transfer occurs when tetramethylphenylenediamine cation radical is oxidized to diamagnetic teftamethylphenylenediamine dication.

Figure 50:
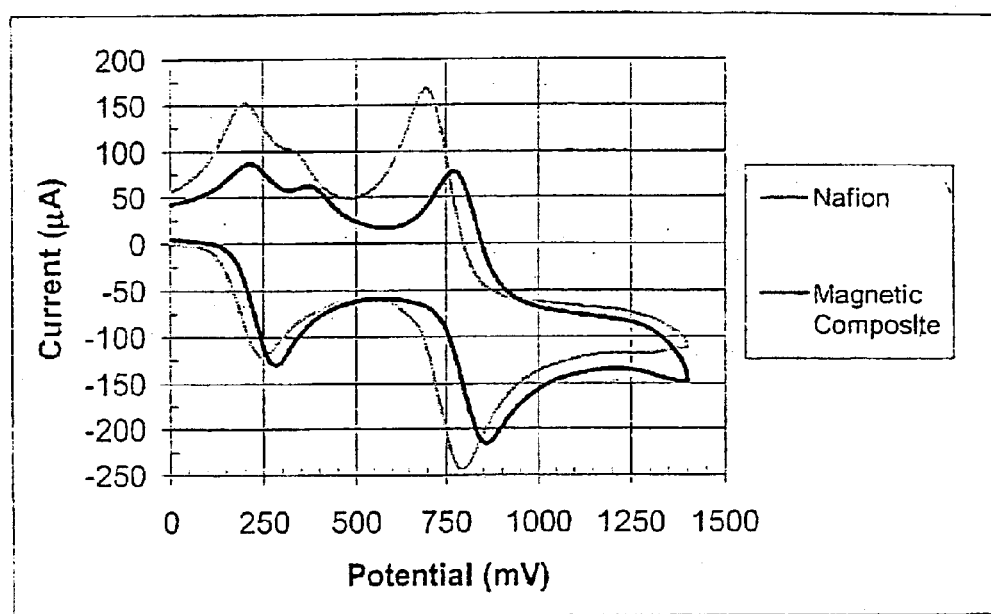
FIG. 50 shows the electrochemistry at Nafion and magnetic microsphere/Nafion composite modified electrodes.

The electrochemistry at Nafion and magnetic microsphere/Nafion composite modified electrodes can be seen from the representative cyclic voltammograms in FIG. 50. In this system, the larger cyclic voltammogram is the Nafion film and the smaller cyclic voltammogram is the 10% by wt. magnetic microsphere/Nafion composite modified electrode. The cyclic voltammetry shows decreases in electrochemical flux and morphological changes, including an asymmetric increase in the prewave of the second electron transfer step.

The results of the spin and charge density calculation are shown in the FIG. 51. The spin density is localized on the nitrogen opposite from that where the negative charge density is localized.

J. Thianthrene

Figure 52:
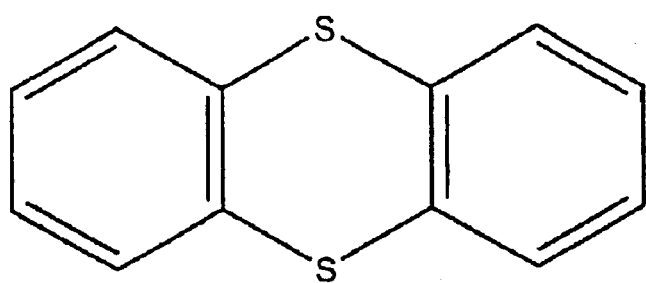
FIG. 52 shows the chemical structure of thianthrene.

Thianthrene is an organic molecule similar to anthracene except that two carbon atoms are replaced with sulfur. The chemical structure of thianthrene is shown in FIG. 52. Thianthrene is oxidized to form a radical cation. The radical cation is further oxidized to form a dication.

Figure 53:
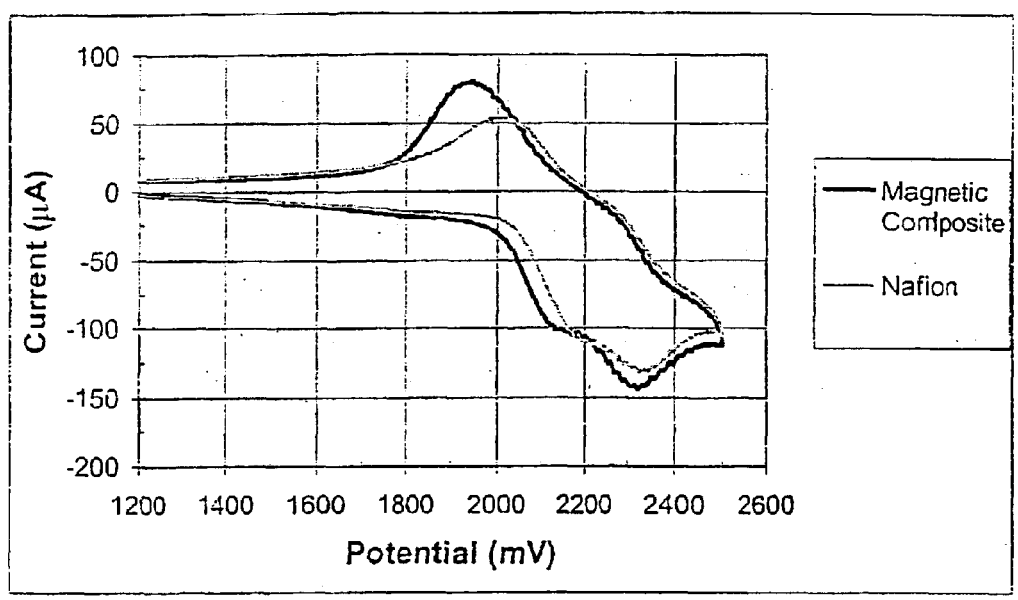
FIG. 53 shows the cyclic voltammetry of thianthrene at Nafion and magnetically modified electrodes.

Cyclic voltammetry of thianthrene at Nafion and magnetically modified electrodes is shown in FIG. 53. Given a stable film, there is little or no magnetic field effect on the cyclic voltammetry. In some cyclic voltammograms, small morphological changes appear, but they are characteristic of unstable films.

The spin and charge density for thianthrene radical calculation are given in FIG. 54. The total spin and total charge are 1.0. The positive charge density is localized at the sulfur atoms. The spin density is also localized at the sulfur atoms.

K. Octaethylporphine Nickel(II)

Figure 55:
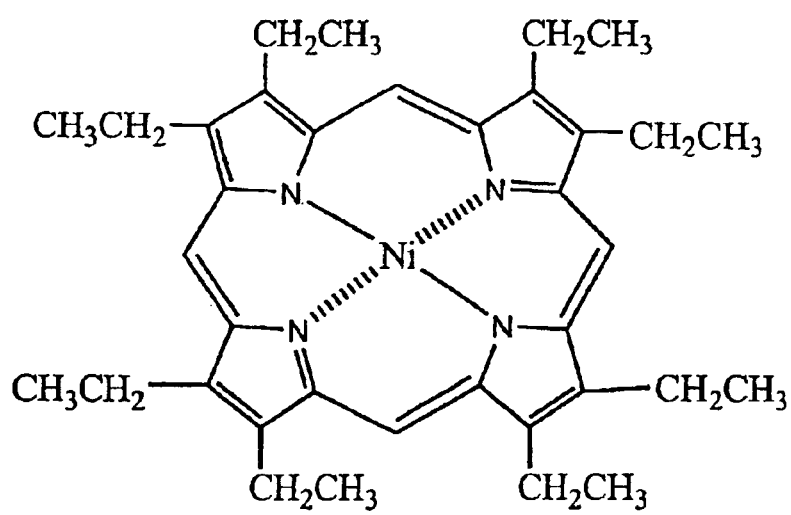
FIG. 55 shows the chemical structure of octaethylporpbine nickel(II).
Figure 56:
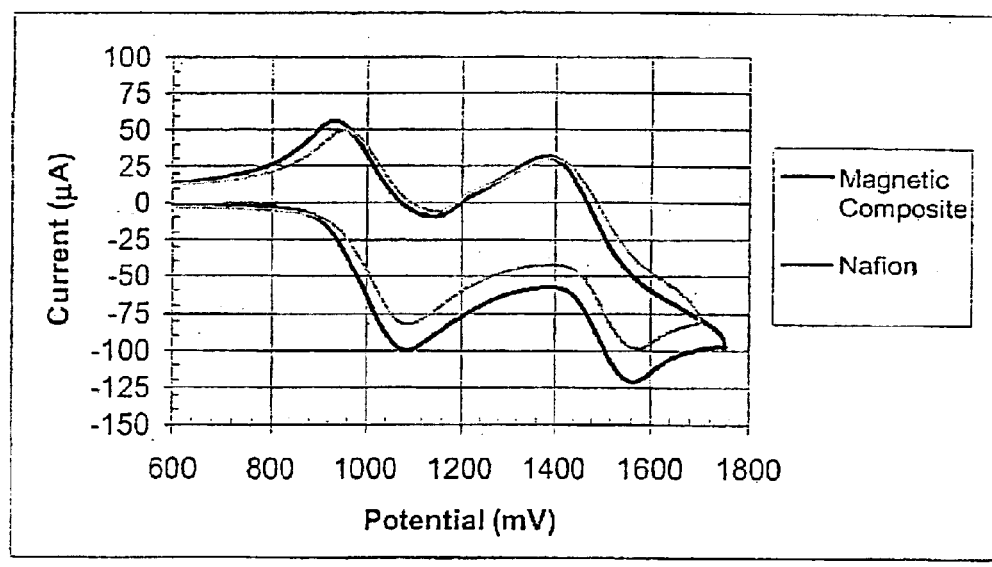
FIG. 56 shows the cyclic voltammetry of octaethylporphine nickel(II) at Nafion and magnetically electrodes.

The octaethylporphine nickel(II) free radical redox couple was studied in methylene chloride solvent This nickel porphrine is uncharged. The chemical structure of octaethylporpbine nickel(II) is shown in FIG. 55. In the methylene chloride potential window, octaethylporphine is oxidized to the octaethylporphine nickel cation and then subsequently oxidized again to the dication. It is important to note that the ring is undergoing oxidation and not the nickel center. The cyclic voltammetry of octaethylporphine nickel(II) at Nafion and magnetically modified electrodes is shown in FIG. 56. Gaussian has been unable to perform geometry optimization of octaethylporphine nickel(II) for all basis sets. Therefore, there is no spin and charge density information for this molecule.

L. Discussion

Magnetic field effects on free radical electrochemistry in acetonitrile solution are smaller than the analogous magnetic field effects on transition metal complex electrochemistry in water. For the free radical systems, if charge and spin are localized in the same atoms of a molecule, no magnetic field effect was observed cyclic voltammetrically. However, if charge and spin are dispersed or localized in different areas of a molecule, magnetic field effects are observed.

The above results are summarized into FIG. 57. It is noted that the largest effects are observed for benzyl viologen and the anthracene-based anion radicals. The magnitude of the magnetic effect (flux enhancement) is determined to be no effect if less than 10% on average, small effect if between 10 and 40% on average, medium effect if between 40 and 80% on average, large if greater than 80% enhancement on average, and morphological if the cyclic voltammograms showed altered shape.

This comparison of spin and charge densities does not provide a quantitative assessment of flux enhancements or morphological changes. However, it is effective at determining whether a magnetic effect will be observed. Further, it is noted that magnetic effects are diminished by heteroatoms as they are more electronegative and localize charge and spin density.

What is claimed is:

1. A method for determining whether charge and spin density are localized in a molecule of interest, which comprises:

subjecting a solution comprising a molecule of interest to first and second cyclic voltammetric analyses thereby yielding first and second voltammograms, wherein one of said first and second cyclic voltammetric analyses is performed using a magnetically modifed electrode; and comparing said first and second voltammograms.

2. A method for enhancing an electrosynthetic process having radical intermediates, which comprises;

determining the structure of radical intermediates present in an electrosynthetic process;

performing spin and charge density calculations for said radical intermediates; and employing a magnetically modified electrode in said process, provided that charge and spin density are not localized on the same atom of said radical intermediates.

\* \* \* \* \*